US008947407B2

(12) United States Patent
Williams et al.

(10) Patent No.: US 8,947,407 B2
(45) Date of Patent: Feb. 3, 2015

(54) LOW COST LED DRIVER WITH INTEGRAL DIMMING CAPABILITY

(75) Inventors: Richard K. Williams, Cupertino, CA (US); Kevin D'Angelo, Santa Clara, CA (US); David A. Brown, San Jose, CA (US); George A. Hariman, Sunnyvale, CA (US)

(73) Assignee: Advanced Analogic Technologies Incorporated, Santa Clara, CA (US)

(*) Notice: Subject to any disclaimer, the term of this patent is extended or adjusted under 35 U.S.C. 154(b) by 416 days.

(21) Appl. No.: 13/347,631

(22) Filed: Jan. 10, 2012

(65) Prior Publication Data

US 2013/0082604 A1 Apr. 4, 2013

Related U.S. Application Data

(63) Continuation of application No. 13/346,625, filed on Jan. 9, 2012.

(60) Provisional application No. 61/541,526, filed on Sep. 30, 2011.

(51) Int. Cl.

| | |
|---|---|
| ***G06F 3/038*** | (2013.01) |
| ***H05B 37/02*** | (2006.01) |
| ***H05B 33/08*** | (2006.01) |

(52) U.S. Cl.

CPC .................................. *H05B 33/0827* (2013.01)
USPC ............. 345/204; 345/98; 345/100; 345/102; 315/122; 315/185 R; 315/186; 315/291; 315/294

(58) Field of Classification Search

USPC ............. 315/122, 130, 185 R, 186, 291, 294; 345/98, 100, 102, 204
See application file for complete search history.

(56) References Cited

U.S. PATENT DOCUMENTS

| | | | |
|---|---|---|---|
| 6,175,193 | B1 | 1/2001 | Kishita et al. |
| 6,700,560 | B2 | 3/2004 | Sumiya |
| 6,754,784 | B1 | 6/2004 | North et al. |
| 7,956,824 | B2 | 6/2011 | Li Volsi |
| 8,344,661 | B2 | 1/2013 | Hsu et al. |

(Continued)

FOREIGN PATENT DOCUMENTS

| | | | |
|---|---|---|---|
| EP | 1589517 | A2 | 10/2005 |
| GB | 2459009 | A | 10/2009 |

(Continued)

OTHER PUBLICATIONS

International Preliminary Report on Patentability from corresponding PCT Application No. PCT/US2012/057850 dated Apr. 1, 2014.

*Primary Examiner* — Douglas W Owens
*Assistant Examiner* — Thai Pham
(74) *Attorney, Agent, or Firm* — Lando & Anastasi, LLP

(57) ABSTRACT

A distributed system for driving strings of series-connected LEDs for backlighting, display and lighting applications includes multiple intelligent satellite LED driver ICs connected to a an interface IC via serial bus. The interface IC translates information obtained from a host microcontroller into instructions for the satellite LED driver ICs pertaining to such parameters as duty factor, current levels, phase delay and fault settings. Fault conditions in the LED driver ICs can be transmitted back to the interface IC. An analog current sense feedback system which also links the LED driver ICs determines the supply voltage for the LED strings.

20 Claims, 36 Drawing Sheets

(56) References Cited

U.S. PATENT DOCUMENTS

| | | | | |
|---|---|---|---|---|
| 2001/0005319 | A1 | 6/2001 | Ohishi et al. | |
| 2006/0125757 | A1 | 6/2006 | Kang et al. | |
| 2006/0186820 | A1 | 8/2006 | Yang | |
| 2006/0214898 | A1 | 9/2006 | Woo et al. | |
| 2008/0180040 | A1 | 7/2008 | Prendergast et al. | |
| 2008/0292344 | A1 * | 11/2008 | Nagumo | 399/51 |
| 2009/0079362 | A1 | 3/2009 | Shteynberg et al. | |
| 2009/0128053 | A1 | 5/2009 | Dhayagude et al. | |
| 2009/0134817 | A1 | 5/2009 | Jurngwirth et al. | |
| 2009/0251071 | A1 * | 10/2009 | Gater et al. | 315/297 |
| 2009/0284445 | A1 | 11/2009 | Kuo et al. | |
| 2009/0309502 | A1 | 12/2009 | Trattler | |
| 2010/0052558 | A1 | 3/2010 | Lee et al. | |
| 2010/0053129 | A1 | 3/2010 | Morita | |
| 2011/0012519 | A1 | 1/2011 | Zhao | |
| 2011/0043545 | A1 * | 2/2011 | Huang | 345/690 |
| 2011/0096099 | A1 * | 4/2011 | Yamamoto et al. | 345/690 |
| 2011/0121755 | A1 | 5/2011 | Han | |
| 2011/0249036 | A1 | 10/2011 | Kim | |
| 2012/0098456 | A1 | 4/2012 | Tseng | |
| 2013/0082609 | A1 | 4/2013 | Williams et al. | |
| 2013/0082614 | A1 | 4/2013 | Williams et al. | |
| 2013/0082615 | A1 | 4/2013 | Williams et al. | |
| 2013/0099681 | A1 | 4/2013 | Williams et al. | |
| 2013/0099682 | A1 | 4/2013 | Williams et al. | |
| 2013/0099701 | A1 | 4/2013 | Williams et al. | |
| 2013/0099702 | A1 | 4/2013 | Williams et al. | |
| 2013/0147370 | A1 | 6/2013 | Williams et al. | |
| 2013/0147371 | A1 | 6/2013 | Williams et al. | |
| 2013/0147372 | A1 | 6/2013 | Williams et al. | |
| 2013/0147375 | A1 | 6/2013 | Williams et al. | |
| 2013/0193852 | A1 | 8/2013 | Frattini et al. | |

FOREIGN PATENT DOCUMENTS

| | | | |
|---|---|---|---|
| JP | 2001188498 | A | 7/2001 |
| RU | 2103839 | C1 | 1/1998 |
| RU | 2256305 | C2 | 7/2005 |
| RU | 2007142404 | A | 5/2009 |
| RU | 2385553 | C2 | 3/2010 |
| RU | 2427109 | C2 | 8/2011 |
| SU | 549795 | A | 3/1977 |
| SU | 1709351 | A1 | 1/1992 |
| TW | 201108863 | A | 3/2011 |
| TW | 201110809 | A | 3/2011 |

* cited by examiner

Total Current $n * I_{LED}$

| # of Series LEDs m | 200mA | 250mA | 300mA | 400mA | 500mA | 600mA | 800mA | 1A |
|---|---|---|---|---|---|---|---|---|
| 1 | 0.22 | 0.28 | 0.33 | 0.44 | 0.55 | 0.66 | 0.88 | 1.10 |
| 2 | 0.27 | 0.34 | 0.40 | 0.54 | 0.67 | 0.81 | 1.08 | 1.35 |
| 3 | 0.31 | 0.38 | 0.46 | 0.62 | 0.77 | 0.92 | 1.23 | 1.54 |
| 4 | 0.34 | 0.43 | 0.51 | 0.68 | 0.85 | 1.02 | 1.36 | 1.70 |
| 5 | 0.37 | 0.46 | 0.55 | 0.74 | 0.92 | 1.10 | 1.47 | 1.84 |
| 6 | 0.39 | 0.49 | 0.59 | 0.79 | 0.98 | 1.18 | 1.58 | 1.97 |
| 7 | 0.42 | 0.52 | 0.63 | 0.83 | 1.04 | 1.25 | 1.67 | 2.09 |
| 8 | 0.44 | 0.55 | 0.66 | 0.88 | 1.10 | 1.32 | 1.76 | 2.20 |
| 9 | 0.46 | 0.58 | 0.69 | 0.92 | 1.15 | 1.38 | 1.84 | 2.30 |
| 10 | 0.48 | 0.60 | 0.72 | 0.96 | 1.20 | 1.44 | 1.92 | 2.40 |
| 11 | 0.50 | 0.62 | 0.75 | 1.00 | 1.24 | 1.49 | 1.99 | 2.49 |
| 12 | 0.52 | 0.64 | 0.77 | 1.03 | 1.29 | 1.55 | 2.06 | 2.58 |
| 13 | 0.53 | 0.67 | 0.80 | 1.07 | 1.33 | 1.60 | 2.13 | 2.66 |
| 14 | 0.55 | 0.69 | 0.82 | 1.10 | 1.37 | 1.65 | 2.20 | 2.74 |
| 15 | 0.56 | 0.71 | 0.85 | 1.13 | 1.41 | 1.69 | 2.26 | 2.82 |
| 16 | 0.58 | 0.73 | 0.87 | 1.16 | 1.45 | 1.74 | 2.32 | 2.90 |
| 18 | 0.61 | 0.76 | 0.91 | 1.22 | 1.52 | 1.83 | 2.44 | 3.05 |
| 20 | 0.64 | 0.80 | 0.95 | 1.27 | 1.59 | 1.91 | 2.55 | 3.18 |
| 23 | 0.68 | 0.84 | 1.01 | 1.35 | 1.69 | 2.03 | 2.70 | 3.38 |
| 27 | 0.72 | 0.90 | 1.09 | 1.45 | 1.81 | 2.17 | 2.89 | 3.62 |
| 30 | 0.76 | 0.95 | 1.14 | 1.51 | 1.89 | 2.27 | 3.03 | 3.79 |
| 33 | 0.79 | 0.99 | 1.18 | 1.58 | 1.97 | 2.37 | 3.16 | 3.95 |
| 37 | 0.83 | 1.04 | 1.24 | 1.66 | 2.07 | 2.49 | 3.32 | 4.15 |
| 40 | 0.86 | 1.07 | 1.29 | 1.72 | 2.15 | 2.58 | 3.44 | 4.29 |
| 45 | 0.90 | 1.13 | 1.36 | 1.81 | 2.26 | 2.71 | 3.62 | 4.52 |
| 50 | 0.95 | 1.19 | 1.42 | 1.90 | 2.37 | 2.85 | 3.79 | 4.74 |
| 55 | 0.99 | 1.24 | 1.48 | 1.98 | 2.47 | 2.97 | 3.96 | 4.95 |
| 60 | 1.03 | 1.29 | 1.54 | 2.06 | 2.57 | 3.09 | 4.12 | 5.15 |

156 157 158 159

*FIG. 3C*

LOW COST LED DRIVER WITH INTEGRAL DIMMING CAPABILITY

CROSS-REFERENCE TO RELATED APPLICATIONS

This application is a continuation of application Ser. No. 13/346,625, filed Jan. 9, 2012, which claims the priority of Provisional Application No. 61/541,526, filed Sep. 30, 2011, each of which is incorporated herein by reference in its entirety.

This application is related to the following applications, each of which is incorporated herein by reference in its entirety: application Ser. No. 13/346,647, filed Jan. 9, 2012, entitled Low Cost LED Driver with Improved Serial Bus. Application Ser. No. 13/346,659, filed Jan. 9, 2012, entitled Serial Lighting Interface With Embedded Feedback.

BACKGROUND OF THE INVENTION

This invention relates to semiconductor devices and circuits and methods for driving LEDs in lighting and display applications.

LEDs are increasingly being used to replace lamps and bulbs in lighting applications, including providing white light as a backlight in color liquid crystal displays (LCD) and high definition televisions (HDTV). While LEDs may be used to uniformly light the entire display, performance, contrast, reliability, and power efficiency are improved by employing more than one string of LEDs and to drive each string to a different brightness corresponding to the portion of the display that the particular LED string illuminates. The benefits of controlling LED string brightness are many. In some cases, the brightness of each string of LEDs can be adjusted in proportion to the brightness of the specific portion of the LCD image being illuminated. For example, the LEDs behind the image of the sun may be biased to full brightness, while in the same video frame, images in shadow or underwater may be more dimly illuminated, emphasizing image and color contrast across the picture. In other cases, the screen may be backlit in horizontal bands, where the portion located immediately behind changing pixels is blackened or dimmed to reduce image blurring associated with the slow phase change of the liquid crystal. "Local dimming" therefore refers to backlighting systems capable of such non-uniform backlight brightness. The power savings in such systems can be as high as 50% as compared with LCDs employing uniform backlighting. Using local dimming, LCD, contrast ratios can approach those of plasma TVs.

To control the brightness and uniformity of the light emitted from each string of LEDs, special electronic driver circuitry must be employed to precisely control the LED current and voltage. For example, a string of"m" LEDs connected in series requires a voltage equal to approximately 3.1 to 3.5 (typically 3.3) times "m" to operate consistently. Supplying this requisite voltage to a LED string generally requires a step-up or step-down voltage converter and regulator called a DC-to-DC converter or switch-mode power supply (SMPS). When a number of LED strings are powered from a single SMPS, the output voltage of the power supply must exceed the highest voltage required by any of the strings of LEDs. Since the highest forward voltage required cannot be known a priori, the LED driver IC must be intelligent enough to dynamically adjust the power supply voltage using feedback. LED voltages cannot be known with certainty because LED manufacturing naturally exhibits variability in forward voltage associated with manufacturing reproducibility and quality of the man-made crystalline material used to form the LEDs. Stochastic variability, i.e. random variation, is an unavoidable characteristic in manufacturing following the mathematical principles of statistics and probability. While manufacturers seek to minimize this variability, they cannot prevent it entirely. Even though testing and sorting can be used to intelligently combine LEDs into strings with more consistent voltages, such operations undesirably add cost and limit factory throughput, and are therefore avoided whenever possible.

In addition to providing the proper voltage to the LED strings, the backlight driver ID must precisely control the current conducted in each string to a tolerance of ±2%. Accurate current control is necessary because the brightness of an LED is proportional to the current flowing through it, and any substantial string-to-string current mismatch will be evident as a variation in the brightness of the LCDs. Aside from controlling the current, local dimming requires precise pulse control of LED illumination, both in timing and duration, in order to synchronize the brightness of each backlight region, zone, or tile to the corresponding image in the LCD screen.

The prior art's solutions to the need for local dimming limit display brightness and are costly. Attempts to reduce these costs sacrifice necessary features, functionality, and even safety.

Conventional Integrated LED Driver Design and Operation

LED system 1, shown in FIG. 1, comprises a conventional backlight controller integrated circuit (IC) 2 with "n" channels of integrated drivers 12A through 12*n*. For clarity, only channel 12A is shown in detail, but channel 12A represents the other channels as well. The number of integrated channels in a driver IC generally may range from eight to sixteen. As shown, channel 12A comprises a controlled current sink device or circuit 17A in series with a corresponding LED string 3A of "m" LEDs, powered by a controlled voltage supply $+V_{LED}$.

Similarly, channel 12B (not shown) comprises a controlled current sink device or circuit 17B in series with a corresponding LED string 3B of "m" LEDs powered by the same controlled voltage supply $+V_{LED}$. Generalizing, the $n^{th}$ channel in driver IC2, i.e. channel 12*n*, comprises a controlled current sink device or circuit 17*n* in series with a corresponding LED string 3*n* of "m" LEDs powered by the same controlled voltage supply $+V_{LED}$) powering all n channels. It should be understood that explanations identifying a specific channel, e.g. channel 12A, apply equally to any channel and collectively to all "n" channels.

In color LCD backlighting applications, the LEDs are typically white LEDs. The color of each pixel is achieved by employing a red, green or blue color filter sitting atop the LCD, changing the white light generated by the LCD and passing through the filter into color by removing the unwanted colors in each region. The brightness of each string of LEDs depends on the current flowing through it, provided that there is adequate voltage to power the string. Excess voltage present across any given string of LEDs 3A-3*n*, will be absorbed by the corresponding current sink device 17A-17*n* and can lead to overheating in a specific device. Without integrated thermal protection, the excess heat may damage the corresponding current sink device 17A-17*n* and the entire integrated circuit 2.

Controlling the currents in current sink devices 17A-17*n* and LED supply voltage $+V_{LED}$ requires a significant amount of associated circuitry. For example, in addition to current sink device 17A, channel 12A also includes a pulse-width-modulation PWM controller 16A, a digital-to-analog (D/A) controller 15A, an LED fault detector comparator 14A, and a current-sense feedback CSFB amplifier 13A. These elements are duplicated in one-to-one correspondence in channels 12B-12*n* (e.g., channel B contains a PWM controller 16B and channel n contains a PWM controller 16*n*, etc.). Through a digital SPI bus interface 4, backlight controller IC 2 therefore independently controls the current in "n" channels of LED strings, each channel having "m" LEDs connected in series in a string. Commands arriving at the SPI bus interface 4 usually come from a microcontroller, a custom ASIC, a field programmable gate array (FPGA), a dedicated graphics IC, or a video processor and scalar IC. The SPI bus, an acronym for "serial peripheral interface" bus, is one common communication standard used in video systems.

The number of series-connected LEDs "m" in each string may vary from 2 to 60, depending on the size, performance, and cost of the TV or LCD, but 10 to 20 is common. The number of channels per backlight controller IC varies by design, but each backlight controller IC typically contains no fewer than 8 channels to limit the number of backlight controller ICs, and no more than 16 channels to avoid overheating, especially at higher currents.

While current sink device 17A generally comprises a high-voltage MOSFET biased as a current mirror, precise current control likely requires active feedback to minimize the influence of drain-to-source voltage on current regulation. In FIG. 1, this feedback circuit is depicted schematically as feedback loop 19A, but in reality, the feedback circuit is generally implemented with amplifiers and additional active and passive devices. The current sink devices 17A through 17*n* in channels 2A through 2*n*, respectively, are designed with identical circuit components and ideally similar device orientations to minimize any process-induced mismatch, and in addition the current sink devices may be actively trimmed to improve absolute accuracy and channel-to-channel matching to a tolerance of less than ±2%.

Although the current in any one channel may be varied through the digital SPI-bus interface 4, the maximum current of every channel is set "globally" by the value of an external precision resistor 21 connected to a bias circuit 22. The maximum per channel current, which may range by application and display size from 30 mA to over 300 mA, is therefore a global variable affecting all "n" channels equally within a given backlight controller IC. If two or more backlight controller IC's are used in a system (e.g., a TV), precision resistors must be used to insure acceptable chip-to-chip current matching among all the channels in the system.

The maximum voltage of the high-voltage power device represented by current sink device 17A is depicted schematically by a P-N diode 18A, and may vary by application and display size from 30V to as high as 300V. Typical voltages range from 40V to 100V, where 40V is sufficient to operate ten series-connected LEDs and 100V is suitable for 25 series-connected LEDs. While any single channel can be designed to operate at both the highest voltage and the highest current, the total power dissipation in IC 2 may limit the actual combination of currents, voltages, and number-of-channels practically realizable to avoid overheating and reliability problems. This fundamental thermal limit and the unavoidable tradeoff between the number of channels integrated in the IC and the maximum power delivered by any single channel will be elaborated on later in this disclosure.

To control the duration and timing of illumination of LED string 3A, current sink device 17A is pulsed on and off using pulse-width modulation controlled by PWM controller 16A in response to a digital value representing a duty factor (D) stored in PWM register 9, a digital phase delay value ($\phi$) stored in the phase delay register 10, and synchronized to the grey scale clock input GSC and the vertical sync signal input Vsync. PWM controller 16A comprises a counter clocked by the grey scale clock signal GSC to generate on-off pulses controlling the current sink device 17A, thereby enabling dynamic adjustable LED brightness control. At the leading edge of the Vsync signal, the digital values of the duty factor (D) and phase delay ($\Phi$) are loaded into the counter within PWM controller 16A, and the counting of the GSC pulses commences. Both the PWM and phase delay digital words are typically 12 bits in length, providing for 4096 different values of phase delay and 4096 different levels of PWM brightness. Phase delay is used to prevent current spikes resulting from simultaneous LED turn-on and to compensate for propagation delay across the display panel. At the onset of counting, the counter within PWM controller 16A counts the phase delay value 4, during which time, the output of PWM controller 16A remains low, the current sink device 17A remains off, and the LEDs in string 3A remain dark. After the phase delay count $\Phi$ loaded from phase delay register 10 is complete, the output of PWM controller 16A goes high, the current sink device 17A turns on, and the LED string 3A becomes illuminated for a duration represented by the duty factor value D loaded from PWM register 9.

The entire sequence described above occurs within one Vsync period, generally repeating at a frame rate of 60, 120, 240, 480 or 960 Hz depending on the display design. During this interval, new values of data for the next picture frame are sent to IC 2 through SPI bus interface 4 and loaded into PWM register 9 and phase delay register 10, respectively. Generally, the grey-scale-clock signal GSC is generated from the Vsync signal by the system controller. Alternatively, a phase lock loop circuit may be employed within IC 2 to internally generate the GSC signal.

Because the GSC signal is synchronized to the Vsync signal, multiple driver ICs may be used in tandem to illuminate larger displays without encountering synchronization issues. Timing information of the GSC and Vsync signals is input into IC 2 through a buffer and timing circuit 11 before being distributed throughout the integrated circuit. An enable pin En is also included as a hardware "chip-select" function, redundant to SPI bus control but useful in start-up sequencing, failure analysis and debugging, and during engineering prototype development.

Unlike a simple MOSFET switch, current sink device 17A represents a high voltage MOSFET biased as a current sink conducting a fixed and calibrated current when it is on and carrying significantly less than a microampere of current when it is off. The actual current during conduction is set globally for all channels by resistor 21 and bias circuit 22, and for the specific channel 12A by the "Dot $I_{LED}$" digital word stored in a Dot register 8. The term "dot correction" historically relates to adjusting, i.e. calibrating, pixel "dots" to produce uniform brightness to compensate for irregularities and non-uniformity in a display. Today, the current in backlighting applications is generally adjusted for overall display brightness but not to correct for pixel variation across a display, primarily because driving white LEDs at differing currents can change the color temperature, i.e. the spectrum of emitted light, of the white LED strings.

Since the gate voltage and the resulting saturation current in a MOSFET biased as a current sink are analog parameters, a D/A converter 15A is required to convert the digital "Dot" word into an analog voltage to properly drive the MOSFET operating as current sink device 17A. A feedback circuit 19A must be calibrated in conjunction with D/A converter 15A to produce the proper current at full and intermediate brightness codes. An 8-bit word for the Dot parameter is typical, but in some cases 12 bits of resolution are necessary. In monolithic implementations of IC 2, the high-voltage MOSFET implementing current sink device 17A may be divided into sections with 8 to 12 separate gates, digitally weighted to produce 256 to 4096 distinct levels of current. As such, the MOSFET in current sink device 17A performs part of the D/A function, merging D/A converter 15A, in part, into current sink device 17A. Obviously, this implementation would not be practical in multi-chip implementations of LED backlighting units.

In LED backlighting applications, the drain voltage of the MOSFET within current sink device 17A is monitored both to detect LED fault conditions such as open or shorted LEDs, and to facilitate feedback to the voltage regulator supplying the high voltage supply voltage $+V_{LED}$. Specifically, the analog fault detector comparator 14A monitors the current in current sink device 17A and compares it to a value set by an LED fault register 7. If the voltage rises above a programmed value, e.g. above 6V, then the state of fault detector comparator 14A changes to indicate that a fault condition has occurred, and the change is latched into LED fault register 7. An open drain MOSFET used to generate an interrupt signal is also turned on, pulling the "fault" signal line low to inform the system microcontroller that a fault has occurred. The system must then query fault register 7 for all the ICs in the system to determine which channel has experienced the fault condition.

Detecting a string with a shorted LED is an important requirement for display safety, since a string with a shorted LED will subject the remaining (m−1) LEDs in the string to excessive voltage, a voltage which must necessarily be absorbed by all the other current sink devices 17A through 17*n*, risking overheating of IC 2. Some manufacturers prefer to disable any string with a shorted LED, fearing that the reason for the short may degenerate into a potentially catastrophic failure in the LED, the LED string or in the printed circuit board, possibly leading to fire.

An over-temperature sensor register 6 can only detect overheating of the entire IC 2; it cannot sense overheating in a specific channel. Shorted LED detection is therefore preferable to temperature sensing, since it can identify a string with a shorted LED at risk of overheating and can proactively shut off that string long before IC 2 overheats. LED fault register 7, along with temperature sensor register 6, both report fault conditions to the system through SPI bus interface 4. Like the shorted LED detect function, over temperature sensing in over-temperature sensor register 6 also includes an open drain MOSFET used to generate an interrupt signal, pulling the "fault" signal line low to inform the system microcontroller that a fault has occurred. Shorted LED detection and over-temperature sensing thereby share the same fault pin. Only through the SPI interface can the system controller ascertain the nature of a fault condition.

The voltage across current sink device 17A is also used to generate a feedback signal needed to power the LED high voltage power supply $+V_{LED}$. An amplifier 13A represents this voltage monitor, sensing the voltage needed to properly bias the current sink device 17A with sufficient voltage to maintain a constant current, i.e. to avoid the "drop-out" condition where there is no longer enough voltage to meet the current requested by Dot register 8. The current feedback signal represented by diode 18A is therefore also used in determining this minimum voltage for channel 12A, hence the moniker "current sense feedback" and its associated acronym CSFB. Each channel duplicates this sensing and amplifier circuitry. A CSFB circuit 5 compares the voltage of all "n" channels in IC 2 against its input CSFBI and outputs an analog voltage CSFBO equal to the "lowest" of all the internal voltages. The lowest current sink voltage equals the LED string with the highest series LED forward voltage. In this manner, the highest LED string voltage driven by IC 2 is fed back to the system's LED power supply $+V_{LED}$.

In addition to the foregoing digital, analog and high voltage circuitry, IC 2 includes a high-voltage linear regulator and bias circuit 22 to step down the input voltage VIN, typically 12V or 24V, to the voltages required inside IC 2. One such voltage Vcc, typically 5V, is used as an intermediate supply voltage for most of the control circuitry and therefore requires external filter capacitor 20. The same bias circuitry may also include the constant current reference supply Iref used in current mirrors and for globally setting the maximum channel current for all "n" channel outputs. A precise constant reference current is achieved by biasing external precision resistor 21 with a constant voltage derived from the regulated supply voltage Vcc.

SPI bus interface 4 is a high-speed, albeit complex, bus used to facilitate communication between the system microcontroller and one or more driver ICs. The interface requires 4-pins per driver IC, comprising two data lines, a dedicated clock line and a chip select line. In backlighting, a 4-state 2-pin chip address is commonly used to uniquely identify up to 16 different drivers. Thus up to 16 driver ICs can share one common 4-wire data bus interface, avoiding the need for customized manufacturing of the IC for each address.

Together with the chip address lines, the implementation of SPI bus interface 4 requires 6-pins per IC. This pin count precludes the use of the SPI bus interface in low-cost, low-pin-count packages. For example in a 16-pin package, a 6-pin SPI bus interface will consume 40% of the available pins. Including power and ground, in an 8-pin package, a SPI bus interface leaves no pins for any circuitry or loads.

In driver IC 2, power, bias, timing, enable, and CSFB, and 4 pins for ground (separated into analog ground, power ground and digital ground), together require 11 pins. Adding 6-pins for SPI bus interface 4, and 4 pins for fault settings and fault monitoring, the minimum number of pins for driver IC 2 is 21, plus the number of output channels. An eight-channel driver would therefore require a minimum of a 27-pin package while a sixteen-channel driver requires a package with at least 35 pins. Unfortunately, high-pin count packages, such as 32 and 40 pin packages, are not cheap. Their high-cost adversely impacts the potential gross margin for manufacturers of LED backlight driver ICs and ultimately limits the future cost reductions possible using this conventional architecture.

Repartitioning the functions of the IC shown in FIG. 1 differently in an attempt to reduce packaging cost is problematic in this present day system and IC architecture. Specifically, system 1 and driver IC 2 represent a highly interconnected design, with a large number of analog signals and digital busses distributed throughout the chip. For example, a 12-bit bus may connect SPI bus interface 4 to PWM register 9, another 12-bit bus may connect SPI bus interface 4 to phase delay register 10, an 8-bit bus may connect SPI bus interface 4 to Dot register 8, and a number of other bits may be needed for fault sensing and reporting. Because of the large number of interconnecting busses, SPI bus interface 4 cannot easily be separated from its associated registers 6 through 10.

Similarly, registers 6 through 10 cannot easily be separated from drive and sense circuitry 13A through 16A that drives and controls current sink device 17A. PWM controller 16A is connected to PWM register 9 and phase delay register 10 by two 12 bit parallel busses, D/A converter 15A requires at least a 8-bit wide bus interconnect to Dot register 8. Together, these on-chip busses comprise more than 32 interconnects just to drive channel 12A. If IC 2 contains 16 channels, hundreds of interconnects are necessary. Registers 6 through 10 cannot therefore be easily physically separated from the drive and sense circuitry 13A through 16A.

Seemingly the only way to repartition the system, eliminate high pin count packages, and reduce heat is to separate current sinks 17A to 17*n* from their associated drive circuitry. While this approach may initially seem attractive, it actually makes matters worse. Specifically, a minimum of 3 connections per current sink is required, one for sensing the current, a second to drive the device, and a third to sense the voltage across the device. So removing current sink from driver IC 2 increases the number of pins on the package for the output channels from 16 pins to 48 pins, tripling the number of pins per channel. In conclusion, the prior art backlighting architecture has no means to eliminate high-pin-count packages.

While eliminating the high cost of high-pin-count packages represents an important and much-needed goal, the cost of the LEDs themselves, not the cost of packaging, is the most significant cost factor in today's state-of-the art LED backlighting systems.

FIG. 2 illustrates a LED backlight system 50 comprising a graphics processor or video scalar IC 54, the source of the video signal in a display or TV, an FPGA or microcontroller (μC) 53, a switch-mode power supply (SMPS) 75, sixteen driver ICs 51A through 51P (collectively referred to as driver ICs 51), each of driver ICs 51 driving sixteen LED strings 57A-57P through 72A-72P. Specifically, driver IC 51A drives LED strings 57A through 57P, driver IC 51B drives LED strings 58A through 58P, etc. As such backlight system 50 represents a 256 string LED drive solution.

As described previously, driver ICs 51 are controlled by a common SPI bus 52 generated by μC 53 in response to video information generated by graphics processor or video scalar IC 54. The microcontroller 53 also generates the Vsync and GSC timing signals. If desired, the PWM brightness data and phase delay may be dynamically adjusted for every channel and LED string uniquely for each and every video frame, so long as the data is written to the driver IC before the next Vsync signal pulse arrives. As such, backlighting system 50 facilitates local dimming capability, reduces power consumption, and enhances image contrast, significantly outperforming uniformly illuminated backlit displays.

Conceptually, system 50 may also dynamically adjust the current in each of the LEDs, but in practice these currents are not changed frequently except during mode changes, e.g. switching between 2D and 3D modes in a HDTV. Specifically, in 3D mode, the LED currents are doubled, the Vsync frequency is doubled, and the PWM pulse duration is halved when compared to normal 2D display mode. The doubling of the frequency is needed to alternatively display the left and right eye information without introducing image flicker. Aside from switching between 2D and 3D modes, the LED currents are not normally adjusted except during calibration at the factory during manufacturing.

As shown in FIG. 2, SMPS 75 generates at least two outputs, a regulated 24V supply 74 used to power driver ICs 51A through 51P, and the high-voltage $+V_{LED}$ supply 73, dynamically varied in response to a current sense feedback (CSFB) signal on line 76A. CSFB line 76A carries the CSFB signal that is generated from CSFB circuitry like that shown in CSFB circuit 5 in system 1. The CSFB signal on line 76A is connected in daisy chain fashion with the CSFB signal on line 76B input to driver IC 51A from driver IC 51B, which in turn is connected with the CSFB signal on line 76C from the prior driver IC, and so on. Each of driver ICs 51A-51P outputs a CSFB signal representing the lowest current sink voltage of its outputs and of the outputs of all the prior drivers in the daisy chain. Each of lines 76A-76P therefore operates at a different voltage, diminishing in value stage by stage as the CSFB signal approaches SMPS 75. As shown, there is no common line summing or analog "OR"ing the feedback signal from the various driver ICs. The final CSFB signal on line 76A therefore represents the lowest current sink voltage and likewise corresponds to the highest LED string voltage in the entire system. The CSFB signal on line 76A that is input into SMPS 75 may be a voltage or a control current. If a feedback current, rather than a voltage, is required, the CSFB voltage signal can be converted into a current by inserting a transconductance amplifier in the feedback signal path 76A. This is illustrated in FIG. 2 by transconductance amplifier 77 shown in dashed lines.

To summarize, backlight system 50 represents a 256 string LED drive solution.

Assuming that there are four series-connected LEDs per string, the total solution embodied by system 50 utilizes 1,024 LEDs. The cost of this would be too high except for the most expensive high-end HDTVs. Assuming that, with adequate thermal design margins, the maximum current for a 16-channel drive IC is 50 mA per channel, such a system would have a total drive current of 51 LED-amps. (The unit "LED-amps" is the product of the total number of LEDs and the current flowing through each of them, respectively. Since the brightness of an LED is proportional to its current, "LED-amps" is a measure of the luminance, i.e. the total brightness, of a backlight system.)

The foregoing discussion indicates that the only way to reduce the cost of the LEDs and still maintain LED backlight brightness at today's standards is to drive fewer LEDs at higher currents. Higher currents, as it will be shown, increase heating within the driver IC. Furthermore, the only way to eliminate high driver IC costs for a given number of LEDs and still maintain the LED-amps is to use fewer driver ICs. This means that more LEDs must be connected in series and that they must operate at higher voltages. As it will be shown, however, connecting more LEDs in series also increases heating in the driver IC.

In short, the desire to use fewer LEDs and fewer driver ICs to lower costs by operating the LED strings at higher currents and at higher voltages is adverse to achieving safe and reliable LED backlighting solutions immune from overheating.

Thermal Management of Integrated LED Drivers

The major cause of heating in LED driver ICs is not in the intrinsic operation of the IC, but due to mismatch in the forward voltage of the LED strings being driven.

Consider the series-parallel network of LEDs 100 shown in FIG. 3A. A current sink 118 conducting current $I_{LED1}$ and biased at a voltage $V_{sink1}$ drives a string of "m" series connected LEDs 101A through 101*m* having a total series voltage of $V_{f1}$. Similarly, current sink 119 conducting current $I_{LED}$, and biased at a voltage $V_{sink}$, drives a string of "m" series connected LEDs 102A through 102*m* having a total series voltage of $V_{f2}$. Likewise an "n$^{th}$" channel with current sink 133 conducting current $I_{LEDn}$ and biased at a voltage $V_{sinkn}$ drives a string of "m" series connected LEDs 117A through 117*m* having a total series voltage of $V_{fn}$. All "n" strings are powered by a common shared high voltage supply $+V_{LED}$ biased at voltage slightly higher than the highest voltage LED string in the system The voltage $V_{sink}$ across any given current sink device is then given by $$V_{sink}=+V_{LED}-V_f$$

Unavoidably, the forward voltage of every string of LEDs will vary and therefore randomly mismatch the other strings of LEDs. This mismatch is a natural consequence of the stochastic variation in LED voltage arising from the LED manufacturing process. Without sorting or filtering the natural distribution, we can make a simplifying assumption that the population of any one LED will follow a Gaussian distribution characterized by a mean and standard deviation. We can approximate the mean forward voltage of a string of "m" series-connected LEDs by the average voltage $V_{fave}$ and its variability by the approximation $$V_{3\sigma m}=V_{3\sigma 1}\mathrm{SQRT}(m)$$

where $V_{3\sigma 1}$ is the 3-sigma standard deviation of the forward voltage across a single LED and $V_{3\sigma m}$ is the 3-sigma standard deviation of the forward voltage across a string of "m" randomly selected series-connected LEDs. This relationship is shown in FIG. 3B where $V_{3\sigma 1}$ is assumed to be 0.6V.

Even in the absence of any channel-to-channel mismatch, there is some minimum voltage $V_{min}$ ever-present across all the current sink devices needed to maintain their operation as controlled constant-current devices. This minimum voltage, similar to the "drop-out" voltage on a linear voltage regulator, is the minimum drain-to-source voltage drop present across the MOSFET and its associated current sensing element within a current sink device below which it can no longer insure that a constant and controlled current will flow in the LED string it drives. With constant improvement, the minimum voltage across a current sink device is now approximately 0.5V.

Even in the absence of any channel-to-channel mismatch, a minimum drop of a $V_{min}$ means every current sink device must dissipate at least $P_{sink}$ (min)≥$V_{min}\cdot I_{LED}$, and an n-channel driver IC will dissipate "n" times that amount. For example, a 100 mA current through the current sink device will dissipate (100 mA)·(0.5V) or 50 mW per channel and a sixteen channel LED driver will therefore necessarily dissipate a total power $P_{total}$ of at least 800 mW with no mismatch in the forward voltage $V_f$ across the respective LED strings.

The actual voltage drop across any given current sink device, however, is normally higher than $V_{min}$. Referring again to FIG. 3A, if we assume that "n" channels of "n" strings of LEDs have an average forward voltage drop $V_{fave}$, and that the in a given channel the power supply is biased at a three-sigma voltage above that average forward drop, plus the minimum voltage drop across the current sink device, i.e. where $+V_{LED}=V_{3\sigma m}+V_{fave}+V_{min}$, then in that channel the above equation becomes $$V_{sink}=+V_{LED}-V_f=(V_{3\sigma m}+V_{fave}+V_{min})-(V_{fave})=V_{3\sigma m}+V_{min}$$

Then the power dissipation in an average current sink device is $$P_{sink}=I_{LED}\cdot(V_{3\sigma m}+V_{min})$$

which means the voltage due to string-to-string mismatch is additive atop the minimum voltage needed to operate the current sink device above dropout. By combining these two equations to calculate the power dissipated in any average current sink device, we see $$P_{sink}=I_{LED}\cdot(V_{3\sigma 1}\mathrm{SQRT}(m)+V_{min})$$

The power dissipation in an "n" channel driver IC is then on average $$P_{total}=n\cdot[I_{LED}\cdot(V_{3\sigma 1}\mathrm{SQRT}(m)+V_{min})]$$

where "n" is the number of integrated channels, "m" is the number of series-connected LEDs in each channel, $I_{LED}$, is the LED current, and $V_{3\sigma 1}$ is the 3-sigma value for a single LED forward voltage.

This relationship reveals that a driver IC can dissipate too much power $P_{total}$ as a result of the current $I_{LED}$, the number of channels "n", or the number of series-connected LEDs "m" in each channel. Because power dissipation involves three independent design variables, it is difficult to envision or represent this relation graphically. Fortunately, rearranging the equation into $$P_{total}=[n\cdot I_{LED}]\cdot[(V_{3\sigma 1}\mathrm{SQRT}(m)+V_{min})]$$

provides insight, revealing that $n\cdot I_{LED}$, is simply the total current $I_{total}$ total being supplied by any given driver IC, i.e. with n-channels each conducting the current $I_{LED}$. So given $$I_{total}=n\cdot I_{LED}$$

then the equation simplifies to $$P_{total}=[I_{total}]\cdot[(V_{3\sigma 1}\mathrm{SQRT}(m)+V_{min})]$$

Thus, for a given system the total power dissipation in a driver IC is the same whether the system includes one LED string conducting 200 mA, two LED strings conducting 100 mA each, or four strings conducting 50 mA each. The total power dissipated in the driver IC is solely a function of the sum total of the currents conducted through the IED strings.

This relationship is illustrated in FIG. 3C where the columns represent the total driver current $I_{total}$ for a driver IC ranging from 200 mA to 1 A and the rows represent the number of series LEDs "m". Each square illustrates the statistically average power dissipation for a driver IC with that design combination.

For example, an LED driver driving two strings of eleven series-connected LEDs (i.e. m=11) with each of the two strings conducting 200 mA (i.e. where n=2, and $I_{total}$=2×200 mA=400 mA), statistically will dissipate an average power of 1 W per driver IC. In general, the higher the number of series connected LEDs "m" and the larger the total driving current [$n\cdot I_{LED}$], the higher the power dissipation. As such the lower right hand corner represents the hottest, highest power condition, while designs in the upper left hand corner represent the coolest, lowest power designs.

Region 159 in FIG. 3C illustrates operating conditions dissipating power less than 1 W, a level easily manageable by printed circuit board (PCB) design to avoid overheating. For example, a two channel driver carrying 150 mA per string (or 300 mA total) can drive strings of 20 LEDs connected in series without overheating. The current can safely be increased to 200 mA per string (or 400 mA in total) if the number of series LEDs is no more than eleven, i.e. m≤11.

At higher power levels, shown by regions 156 and 157, the package and printed circuit board design significantly affects the die temperature, the maximum power dissipation, and the current handling capability of a driver IC. Region 158 represents poor electro-thermal design choices, leading to spurious or constant overheating problems, long term and short term reliability risks, and even fire hazard.

Region 156 illustrates operating conditions requiring a package and PCB design capable of dissipating 1.5 W. An example of such a design is a 60 mA per channel driver powering eight strings often series connected LEDs, i.e. n=8, m=10, $I_{LED}$=60 mA. Delivering a total current of 480 mA, the total power dissipation of such an IC is approximately 1.2 W. While many packages are capable of handling that power, care must be taken to insure that the printed circuit board can carry away that amount of heat to maintain safe, reliable operation. This concern is especially important on single-layer PCB designs, since the circuit board has little thermal mass and no efficient way to perform heat transport away from the driver IC.

Region 157 illustrates operating conditions requiring a package and PCB design capable of dissipating at least 2 W. Such designs require a soldered exposed die pad to conduct heat from the driver IC into the printed circuit board copper traces, and likely require a 4-layer PCB. Multi-layer PCBs, because of their sandwich of copper conductive traces, electrical vias, and solid copper ground planes, intrinsically carry and redistribute heat effectively compared to thinner lower cost PCBs. In more expensive "high-end" HDTVs for example, the demand for a high resolution backlight system demands a greater number of lower current LED strings to enhance image contrast. A 5s16p driver design, i.e. where the number of series connected LEDs m=5, and where the number on integrated channels n=16, can deliver 60 mA or 960 mA of total current to the sixteen LED strings and dissipate 1.84 W, still below the 2 W limit shown. In high-end products multi-layer PCBs represent a small and affordable portion of the total display cost. In many other cases, however, such boards are overpriced for the commodity markets they are meant to serve.

The information in FIG. 3C is displayed parametrically in a semilog graph in FIG. 3D with the total driver IC power dissipation on the y-axis plotted against the number of series connected LEDs "m" on the x-axis, varied parametrically by the total driver current $I_{total}$ shown by curves 161 through 167 at currents of 200 mA, 250 mA, 300 mA, 400 mA, 500 mA, 600 mA, 800 mA and 1000 mA, respectively. The 1 W, 1.5 W and 2 W limits are marked as lines 168, 169 and 170 to delineate the borders of regions 159, 156, 157, and 158 of table 155.

FIG. 3D clearly illustrates that the number of series connected LEDs "m" must be reduced as the current handling capability of the driver IC is increased. At 1.5 W, for example, 600 mA of drive capability limits the maximum number of series connected LEDs to around 11, while at 800 mA, the maximum number of series LEDs is half that amount, i.e. m≤5.

FIG. 3D also illustrates that the package power handling demand rises quickly with increasing current. For a design with 10 series-connected LEDs (i.e., m=10), a 1 W package is limited to 400 mA or total drive current, a 1.5 W package is limited to 600 mA, and a 2 W package and PCB design can only safely deliver 800 mA. In an 8-channel driver at these power levels, the total per channel current, is therefore thermally limited to 50 mA, 75 mA and 100 mA respectively, currents too low to facilitate lower LED count designs—designs where fewer LED strings are driven at higher currents.

Clearly, the current handling capability of multi-channel LED driver ICs is limited. An alternative approach is to use discrete MOSFETs to implement the current sink, and to drive the discrete MOSFETs by an LED controller IC lacking integrated high voltage drivers. This approach, too, is extremely problematic, as described next.

Driving Discrete Power DMOSFETs as Current Sinks

FIG. 4 illustrates a multichip system 200 for driving the LEDs. The controller architecture is similar to that contained in driver IC 2, except that the multi-channel current sink devices, current sensing elements, and voltage protection devices have been removed from a controller IC 202. Controller IC 202 drives multiple discrete transistor components as current sink devices 217A-217*n*, using multiple discrete passive components 228A-228*n* to accurately measure current in the current sink devices 217A-217*n* and in LED strings 203A-203*n*. Additional discrete transistor components 225A-225*n* are optionally employed to clamp the maximum voltage present across the current sink devices 217A-217*n*, especially for operation at higher voltages, e.g. over 100V. For simplicity's sake, only a single-channel set of components comprising discrete current sink device 217A and transistor component 225A, passive component 228A, together driving LED string 203A, are shown. Each of these "components" is a discrete device in a separate package, requiring its only pick-place operation to position and mount it on its printed circuit board. Each set of three discrete components, along with the corresponding string of LEDs, is repeated "n" times for an "n" channel driver solution.

The active current sink device 217A controlled by IC controller 202 comprises a discrete power MOSFET, specifically a vertical DMOSFET 223A with an intrinsic drain to body diode 224A. Vertical DMOSFET 223A cannot be operated near the avalanche voltage of diode 224A or else hot-carrier damage may result, especially during constant current operation. Typical rated breakdown voltages may vary from 30V to 60V. The gate of the DMOSFET 223A embodying current sink device 217A is driven by the DRIVE output of controller IC 202, specifically the output of an amplifier 216A.

Current measurement and feedback in system 200 utilizes discrete passive component 228A, in this case a precision sense resistor 229A. The voltage on sense resistor 229A provides feedback to the ISENSE pin of controller IC 202. The voltage at the ISENSE pin is buffered by an amplifier 219A and ultimately fed into a gate buffer amplifier 216A. This voltage, proportional to the current flowing in current sink DMOSFET 223A, is compared against the output of a D/A converter 215A in amplifier 216A, the output of which is used to set the current flowing in current sink DMOSFET 223A based on the value of Dot register 208 and the reference current Iref established by bias circuit 222 and set resistor 221. Bias supply 222 regulates input voltage $V_{IN}$, e.g. 24V, to a lower voltage Vcc, e.g. 5V. This voltage is then used to power the remaining circuit blocks within IC 202. Combined with external set resistor 221, bias circuit 222 establishes internal reference current Iref used to bias D/A converter 215A and ultimately set the maximum current in DMOSFET 223A. The precision in channel-to-channel current matching is set by sense resistor 229A, and by the voltage offset in amplifiers 219A and 216A. Since there are more sources of error in this multichip approach, trimming and the precision of sense resistor 229A are more stringent than circuits where trimming can be performed in closed loop operation.

As in monolithic system 1, SPI bus interface 204 passes PWM brightness and phase delay signals through registers 209 and 210, respectively, the respective outputs of which are subsequently processed by timing and control unit 211 to pulse the output of amplifier 216A, driving the gate of DMOSFET 223A synchronously with the Vsync and GSC signals.

Above 100V operation, discrete transistor component 225A, embodied by a vertical power DMOSFET 226A with high-voltage drain to body diode 227A, is typically added to protect the current sink DMOSFET 223A from damage. The gate of DMOSFET 226A is biased to a fixed voltage, e.g. 12V, and its source is connected in a source-follower configuration to the drain of current sink DMOSFET 223A and its drain is connected to LED string 203A. As a source-follower, the maximum voltage on the source of DMOSFET 226A is limited to a threshold voltage below its gate bias, i.e. to around 10V. Because source-follower operation limits the maximum voltage on the its source, DMOSFET 226A can be viewed as a "cascode clamp". In this way a lower voltage rating device, e.g. 20V, can be used to realize current sink DMOSFET 223A at a lower cost. Also, since a source-follower operates in its linear region, behaving like a resistor, DMOSFET 226A dissipates much less power than current sink DMOSFET 223A.

The source voltage of "cascode clamp" DMOSFET 226A is also used as the VSENSE input to controller IC 202, feeding the respective inputs of a CSFB amplifier 213A and an LED fault detection comparator 220A. The respective outputs of CSFB amplifier 213A and LED fault detection comparator 220A are in turn connected to a CSFB circuit 205 and an LED fault register 207.

One significant difference between the multichip system 200 and the monolithic driver 1, is that temperature sense circuit 206 can only detect the temperature of IC 202, where no power is dissipated. Unfortunately, the significant heat is generated in discrete current sink DMOSFET 223A, where no temperature sensing is provided. Similarly, the other discrete current sink DMOSFETs 223B-223*n* likewise have no temperature sensing; and these DMOSFETs could overheat without the system being able to detect or remedy the condition.

In multi-chip system 200, reliable operation of discrete current sink DMOSFET 223A depends on its interconnection with resistor 229A and cascode clamp MOSFET 226A. Each channel of LED drive therefore requires three discrete components-transistor component 225A, current sink device 217A and discrete passive component 228A, and three connections between these components and controller IC 202.

To illustrate, FIG. 5A shows a simplified, functional view of the multi-chip system 200. each channel of the LED drive requires a VSENSE, DRIVE and ISENSE line on controller IC 202, plus three discrete components 225A, 217A and 228A comprising cascode clamp DMOSFET 226A, current sink DMOSFET 223A and precision resistor 229A.

FIG. 5B illustrates a multi-chip system 270 that is similar to system 200 but in which an Iprecise circuit 282A has been added to beneficially eliminate the sense resistor 229A and the current mismatch and inaccuracy inherent in amplifiers 216A and 219A. Even the simplified system 270 does not eliminate the need for two discrete device components 225A and 217A per channel and does not reduce the number of pins on IC 271 needed to drive and sense the current and voltage in discrete DMOSFETs 226A and 223A.

So in the case using sense resistors, exemplified by multi-chip system 200, one 16-channel controller IC requires 48 discrete components and 48 pins to drive 16 strings of LEDs. Even in the simplified case using an integrated Iprecise feedback circuit, exemplified by multi-chip system 270, a single 16 channel IC requires 32 discrete components and still requires 48 pins plus 3 ground pins, i.e. 51 pins just to drive 16 strings of LEDs.

FIG. 6A illustrates a top view of an expensive, high-pin-count package 301, containing a die 303, of the kind that is typically needed to support controller IC 202. As shown, package 301 is a 72-pin QFN package comprising 51 output pins and 21 interface and control pins. Such a package, 9 mm×9 mm in area, requires a substantial amount of plastic mold compound, copper and many gold bond wires, and as such is intrinsically expensive. In some cases, LCD manufacturers use single-layer printed circuit board manufacturing technology, in which case the 0.5 mm pin pitch and leadless construction of the QFN package is too advanced for their board assembly capabilities. If so, the customer may demand a leaded package with a minimum pin pitch of 0.8 mm, such as a leaded quad flat package (LQFP). To accommodate 72 pins at a 0.8 mm pin pitch, the package size swells to 14 mm×14 mm and the cost increases accordingly.

Aside from the high package expense, the enormous build of material (BOM) component count of a multi-chip LED driver system 350 is shown schematically in FIG. 6B. Driver system 350 requires an expensive high-pin-count controller IC 356, 16 discrete current-sink DMOSFETs 354, 16 discrete cascode clamp DMOSFETs 353, a microcontroller 357 and an SMPS module 351. Collectively, current sink DMOSFETs 354 comprise discrete devices 354A through 354Q, each packaged in a low thermal resistance package having a heat tab, such as an SOT223 package. No temperature sensing is available in the discrete current sink devices 354A through 354Q.

Collectively, cascode clamp DMOSFETs 353 comprise discrete devices 353A through 353Q, each packaged in a conventional leaded surface-mount package, such as an SOT23 package.

As shown, each LED string 352A through 352Q is connected in series with a corresponding cascode clamp discrete DMOSFET 353A through 353Q and a discrete current sink DMOSFET 354A through 354Q, respectively. LED controller IC 356 connects to the current sink devices 354 through 48 conductive traces 359, connecting to each source, gate, and drain with electrically separate and distinct conductive traces. In the embodiment shown in FIG. 6B, LED controller 356 utilizes the internal current sensing technique of system 270, shown in FIG. 5B, and therefore does not require 16 current sensing resistors.

In summary, today's implementations for LED backlighting of LCD panels with local dimming capability suffer from numerous fundamental limitations in cost, performance, features, and safety.

Highly integrated LED driver solutions require expensive large area dice packaged in expensive high pin count packages, and concentrate heat into a single package. This limits the driver to lower currents, due to power dissipation resulting from the linear operation of the current sinks, and lower voltages, due to power dissipation resulting from LED forward-voltage mismatch, a problem that is exacerbated for greater numbers of series-connected LEDs.

Multi-chip solutions combining an LED controller with discrete power MOSFETs require high BOM counts and even higher-pin-count packaging. Having nearly triple the pin count of fully integrated LED drivers, a sixteen channel solution can require 33 to 49 components and a 72 pin package as large as 14 mm×14 mm. Moreover, discrete MOSFETs offer no thermal sensing or protection against overheating.

What is needed is a cost-effective and reliable backlight system for TV's with local dimming. This requires a new semiconductor chip set that eliminates discrete MOSFETs, provides low overall package cost, minimizes the concentration of heat within any component, facilitates over-temperature detection and thermal protection, protects low-voltage components from high voltages and against shorted LEDs, flexibly scales to accommodate different size displays, and maintains precise control of LED current and brightness.

BRIEF SUMMARY OF THE INVENTION

This disclosure describes methods and apparatus to drive multiple strings of series-connected LEDs for backlighting, display and lighting applications implemented in a manner to avoid and to protect against overheating.

In sharp contrast to the prior art, a LED driver according to this invention is a distributed system, one lacking a central control unit. In the distributed system of this invention, an interface IC translates information obtained from the host μC into a simple serial communications protocol, sending instructions digitally to any number of intelligent LED driver "satellite" ICs connected to the serial bus.

In a preferred embodiment, the serial bus uses a protocol containing parameters specific to LED lighting, and is referred to herein as a Serial Lighting Interface (SLI) bus. Preferably, the SLI bus is connected in "daisy-chain fashion" back to the interface IC so that fault conditions such as an open LED, a shorted LED, or an over-temperature fault occurring in any of the driver ICs can be communicated back to the interface IC and ultimately to the host μC. Each driver IC, in response to its SLI bus digital instructions, performs all the necessary LED driver functions such as dynamic precision LED current control, PWM brightness control, phase delay, and fault detection. These functions are performed locally, in the LED driver IC, without the assistance of the interface IC.

Each LED driver IC also includes an analog current sense feedback (CSFB) input and output signal, connected in a daisy chain with the other driver ICs and with the interface IC to provide feedback to the high-voltage switch-mode power supply (SMPS), dynamically regulating the voltage powering the LED strings. Using the disclosed architecture, a dual-channel LED driver IC can easily fit into a standard SOP16 package or any similar leaded package.

Along with its SPI bus to SLI bus translation responsibilities, the interface IC supplies a reference voltage to all the LED-driver ICs needed to insure good current matching, generates Vsync and grey scale clock GSC pulses to synchronize their operation, and monitors every LED driver IC for potential faults. The interface IC also facilitates voltage-to-current translation of the CSFB signal into an ICSFB signal using an on-chip operational transconductance amplifier (OTA). The interface IC, including all the described functionality, fits easily into an SOP16 package.

BRIEF DESCRIPTION OF THE SEVERAL VIEWS OF THE DRAWING

FIG. 3C is a table showing power dissipation as a function of number of channels "n" and number of series connected LEDs "m".

DETAILED DESCRIPTION OF THE INVENTION

As described in the background section, existing backlight solutions for TVs and large screen LCDs are complex, expensive and inflexible. To reduce the cost of backlight systems for LCD's with local dimming without sacrificing safe and reliable operation clearly requires a completely new architecture that in the very least eliminates discrete MOSFETs, minimizes the concentration of heat within any component, facilitates over-temperature detection and thermal protection, and protects low voltage components from high voltages. While meeting these objectives may alone be insufficient to achieve a truly cost-effective solution able to meet the demanding cost targets of the home consumer electronics market, such an improvement is a necessary first step toward such a goal toward realizing low-cost local dimming.

Multi-Channel LED Driver

To this purpose, a dual-channel integrated array of high-voltage DMOSFETs with integral temperature protection is disclosed in U.S. Provisional Application No. 61/509,047 by R. K. Williams et. al., entitled "Multi-Channel High-Voltage LED Driver with Integrated Protection," which is incorporated herein by reference in its entirety.

Figure 7:
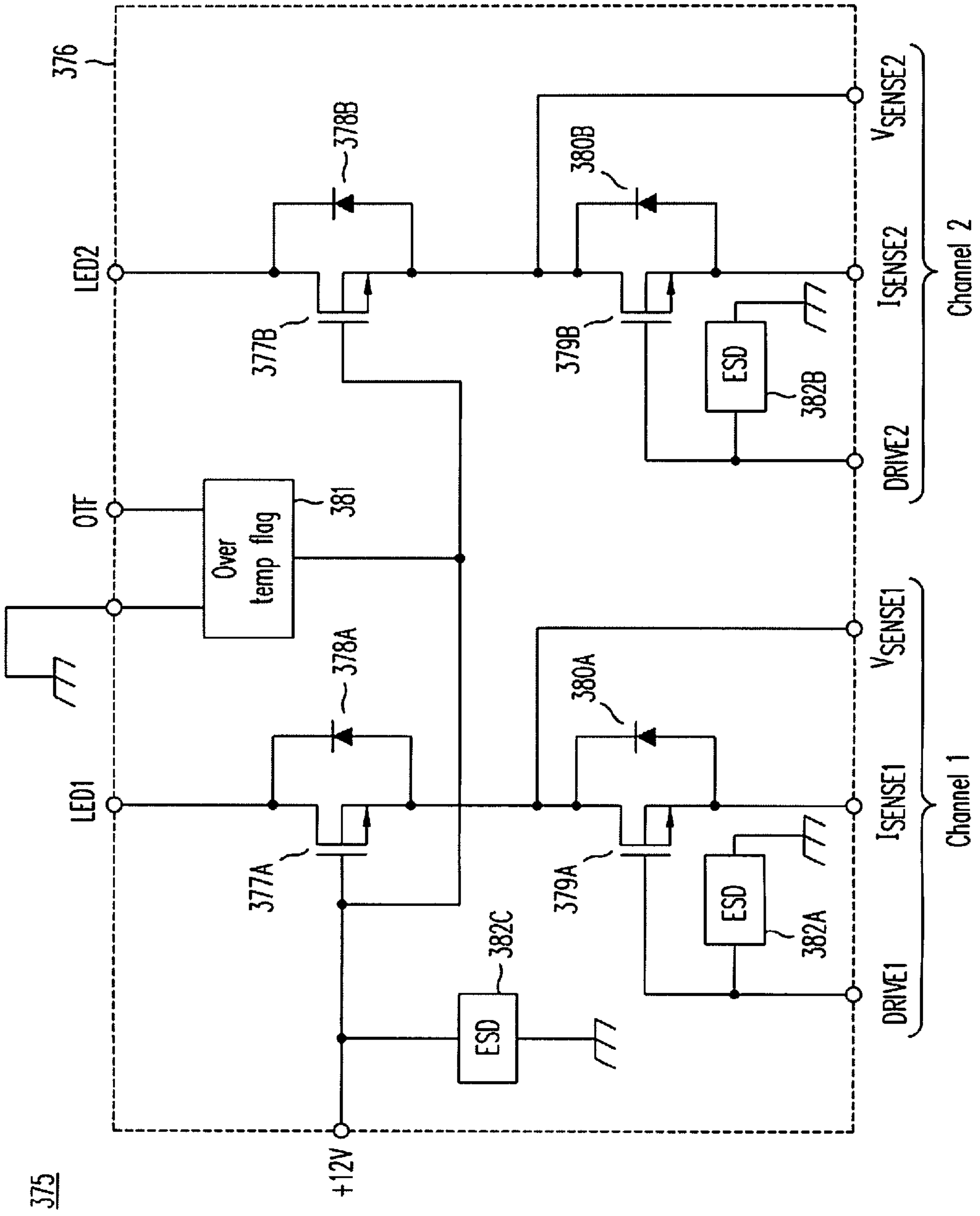
FIG. 7 is a circuit diagram of a cascode-clamped dual-channel LED driver with an integral temperature protection flag.

FIG. 7 is a circuit diagram of a DMOSFET array 376 formed within a dual-channel driver 375 in accordance with the invention. Array 376 includes two high-voltage N-channel cascode clamp DMOSFETs 377A and 378B with corresponding 150V junction diodes 378A and 378B, two N-channel current sink DMOSFETs 379A and 379B with corresponding 20V or 30V junction diodes 380A and 380B, and an integral temperature protection flag circuit 381. As shown cascode clamp DMOSFET 377A is connected in series with current sink DMOSFET 379A. Similarly, cascode clamp DMOSFET 377B is connected in series with current sink DMOSFET 379B. By monolithically integrating several power DMOSFETs into one DMOSFET array 376 and assembling this array 376 in package 375, as shown in FIG. 7, the overall cost per LED channel can be reduced. In this structure, the number of devices and integrated channels must be chosen so as to avoid overheating the IC package 375 at the specified LED current and also to avoid requiring expensive high-pin packages. So long as the cost savings realized by eliminating a number of discrete packages is greater than the additional cost incurred by using one multi-pin package, then an overall cost savings can be achieved.

For example, in a discrete component arrangement each of the current sink DMOSFETs 379A and 379B could be fabricated in an SOP23 package, and each of the cascode clamp DMOSFETs 377A and 378B could be fabricated in an SOP 223 package. In an integrated arrangement, all four DMOSFETs 379A, 379B and 377A, 377B could be fabricated in a single SOP16 package. One SOP16 package is cheaper than two SOT23 packages and two SOT223 packages. In relative ratios, if an SOT23 package costs "x", then its heat tabbed counterpart, the SOT223 package, costs 1.7x because of the added material and manufacturing complexity in forming the heat tab. The total cost of two SOT223 packages and two SOT23 packages is thus:

$$\text{Cost of Discrete Packages}=2x+2(1.7x)=5.4x$$

In contrast, the cost of a sixteen-pin SOP16 package is 2.5x, i.e. two and one-half times that of an SOT23 package, because of its higher pin count and larger package body. The cost of the integrated version is therefore:

$$\text{Cost of Integrated Package}=2.5x$$

Since:

$$\text{Cost of Integrated Package/of Discrete Packages}=2.5x/5.4x=46\%$$

the cost of an integrated package is less than half that of using discrete packages. Clearly some level of integration in beneficial in reducing costs, provided that it doesn't require an excessive number of pins or overly concentrate power dissipation into a single package.

Furthermore, by employing a customized wafer fabrication process designed specifically to integrate DMOSFET arrays based on a low number of photolithographic masking steps, the silicon costs of the integrated solution can be equal to or lower than those of discrete packages. Integrated implementations also improve active area utilization by eliminating the silicon die overhead costs associated with the high-voltage termination and scribe street in small area discrete devices.

Referring again to the array 376 shown in FIG. 7, in operation the cascode clamp DMOSFETs 377A and 377B limit the maximum voltage impressed on the drains of the current sink DMOSFETs 379A and 379B. A cascode clamp automatically facilitates voltage clamping on its source by "turning" off, i.e. no longer being able to conduct significant source current, whenever its source voltage $V_S$ rises to a voltage where the DMOSFET's gate-to-source voltage $V_{GS}$ drops below its threshold voltage Vt. Algebraically, the DMOSFET turns off when $$V_{GS}=V_G-V_S<V_1$$

meaning the maximum source voltage on the cascode clamp is limited to $$V_{clamp}=V_S<V_G-V_1$$

So long that the breakdown voltage $BV_{DSS}$ of the drain-to-body P-N diodes 380A and 380B in current sink DMOSFETs 379A and 379B is greater than the cascode clamp voltage $V_{clamp}$, no avalanche or hot carrier damage will result in the current sink DMOSFETs 379A and 379B. The maximum cascode clamp voltage is, as shown, approximately a threshold voltage lower than the gate bias of cascode clamp DMOSFETs 377A and 377B. For example, a 2V threshold and a 12V gate bias for DMOSFETs 377A and 377B provides a maximum clamp voltage of 10V, far below the onset of impact ionization and hot carrier generation in current sink DMOSFETs 379A and 379B.

All four DMOSFETs 377A, 377B and 379A, 379B are fabricated by known techniques so as to be electrically isolated from the enclosing grounded P-type substrate of the array 376. As a result, DMOSFETs 377A, 377B and 379A, 379B can "float" to potentials above ground. Specifically, the source, gate, and drain terminals of current sink DMOSFETs 379A and 379B are all individually accessible through their corresponding ISENSE, DRIVE, and VSENSE pins to facilitate interconnection with any LED backlight controller IC. Access to the ISENSE1 and ISENSE2 pins of current sink DMOSFETs 379A and 379B supports both resistor-based current sensing or Iprecise current-mirror based sensing and feedback control methods described above. Access to the VSENSE1 and VSENSE2 pins of current sink DMOSFETs 379A and 3798 facilitates enhanced system safety through shorted LED detection.

Figure 1:
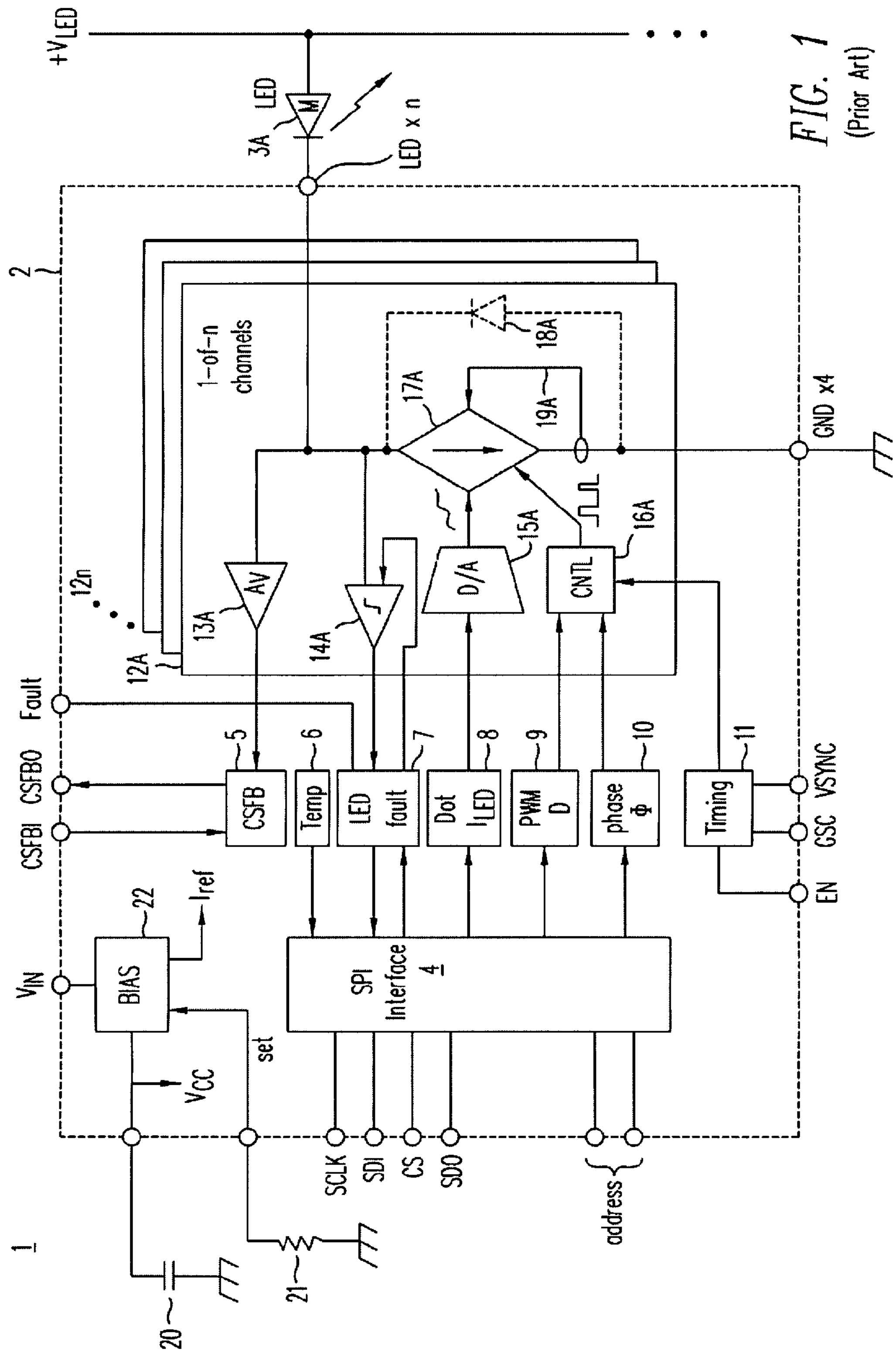
FIG. 1 (Prior Art)
FIG. 1 is a circuit diagram of a prior-art multi-channel LED driver IC for LCD backlighting comprising monolithically integrated current sinks
Figure 2:
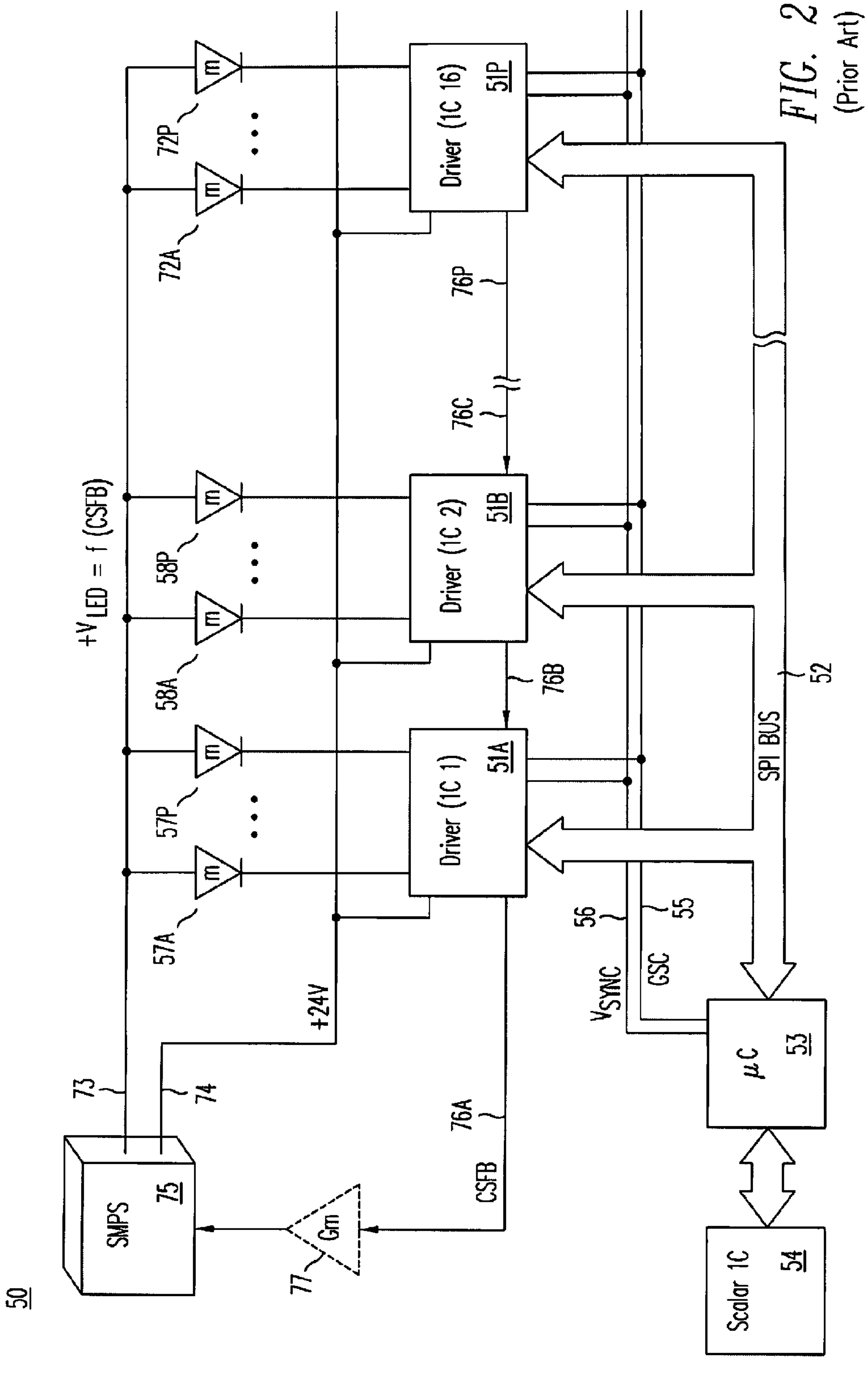
FIG. 2 (Prior Art)
FIG. 2 is a circuit diagram of a prior-art multi-channel LED drive system for LCD backlighting using monolithically integrated current sinks
Figure 3A:
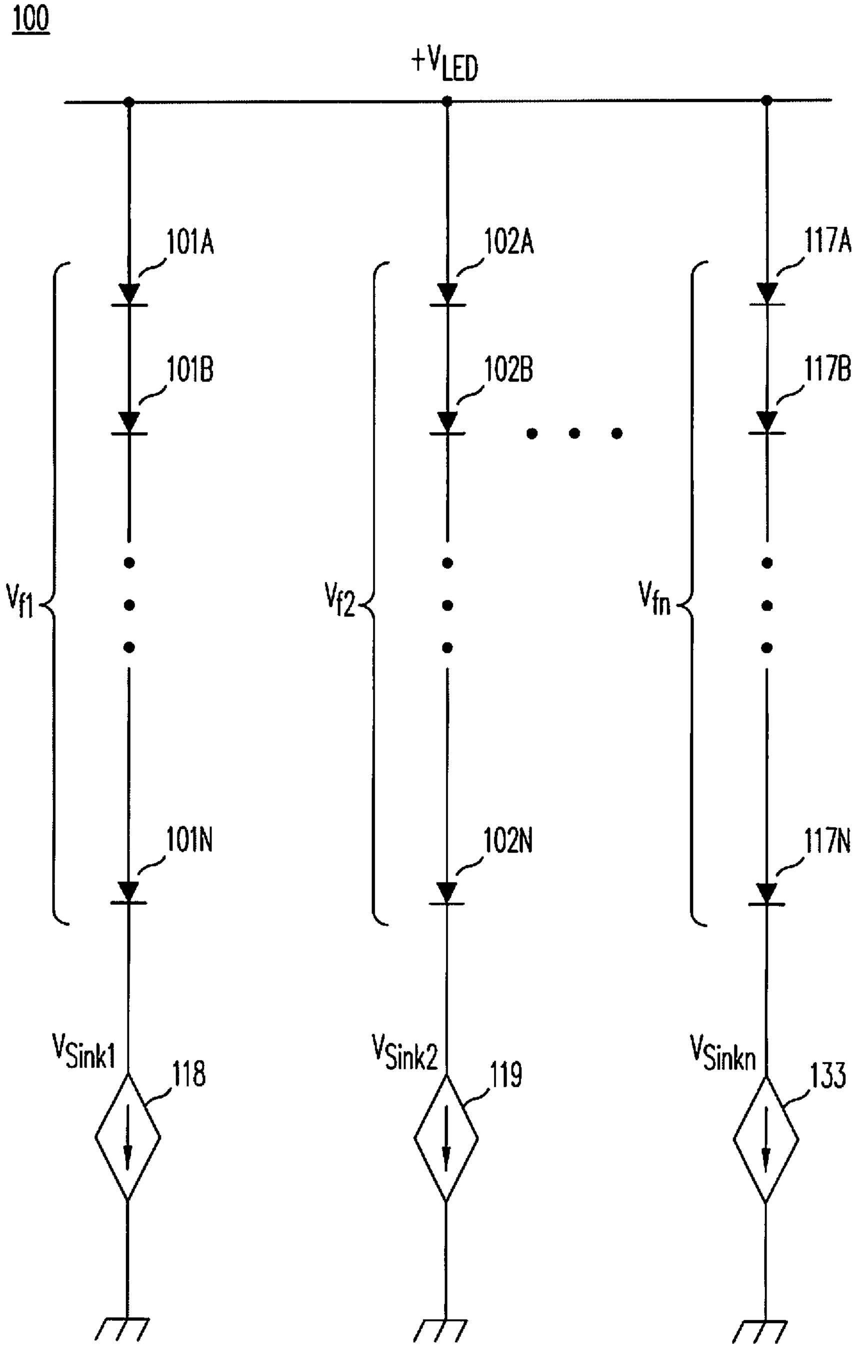
FIG. 3A (Prior Art)
FIG. 3A is a circuit diagram of an equivalent circuit containing a series-parallel network of LEDs.
Figure 3B:
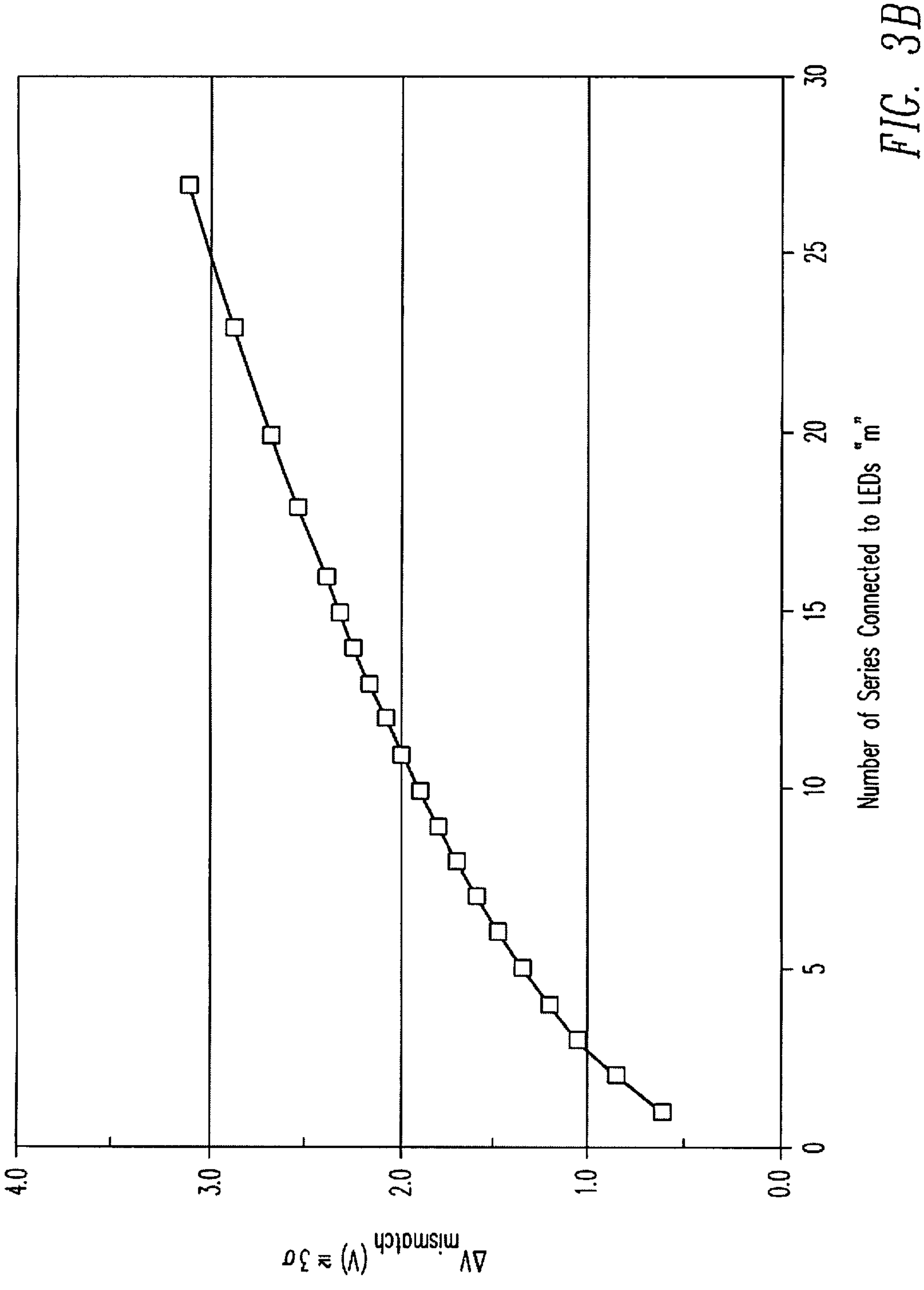
FIG. 3B is a graph showing the standard deviation in forward-voltage as a function of number of series connected LEDs "m".
Figure 3D:
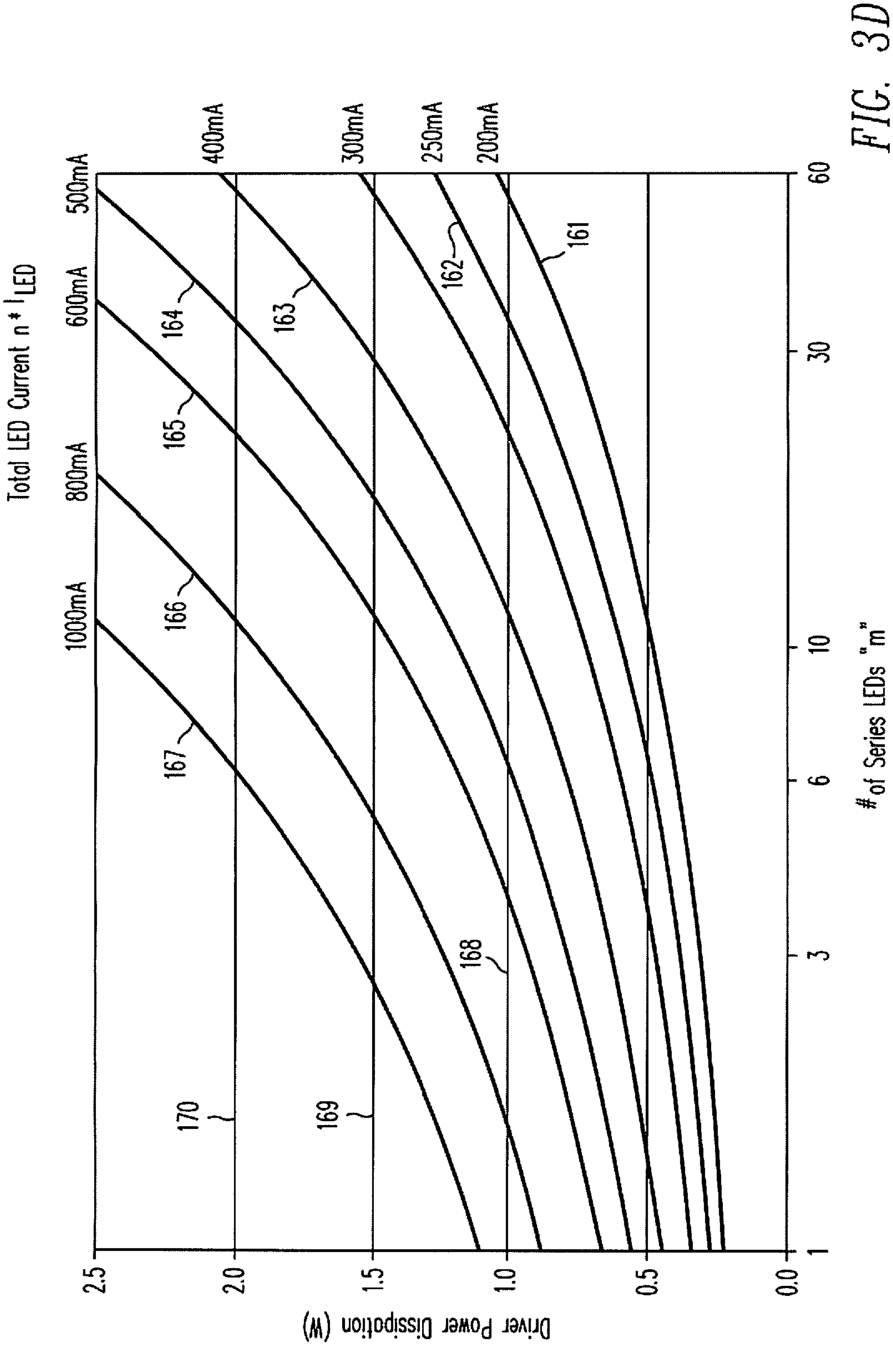
FIG. 3D is a graph showing total power dissipation as a function of the number of series connected LEDs "m" for several values of channel current.
Figure 4:
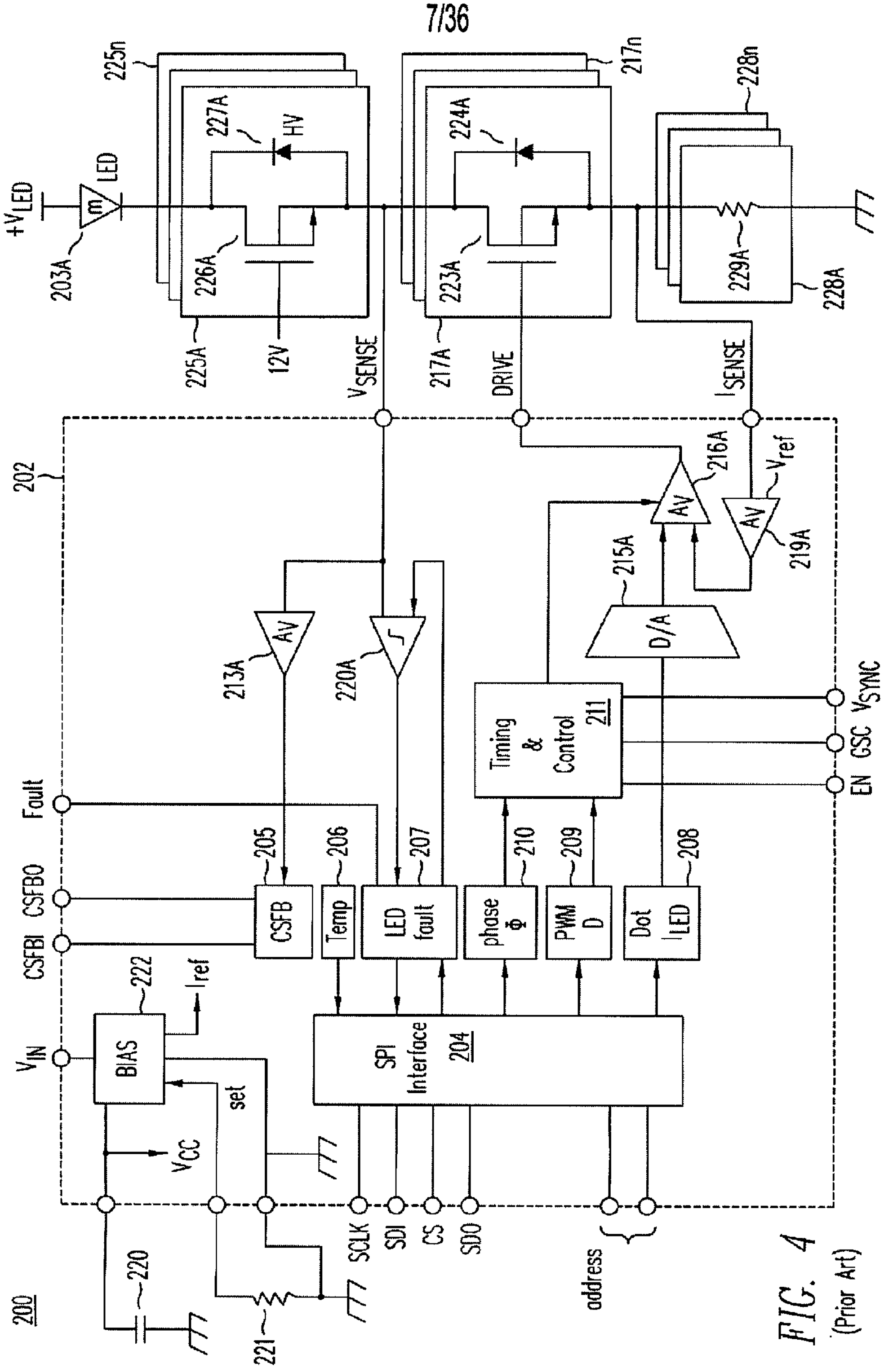
FIG. 4 (Prior Art)
FIG. 4 is a circuit diagram of a prior-art multi-channel LED drive system for LCD backlighting using discrete DMOSFETs as integrated current sinks and protective voltage clamps.
Figure 5A:
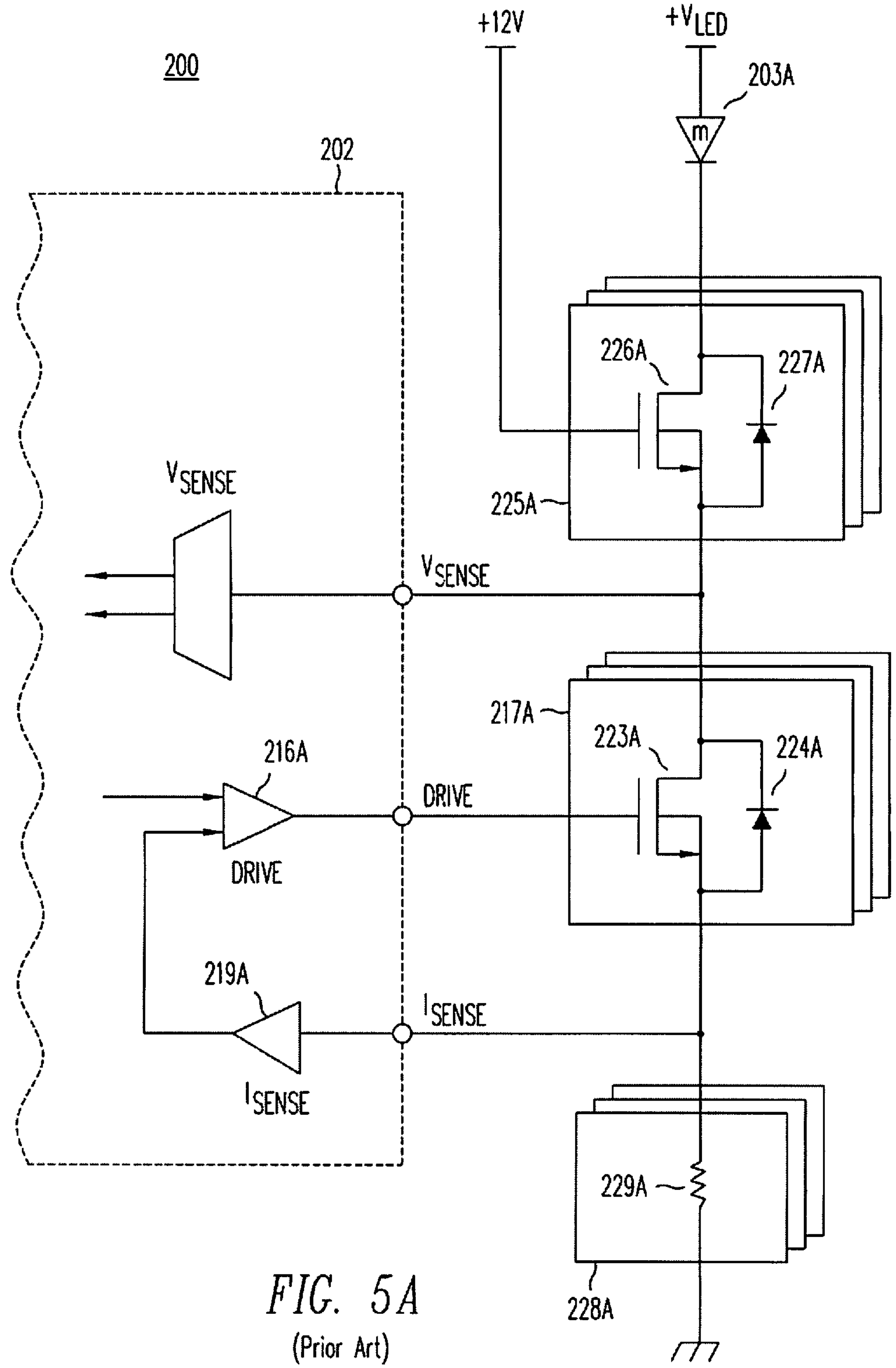
FIG. 5A (Prior Art)
FIG. 5A is a simplified circuit diagram of the prior-art multi-channel LED drive system shown in FIG. 4, containing a sense resistor and sense amplifier.
Figure 5B:
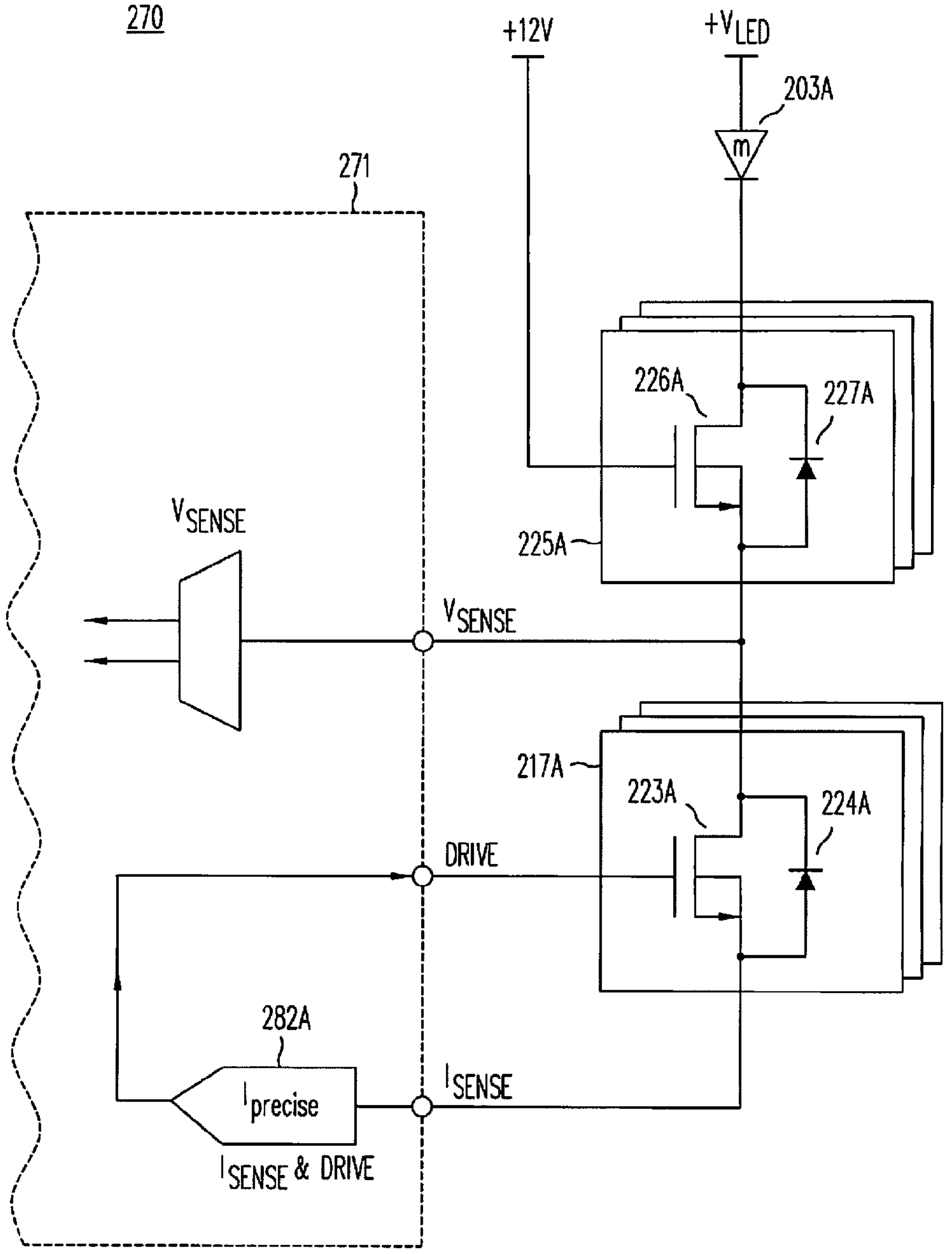
FIG. 5B (Prior Art)
FIG. 5B is a simplified circuit diagram of the prior-art multi-channel LED drive system shown in FIG. 4, except that the circuit contains integrated "Iprecise" current mirror sensing.

The level of integration represented in package 375, while not nearly as complex as that of driver IC 2, shown in FIG. 1 or controller IC 202, shown in FIG. 4, is significant because it not only reduces BOM component counts and associated costs, but it facilitates the inclusion of the integral temperature protection flag circuit 381, a feature not possible using discrete devices. Furthermore, package 375 also facilitates the integration of ESD protection devices 382A, 382B and 382C, which is not possible in discrete DMOSFETs.

Figure 8:
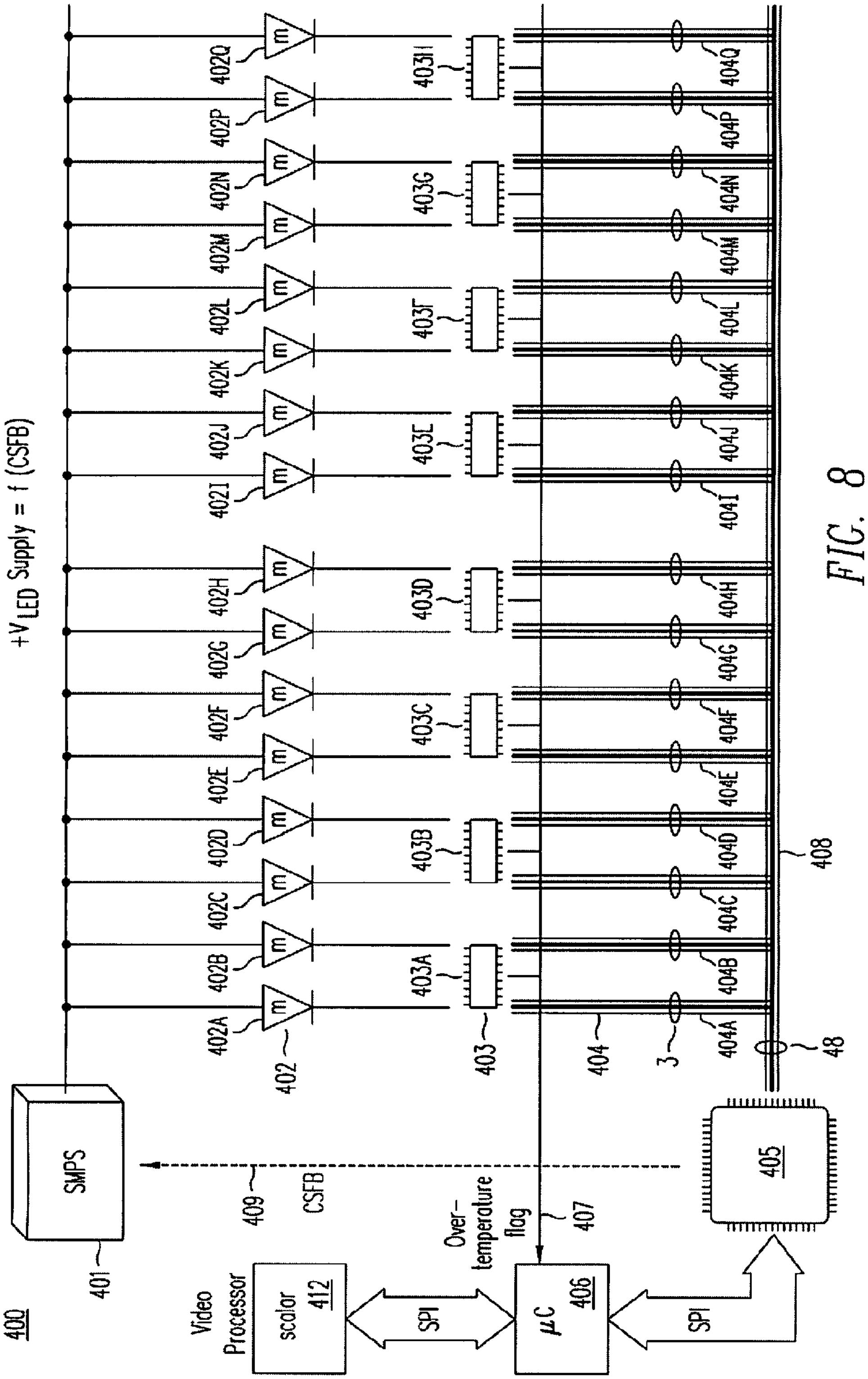
FIG. 8 is a schematic diagram illustrating reduced build-of-materials (BOM) achieved using an LED driver comprising a dual-channel MOSFET array with cascode clamp and integral temperature protection.

This dual-channel DMOSFET array can be used to implement a multi-chip backlighting system 400, shown in FIG. 8, wherein each of the drivers 403 is similar to the driver 375 shown in FIG. 7 and contains a DMOSFET array similar to array 376. An LED controller 405 drives the LED drivers 403 to control the current in LED strings 402 in response to instructions from a microcontroller (μC) 406. Specifically, a first driver IC 403A controls the current in an LED string 402A according to instructions received through a control line 404A comprising the aforementioned ISENSE1, DRIVE1, and VSENSE1 pins for driver IC 403A. Similarly, the driver IC 403A also controls the current in an LED string 402B through according to instructions received through a control line 404B comprising the aforementioned ISENSE2, DRIVE2, and VSENSE2 named pins for driver IC 403A. Thus, six control and sense lines interconnect driver IC 403A to LED controller IC 405.

A second driver IC 403B controls the current in an LED string 402C according to instructions received through a control line 404C comprising the aforementioned ISENSE1, DRIVE1, and VSENSE1 pins for driver IC 403B. Similarly, the driver IC 403B also controls the current in LED string 402D according to instructions received through a control line 404D comprising the aforementioned ISENSE2, DRIVE2, and VSENSE2 named pins for driver IC 403B. Again, six control and sense lines are required to interconnect driver IC 403B to LED controller IC 405.

In similar fashion, driver IC 403C drives LED strings 402E and 402F in response to instructions received through control lines 404E and 404F, driver IC 403D drives LED strings 402G and 402H in response to instructions received through control lines 404G and 404H, and so on.

All in all, as shown in implementation 400, the combination of eight driver ICs 403A-403H drive sixteen LED strings 402A-402Q in response to sixteen control lines 404A-404Q. As described above, each of control lines 404A-404Q includes three control and sense lines for a total of 48 signal paths which are physically embodied as 48 PC board conductive traces 408.

Because each of driver ICs 403A-403H passes distinct VSENSE signals back to controller IC 405, controller IC 405 has the necessary information to determine which of the LED strings 402A-402Q has the highest series forward voltage and to provide feedback signal 409 to SMPS unit 401 to dynamically generate the proper voltage on the $+V_{LED}$ supply rail.

Unlike the multi-chip backlight controller IC 202, shown in FIG. 4, which uses discrete DMOSFETs, the multi-chip backlighting system 400 includes the capability for thermal feedback and temperature protection. Moreover, an over-temperature flag signal is fed back from drivers 403A-403H to microcontroller 406 on a single line 407, using a digital wire "OR" connection, to facilitate over-temperature shutdown protection capability for system 400.

Furthermore, by limiting the number of integrated channels integrated into each of driver ICs 403A-403H, the per-package power dissipation is reduced compared to prior-art multi-channel driver IC 2, facilitating higher current operation and providing more uniform heating across a printed circuit board to avoid "hot spots" that may be visually obvious in an overlaying LCD screen.

As dual channel arrays, driver ICs 403 can be used in any size of display to support any number of channels, offering a fully scalable system architecture limited only by the number of channels supported by LED controller 405.

While driver ICs 403 and system 400 offer distinct advantages over today's prior art systems and conventional architectures, they do not eliminate certain prohibitively high-cost components. In particular, this approach still suffers from high interconnection costs affecting packaging expense and printed circuit board design. In particular a sixteen-channel backlighting solution using the dual-channel DMOSFET concept still requires 48 distinct electrical traces 408 on its driver PCB and demands an expensive LED controller 405 packaged in a large area high-pin-count package with over 50 output and ground pins and over 70 pins in total.

If the number of pins on the controller IC comprising LED controller 405 is to be reduced, it follows logically that some functionality must be removed from the controller IC and relocated to the DMOSFET arrays comprised within drivers 403. Unfortunately, in the present embodiment three pins per channel are mandated for each of drivers 403. This high interconnect overhead burdens the pin requirements of drivers 403 and limits the flexibility of the architecture to scale to larger number of channels or to add new features.

Specifically, for integrating a modicum of functionality, namely providing an indication of an over-temperature condition by a digital signal herein referred to as an over-temperature-flag (OTF), the number of pins required for an array with "$n_{out}$" channels, including power and ground pins, is equal to $3+3\cdot n_{out}$. As described, a dual channel device requires 9 pins, leaving seven pins free in a sixteen-pin package. A three-channel version requires a total of 12 pins, using up nine pins just for DMOSFET drive and sensing, and leaving only four pins free in an SOP16 package. A four-channel version uses essentially every available pin, leaving no possibility for feature expansion.

The Need for a New Architecture for Local Dimming

In summary, today's LED drivers for LCD backlighting with local dimming represent two extremes in system partitioning, one overly integrated and limited thermally, the other requiring too many components and lacking safety features. Both approaches are fundamentally flawed, requiring complex large-area ICs and high pin count packages—solutions limited in performance and prohibitive in cost.

Over integration, i.e. integrating every function monolithically, including the system interface, timing generators, analog functionality and LED drivers, requires complex circuitry and a costly high pin count package to interconnect to the system's host μC. As exemplified by system 1 in FIG. 1, such an approach includes significant digital circuitry to facilitate μC host negotiation and requires a large number of pins devoted to its digital SP1 bus interface and timing input-output (I/O) pins. This digital "overhead" is too expensive to control only a few channels of LED drive. The alternative, integrating a large number of current sink MOSFETs into the IC, concentrates heat and thermally limits the current and voltage drive capability of the IC. Without high-voltage or high current drive capability, the IC cannot be used to reduce the number of LEDs or the number of LED channels in the display, failing to meet a fundamental goal of low cost local dimming.

The second method, completely removing the current sink MOSFETs from the controller IC as exemplified by system 200 in FIG. 4, dramatically increases system BOM component counts, and forces the controller IC into even higher pin count packages, requiring at least three pins per output channel. Separating the current sink MOSFETs from their analog control circuitry reduces current sink accuracy, sacrifices noise immunity, and greatly complicates digital-to-analog conversion needed for dot correction.

Specifically, since commercially available discrete power MOSFETs vary significantly by supplier and over time due to stochastic variability in manufacturing, insuring the matching and absolute accuracy of discretely implemented current sink devices over a specified targeted operating range remains problematic. Driving a discrete power device with a precise gate voltage, for example, does not account for variations in power MOSFET transconductance. To insure a precise digital-to-analog conversion ratio and output current requires the binary weighted converter circuit and that the power MOSFET be calibrated in a "closed loop" to remove all significant sources of error. A "current DAC" circuit therefore benefits from integration of the gate bias network circuit and its associated power DMOSFET, so that calibration and trimming removes all the sources of error and mismatch.

Another problem for the second method of control arises because discrete power-MOSFETs lack temperature sensing or thermal protection capability. While integrating the current sink MOSFETs monolithically into temperature protected MOSFET arrays is beneficial in reducing BOM component count and regaining over-temperature protection lost in discrete implementation, it still does not overcome the need for costly high pin count packages, in some cases having as many as 72 pins and requiring areas as large as 14 mm by 14 mm.

Both prior art methods also do not scale easily across a wide range of display sizes, in small displays integrating more channels than needed, and in the largest displays requiring so many drivers that the SPI bus address requires additional pins.

This invention described herein enables a new cost-efficient and scalable architecture for realizing safe and economically viable LED backlighting systems for large-screen LCDs and TVs with energy efficient local dimming capability. The LED drive system, functional partitioning, and architecture disclosed herein, completely eliminate the aforementioned problems in cost, functionality and the need for high pin count packages. The new architecture is based on certain fundamental premises, including:

1. The analog control, sensing, and protection of the current sink MOSFETs should be functionally integrated together with their associated current sink MOSFETs, not separated into another IC.
2. Basic dimming, phase delay functions, LED current control and channel specific functions should be functionally integrated together with the current sink MOSFETs they control, not separated into another IC.
3. System timing, system μC host negotiations, and other global parameters and functions not unique to a specific channel should not be functionally integrated together with the current sink MOSFETs.
4. The number of integrated channels, i.e. current sink MOSFETs, per packaged device should be optimized for thermal management to avoid overheating while meeting specified LED current, supply voltage and LED forward-voltage mismatch requirements.
5. Communication with and control of multi-channel LED drivers should employ a low-pin count method, ideally requiring no more than three package pins in total on the central interface controller IC as well as on each LED driver IC.
6. The level of functional integration in the interface and driver ICs should be balanced to facilitate the use of low-cost and low-pin-count packages compatible with single layer PCB assembly.
7. Ideally, the system should flexibly scale to any number of channels without requiring significant redesign of the ICs.

The conventional architecture of FIG. 4, i.e. a centralized controller driving a number of discrete power MOSFETs, fails to meet even one of the above goals, primarily because it requires a central point of control, or "command center", for all digital and analog information processing. Necessarily, the command center IC must communicate with its μC host as well as directly sensing and driving every current sink MOSFET. This high degree of component connectivity demands a large number of input and output lines, necessitating high-pin-count packaging.

LED Drivers with Integral Dimming and Fault Detection

Figure 9:
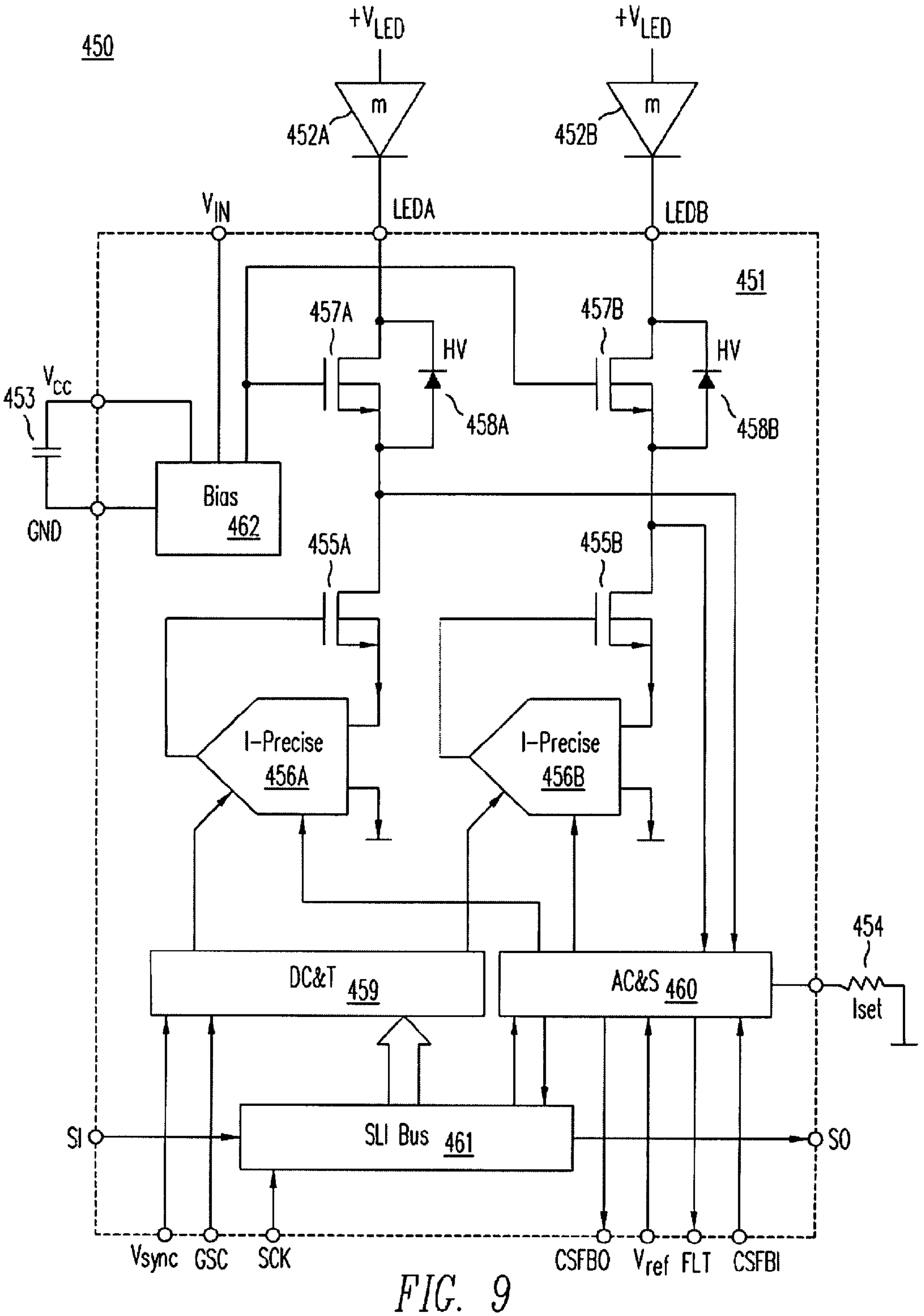
FIG. 9 is a schematic diagram of a cascode-clamped intelligent LED driver IC with serial bus control.

An embodiment of an LED driver 450 according to this invention, formed in an LED driver IC 451, is shown in FIG. 9. LED driver 450 is a dual channel driver comprising integrated current sink DMOSFETs 455A and 455B, cascode clamp DMOSFETs 457A and 457B with integral high-voltage diodes 458A and 458B, I-precise current sensing and gate bias circuits 456A and 456B for accurate current control, an analog control and sensing circuit 460, and a digital control and timing circuit 459. An on-chip bias supply and regulator 462 powers the IC.

One of the channels includes current sink DMOSFET 455A, cascode clamp DMOSFET 457A and I-precise sensing and gate bias circuit 456A, which together drive an LED string 452A. The other channel includes current sink DMOSFET 455B, cascode clamp DMOSFET 457B and I-precise sensing and gate bias circuit 456B, which together drive an LED string 452B.

LED driver 450 provides complete control of two channels of 250 mA LED drive with 150V blocking capability and ±2% absolute current accuracy, 12 bits of PWM brightness control, 12 bits of PWM phase control, 8 bits of current control, fault detection for LED open and LED short conditions and over-temperature detection, all controlled through a high-speed serial lighting interface (SLI) bus shift register 461, and synchronized to other drivers by a common Vsync and grey-scale clock (GSC) signal. In one embodiment cascode clamp DMOSFETs 457A and 4578 are rated at 150V blocking capability, although in other embodiments these devices can be sized for operation from 100V to 300V. The current rating of 250 mA is set by the power dissipation of the package and the mismatch in forward voltage in the two LED strings 452A and 452B.

In operation, LED driver 450 receives a stream of data on its serial input SI pin that is fed into the input of SLI bus shift register 461. The data is clocked at a rate set by a serial clock signal SCK supplied by the interface IC (not shown in FIG. 9). The maximum clock rate for the data depends on the CMOS technology used to implement SLI bus shift register 461, but operation at 10 MHz is achievable even using 0.5 μm linewidth processes and wafer fabs. As long as the SCK signal continues to run, data will shift into SLI bus shift register 461 and ultimately exit the serial out pin SO on its way to the next LED driver in the serial daisy chain (not shown in FIG. 9).

After the data corresponding to the specific LED driver IC arrives in SLI bus shift register 461, the interface IC momentarily stops sending the SCK signal. Thereafter, a Vsync pulse latches the data from the SLI bus shift register 461 into data latches contained within the digital control and timing circuit 459 and into data latches contained within the analog control and sensing circuit 460, the data latches comprising flip flops or static RAM. Also at the time of the Vsync pulse, any data previously written into the fault latches contained within the analog control and sensing circuit 460 will be copied into the appropriate bits of SLI bus shift register 461.

When the interface IC resumes sending the serial clock SCK signal, the read and the write bits stored within SLI bus shift register 461 are moved into the next driver IC in the daisy chain. In a preferred embodiment, the daisy chain forms a loop connecting back to the interface IC. Sending new data into the daisy chain ultimately pushes the existing data residing in the SLI bus shift registers on through the loop and ultimately back to the interface IC. In this manner the interface IC can communicate with the individual LED driver ICs, setting LED string brightness and timing, and the individual driver ICs can communicate individual fault conditions back to the interface IC.

Using this clocking scheme, data can be shifted through a large number of driver ICs at a high speed without affecting the LED current or causing flicker, because the current and timing controlling the current sink DMOSFETs 455A and 455B only changes upon each new Vsync pulse. Vsync may vary from 60 Hz to 960 Hz with the grey scale clock frequency scaling proportionately, typically 4096 times the Vsync frequency. Since Vsync is slow, under 1 kHz, when compared to the frequency of the SCK signal driving the SLI bus shift registers, the interface IC has the flexibility to modify and resend the data, or query the fault latch multiple times within a given V-sync pulse duration.

Commencing on the Vsync pulse, the digital control and timing circuit 459 generates two PWM pulses to toggle the output of I-Precise current sensing and gate bias circuits 456A and 456B on and off after the proper phase delay and for the proper pulse width duration, or duty factor D. I-Precise current sensing and gate bias circuits 456A and 456B sense the current in current sink MOSFETs 455A and 455B respectively and provide the proper gate drive voltage to maintain a target current during the time I-precise circuits 456A and 456B are enabled by the PWM pulses from digital control and timing circuit 459. Operation of the I-Precise circuits 456A and 456B is thus similar to that of a "strobed" amplifier, being pulsed on and off digitally but providing a control function.

The peak current is set globally in all the LED drivers by the Vref signal and by the value of Iset resistor 454. In a preferred embodiment, the Vref signal is generated by the interface IC. Alternatively, the Vref signal may be supplied as an auxiliary output from SMPS 401 in FIG. 8.

The specific current in any LED string can be further controlled through the SLI bus shift register by the Dot latch embedded within AC&S 460 using an 8 to 12 bit word that adjusts the current sink DMOSFET's current to a percentage from 0% to 100% of the peak current value. In this manner, precise digital control of the LED current, emulating the function of a current mode digital-to-analog converter or "current DAC", is possible using this architecture. In LCD backlighting applications, this feature can be used for calibrating the backlight brightness, for improving backlight uniformity, or for operating in 3D mode. If the same driver IC is used to drive red, green, and blue LEDs in LED signs and displays, i.e. displays using LEDs but not using an LCD panel, the Dot setting can be used to calibrate the relative brightness of the LEDs to set the sign's proper color balance.

Referring to FIG. 9, the current flowing through LED string 452A is controlled by current sink DMOSFET 455A and corresponding I-Precise current sensing and gate bias circuit 456A. Similarly, the current flowing through LED string 452B is controlled by current sink DMOSFET 455B and corresponding I-Precise current sensing and gate bias circuit 456B. The maximum voltage impressed upon current sink DMOSFETs 455A and 455B is limited by cascode clamp DMOSFETs 457A and 457B, respectively. So long as the number of LEDs "m" is not too large, the voltage $+V_{LED}$ will not exceed the breakdown voltages of PN diodes 458A and 458B, and the maximum voltage on the current sink DMOSFETs 455A and 455B will be limited to around 10V, one threshold voltage below the gate bias impressed o cascode clamp DMOSFETs 457A and 458B by bias circuit 462, which in this embodiment is 12V. Bias circuit 462 also generates a 5 V Vcc supply voltage to operate its internal circuitry from the 24V VIN input, using a linear voltage regulator and a filter capacitor 453.

The drain voltages on current sink DMOSFETs 455A and 455B are also monitored by analog control and sensing circuit 460 and compared to an over-voltage value stored in a latch within analog control and sensing circuit 460. The over-voltage value is supplied from SLI bus shift register 461. If the drain voltages of current sink DMOSFETs 455A and 455B are below the programmed values, the LED strings 452A and 452B are operating normally. If, however, the drain voltage of either current sink DMOSFET 455A or current sink DMOSFET 455B rises about the programmed value, one or more of LED strings 452A and 452B is shorted, and a fault is detected and recorded for that specific channel. Likewise if either the 1-Precise circuit 456A or the I-Precise circuit 456B cannot maintain the required current in one of LED strings 452A or 452B, i.e. the LED string is operating "undercurrent", this means that an LED in one of strings 452A or 452B has failed open and the circuit continuity has been lost. The corresponding channel is then turned off, its CSFB signal is ignored, and the fault is reported. Sensing this "undercurrent", can be performed by monitoring the output of the gate buffer devices within I-Precise circuits 456A and 456B for saturation. This condition means that the buffer is driving the gate of the corresponding current sink DMOSFET as "full on" as it can. Alternatively, an undercurrent condition can be detected by monitoring the voltage drop across the input terminals of the I-Precise circuits. When the I-Precise input voltage drops too low, the undercurrent condition has occurred, and an open LED fault is indicated.

If an over-temperature condition is detected, a fault is reported and the channel is left on and conducting unless the interface IC sends a command to shut down that channel. If, however, the temperature continues to rise to dangerous levels, analog control and sensing circuit 460 will disable the channel independently and report the fault. Regardless of the nature of a fault, whether a shorted LED, an open LED, or an over-temperature condition, whenever a fault occurs an open drain MOSFET within analog control and sensing circuit 460 will activate and pull the FLT low, signaling to the interface IC and optionally to the host μC that a fault condition has occurred. The FLT pin is a system-interrupt signal informing the system IC whenever a fault condition has occurred in one or more of the LED driver ICs. Normally the line is held high, i.e. biased to Vcc through a high value resistor. Whenever any LED driver experiences a fault condition, either from a shorted LED, an open LED, or an over-temperature condition, the specific LED driver IC pulls the line low by enabling a grounded N-channel MOSFET such as MOSFET 689 in FIG. 14.

Figure 13A:
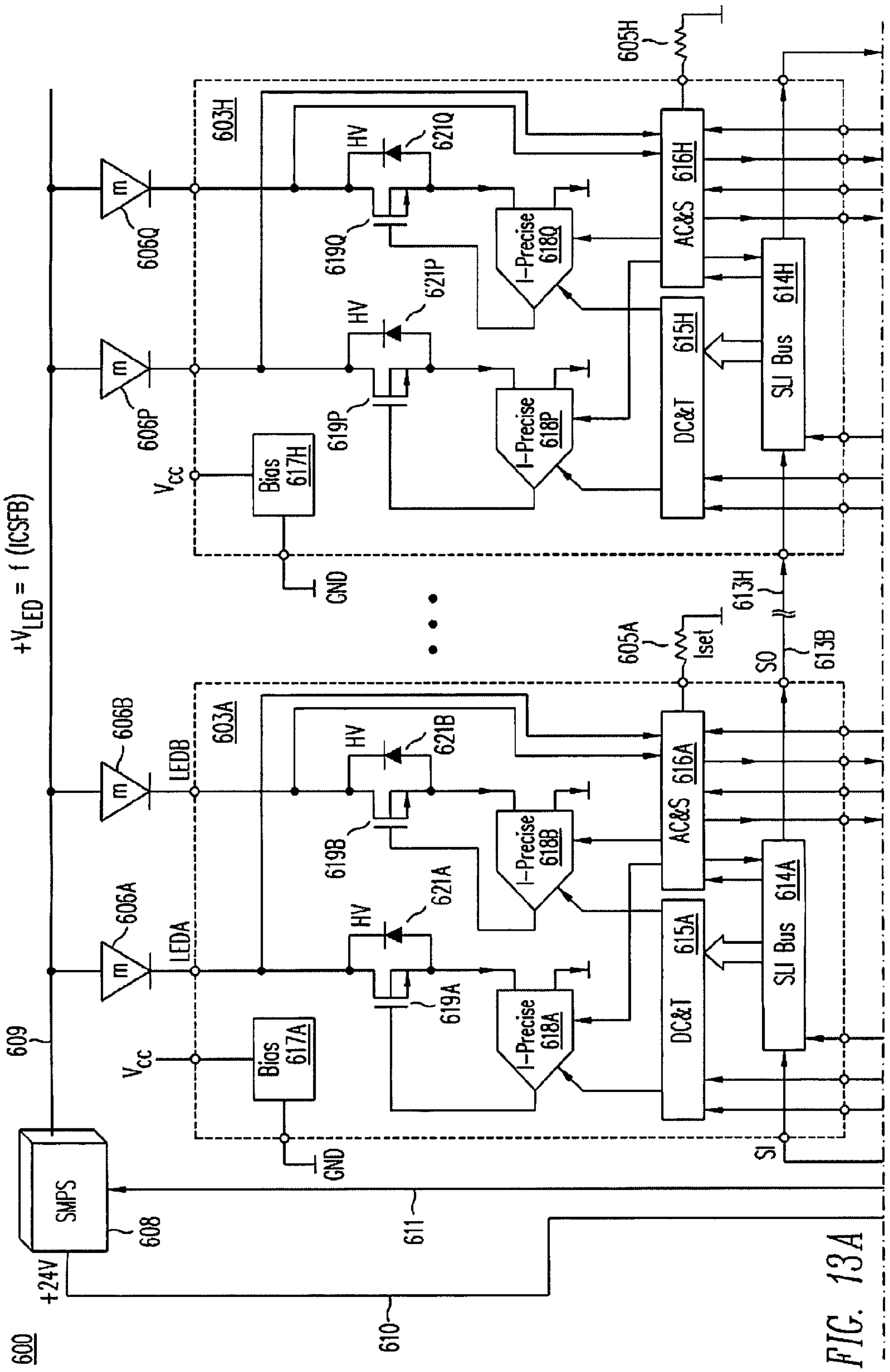
FIG. 13 is a schematic circuit diagram illustrating the significantly reduced build-of-materials (BOM) achieved using high-voltage intelligent LED driver ICs without cascode-clamp MOSFET and with SLI bus control.
Figures 13, 13B:
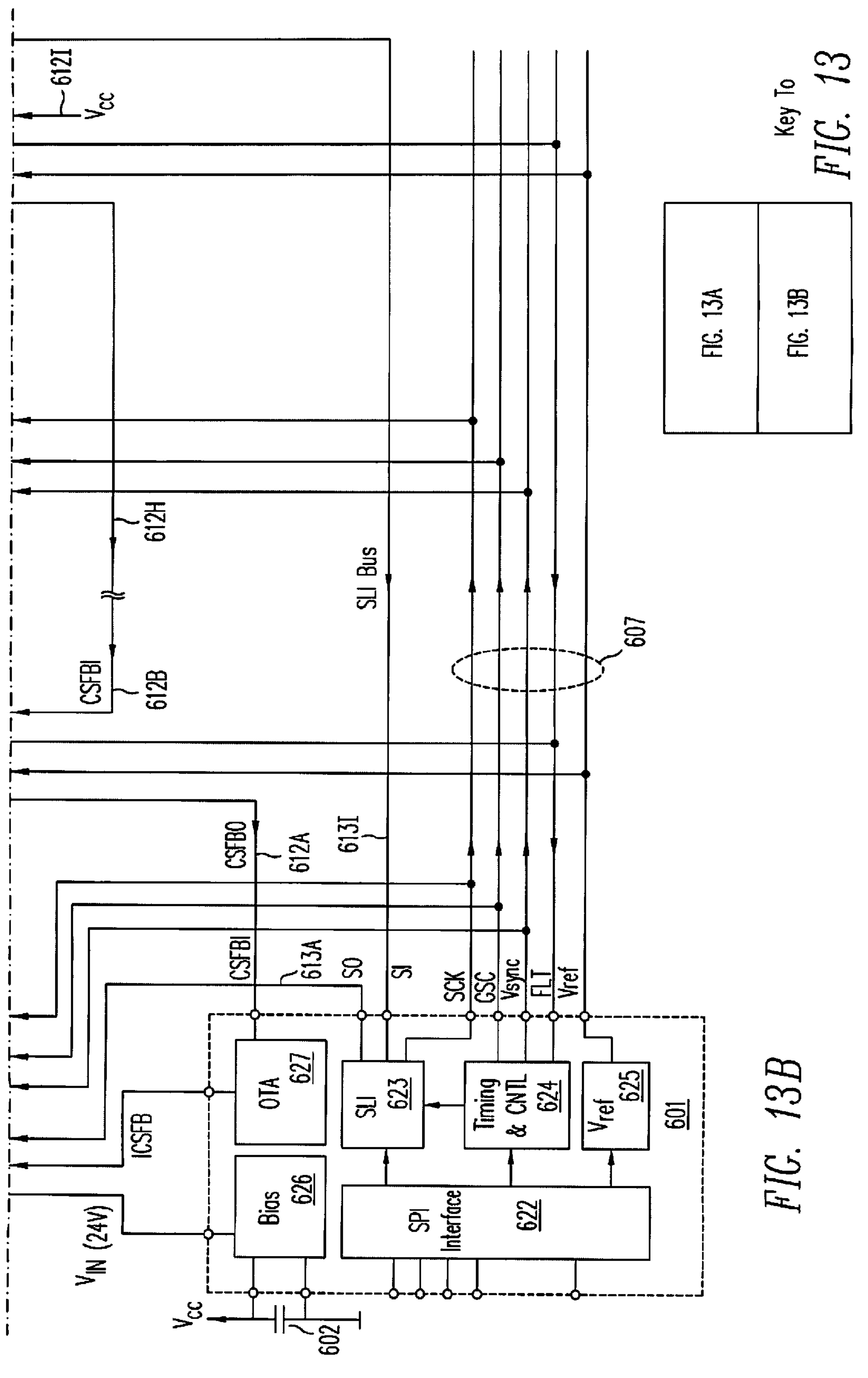

Referring to FIGS. 13A and 13B, after FLT is pulled low, timing and control circuit 624 within interface IC 601 can query the LED driver ICs through SLI bus interface 623 to ascertain what LED driver IC is experiencing a fault condition and what kind of fault has occurred. Interface IC 601 then communicates this information back to the host microcontroller through the SPI bus interface 622 enabling the system to make decisions as to what action, if any, should be taken in response to the fault occurrence. Since the FLT line employs open drain MOSFETs to actively pull the line low in the event of a fault, in the absence of a fault the line is pulled high by a high-value internal resistor. As such, the FLT input to interface IC 601 can be paralleled with the interrupt input pin of the system μC, in which case any fault generated by the LED driver ICs not only informs interface IC 601 of the fault condition, but can also generate an interrupt signal in the μC, alerting it to the condition as well. Using the FLT line therefore provides an immediate indication of the occurrence of a fault in an LED driver IC while the SLI bus and SPI bus are used to gather additional information before deciding what action to take. In this way, full fault management is enabled without the need for a fully integrated driver IC.

Analog control and sensing circuit 460 also includes an analog current sense feedback (CSFB) signal, which is equal to the lowest voltage among the drain voltages of the two current sink DMOSFETs 455A and 455B and the voltage at the CSFBI input pin. The CSFB signal is passed to the CSFBO output pin. In this way, the lowest current sink voltage in LED strings 452A and 452B drop is passed to the input of the next LED driver and ultimately back to the system SMPS to power the $+V_{LED}$ supply rail.

In the manner described, LED driver 450 with integral diming and fault detection capability is realized without the need for a central controller IC.

SLI Bus Interface IC and System Application

Figure 10A:
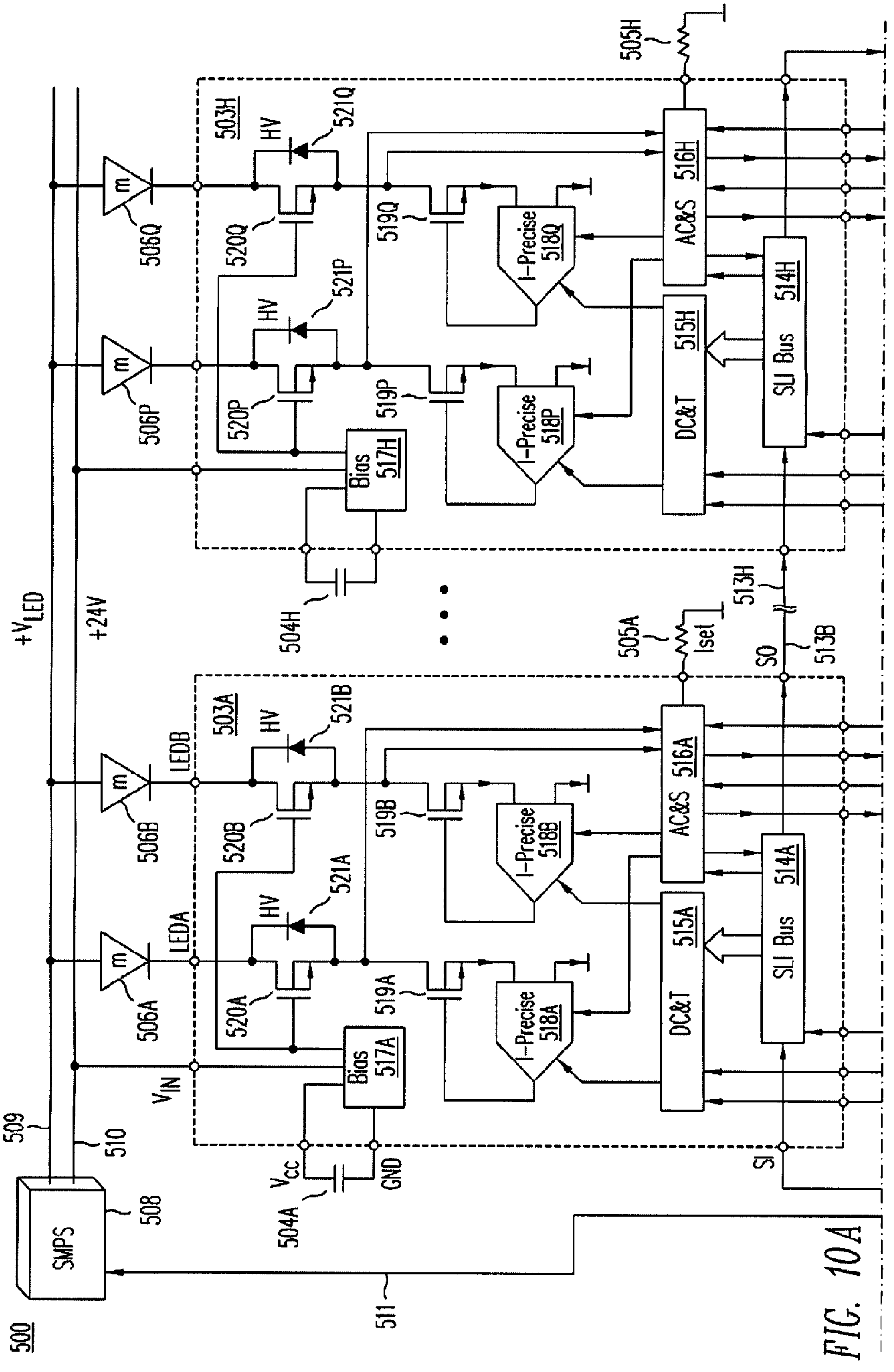
FIG. 10 is a schematic diagram of a multi-channel LED backlight system using intelligent LED drivers with cascode-clamp and a serial lighting interface (SLI) bus shift register.
Figure 10B:
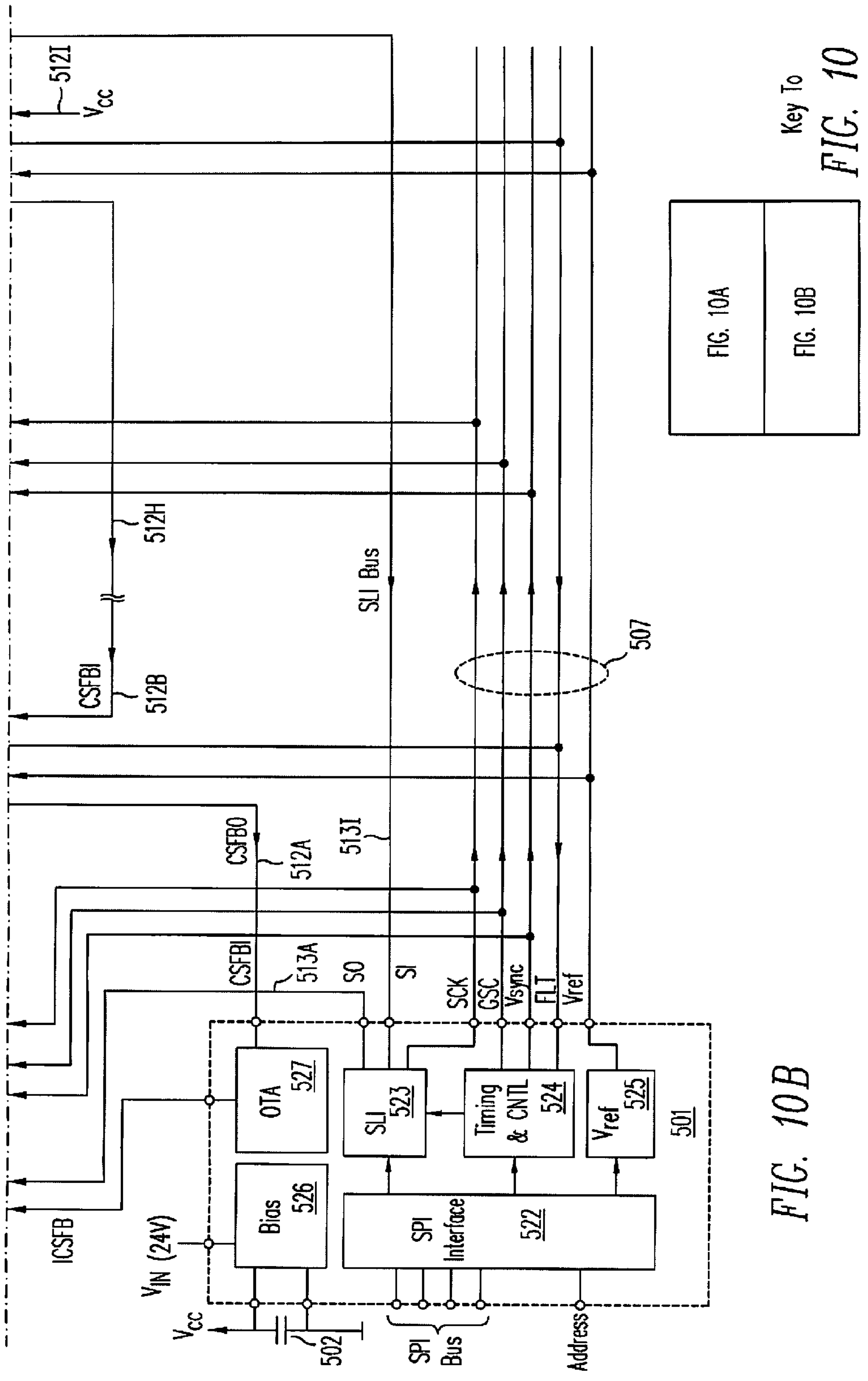

FIGS. 10A and 10B illustrate a distributed multi-channel LED backlight driver system 500 in accordance with this invention. Shown are an interface IC 501 for driving a series of LED driver ICs 503A-503H powered by a common switch-mode power supply (SMPS) 508. Although only LED driver ICs 503A and 503H are shown in FIG. 10A, it is understood that similar driver ICs 503B-503G are located between driver ICs 503A and 503H. Each of LED driver ICs 503A-503H has integral dimming and fault detection capability and is similar to the LED driver 450 shown in FIG. 9.

Five common signal lines 507, comprising three digital clock lines (SCK, GSC and Vsync), one digital fault line (FLT), and one analog reference voltage line (Vref) connect interface IC 501 to LED driver ICs 503A-503H. A timing and control unit 524 generates the Vsync and GSC signals in synchronism with data from a host μC (not shown), received through SPI bus interface 522. Timing and control unit 524 also monitors the fault interrupt line FLT to immediately detect a potential problem in one of LED strings 506A-506Q. A voltage reference source 525 provides a voltage reference to the system globally over the Vref line in order to insure good channel-to-channel current matching. A bias supply unit 526 powers interface IC 501 through a $V_{IN}$ line that is connected to a fixed +24V supply rail 510 supplied by SMPS 508. The +24V supply rail 510 is also used to power LED driver ICs 503A-503H.

In this embodiment, each LED driver IC 503A-503H comprises two channels of high-voltage current control circuitry. For example, LED driver IC 503A includes cascode clamp DMOSFETs 520A and 520B, current sink DMOSFETs 519A and 5198, I-Precise gate driver circuits 518A and 518B, digital control and timing circuit 515A, analog control and sensing circuit 516A and serial SLI bus shift register 514A. Similarly, LED driver IC 503H includes cascode clamp DMOSFETs 520P and 520QB, current sink DMOSFETs 519P and 519Q, I-Precise gate driver circuits 518P and 518Q, digital control and timing circuit 515H, analog control and sensing circuits 516H and serial SLI bus shift register 514H.

An SLI bus 513, comprising signal lines 513A-513I, links the LED driver ICs 503A-503H together into a daisy chain in the embodiment shown in FIGS. 10A and 10B. The serial output terminal of SLI unit 523 (the SO pin of interface IC 501) connects via a signal line 513A to the SI input of LED driver IC 503A, the SO output of LED driver IC 503A connects via a signal line 513B to the SI input of LED driver IC 503B (not shown), and so on. At the end of the daisy chain, the SO output of LED driver IC 503H connects via a signal line 513I to the serial input terminal of SLI unit 523 (the SI pin of interface IC 501). In this manner, SLI bus 513 forms a complete loop, emanating from the interface IC 501, running through each of LED driver ICs 503A-503H and back to interface IC 501. Thus, shifting data out of the SO pin of interface IC 501 concurrently returns a bit string of equal length back into the SI pin of interface IC 501.

SLI unit 523 also generates the SLI bus clock signal SCK as required. Because the LED driver ICs 503A-503H have no addresses, the number of bits clocked through the SLI bus must correspond to the number of devices being driven, with one bit advanced for each SCK clock pulse. The number of devices being driven may be adjusted through software programming the data exchange in SPI interface 522, or by hardware modification to interface IC 501. In this manner the number of channels within system 500 can be varied flexibly to match the size of the display.

Current sense feedback to SMPS 508 relies on an analog daisy chain. The CSFBI input pin of LED driver IC 503H is tied via CSFB line 512I to the Vref line, CSFB line 512H connects the CSFBO output pin of LED driver IC 503H to the CSFBI input pin of LED driver IC 503G and so on. Lastly, CSFB line 512A connects the CSFBO output pin of LED driver IC 503A to the CSFBI input pin of interface IC 501. The voltage level of the CSFB signal drops whenever it passes through one of LED driver ICs 503A-503H driving an associated LED string 506A-506Q that has a higher forward-voltage Vf than the LED strings associated with the LED drivers that the CSFB signal has previously passed through. Since LED driver ICs 503A-503H are arranged in a daisy chain, the CSFB signal ratchets down as it passes from the LED driver IC 503H to the LED driver IC 503A. The CSFB signal in the final CSFB line 512A represents the forward-voltage Vf of the LED string 506A-506Q having in highest Vf in the entire LED array. Operational transconductance amplifier (OTA) 527 converts the final CSFB signal in CSFB line 512A into a current feedback signal ICSFB 511, driving the voltage $+V_{LED}$ on line 509 at the output of SMPS 508 to the optimum voltage for flicker free lighting without excess power dissipation. CSFB lines 512A-512I are sometimes referred to herein collectively as CSFB line 512.

Figure 11:
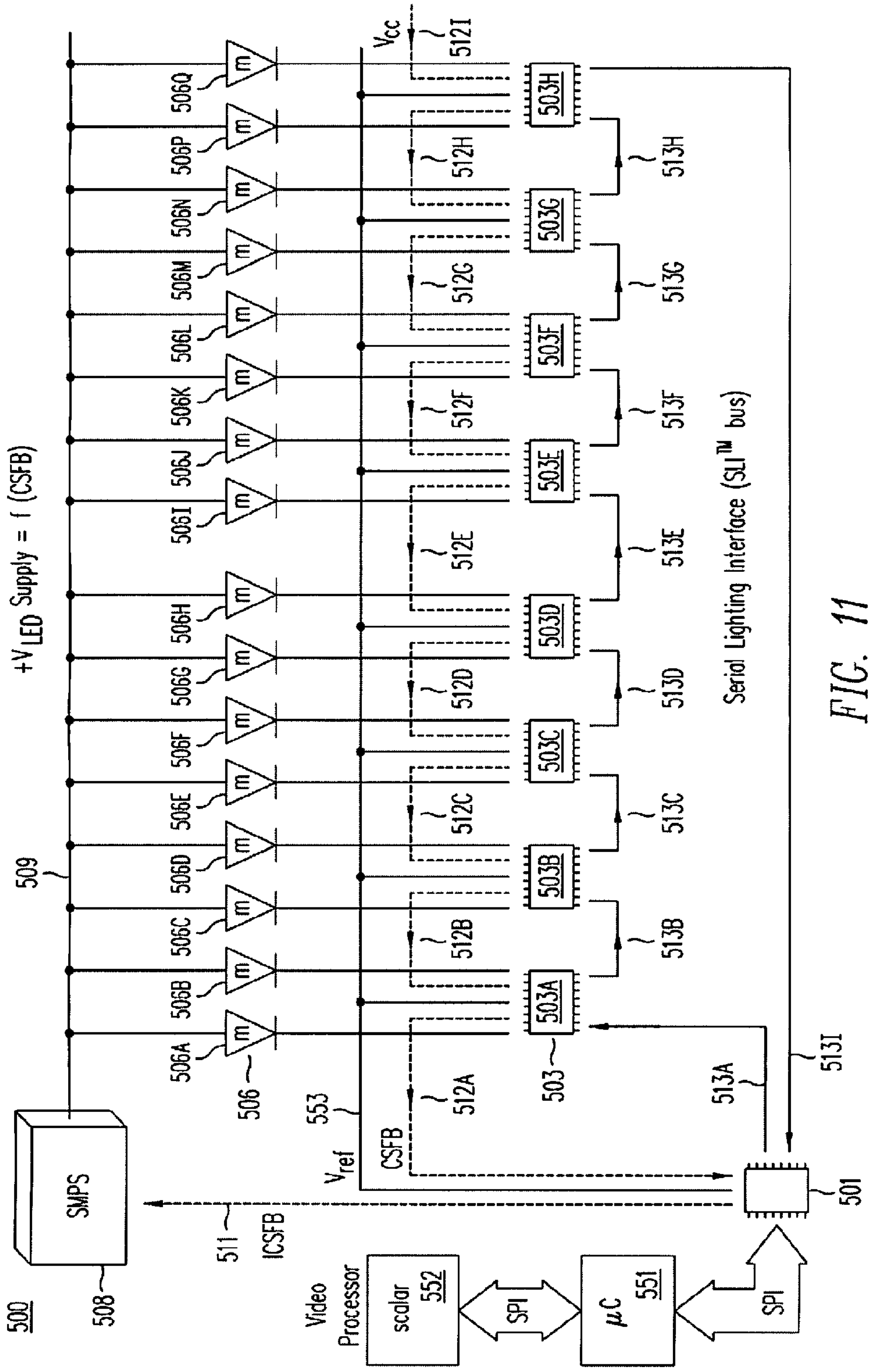
FIG. 11 is a simplified schematic circuit diagram of the system shown in FIG. 10, illustrating the significantly reduced build-of-materials (BOM) realized using cascode-clamped intelligent LED driver ICs with SLI bus control and eliminating a high pin-count interface IC.

The resulting system, shown in the simplified schematic diagram of FIG. 11 achieves independent control and constant current drive of 16 LED strings 506A-506Q using only eight small LED driver ICs 503A through 503H, all controlled by interface IC 501 through SLI bus 513 (including signal lines 513A-513I) in response to a host μC 551 and a scalar IC 552. Only two analog signals are present in the system, a common reference voltage Vref on line 553, and the ICSFB signal 511 that controls the SMPS 508 to produce the $+V_{LED}$ output on line 509. As described above, the ICSFB signal 511 is generated in the interface IC 501 from the CSFB signals on lines 512A-512H. With few analog signals and no discrete DMOSFETs with high impedance inputs, the LED driver system 500 is relatively immune to noise.

Figure 6A:
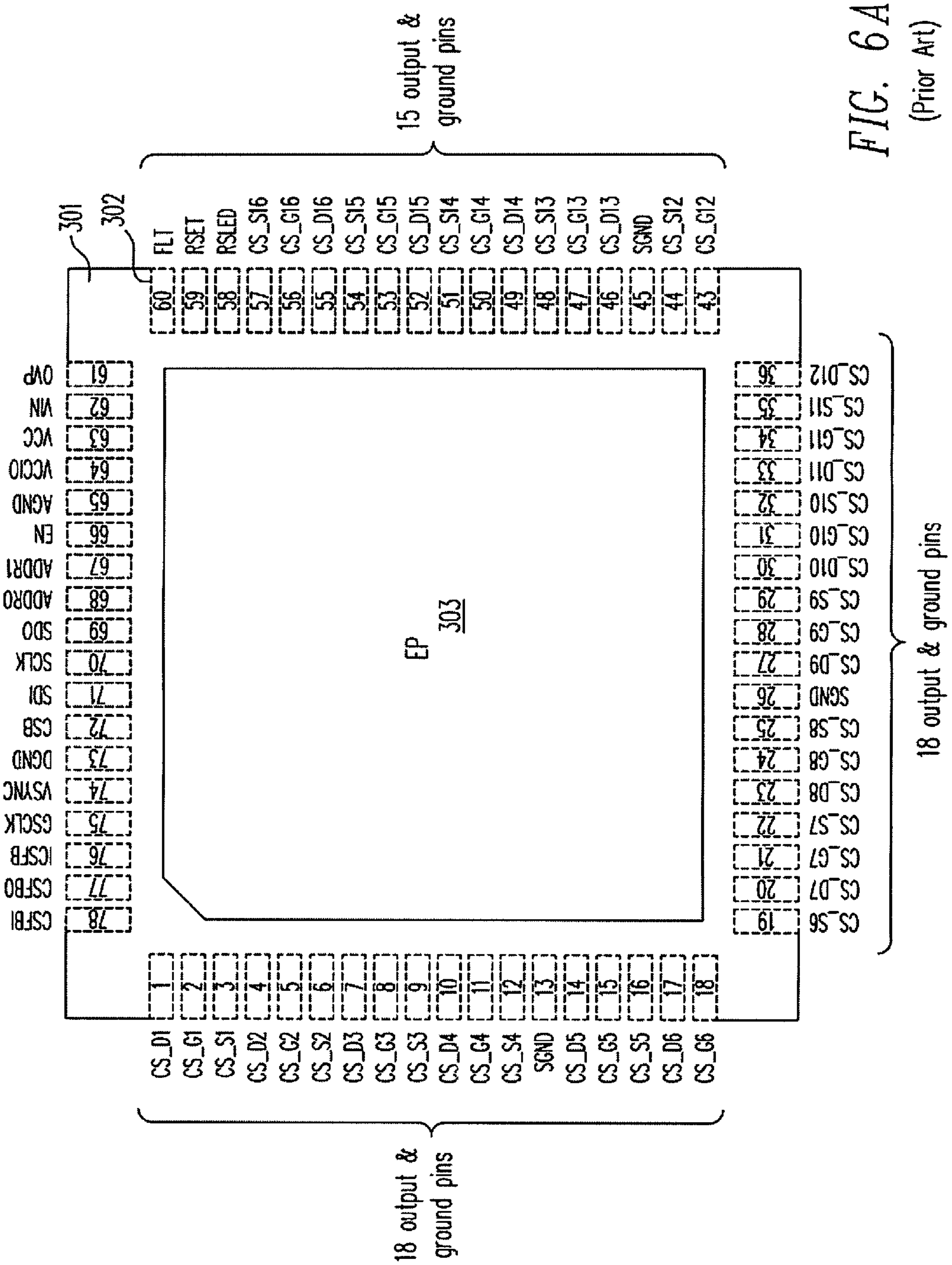
FIG. 6A (Prior Art)
FIG. 6A is a top view of a package of the kind typically needed to support the controller IC shown in FIG. 4
Figure 6B:
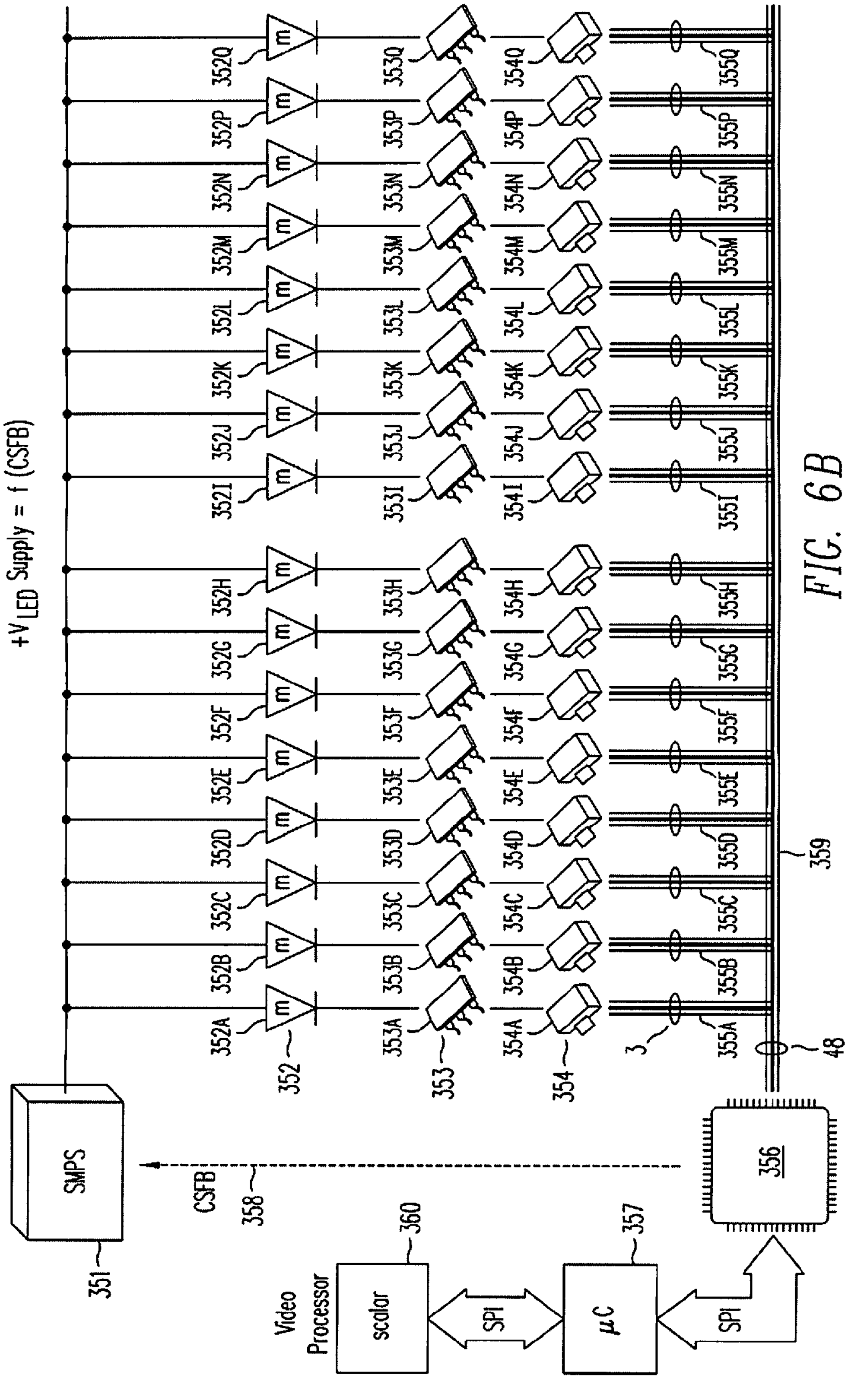
FIG. 6B (Prior Art)
FIG. 6B is a diagram illustrating the number of components required for a 16-channel LED drive system according to the prior art.

As shown in FIG. 11, the LED driver system 500 can be fabricated using only nine SOP16 IC packages (one interface IC and eight LED driver ICs) to drive 16 LED strings. Compared to the multi-chip LED driver system 350 of FIG. 6B, which uses 32 discrete MOSFETs and a 72 pin controller IC, the cost of fabrication is greatly reduced by the new architecture. With significantly fewer components, system reliability is also enhanced. System 500 is also easy to deploy since the proprietary SLI bus protocol is used only between interface IC 501 and the satellite LED drivers 503A through 503H. The μC 551 communicates with the interface IC 501 and the scalar IC 552 via the SPI bus.

Figure 12:
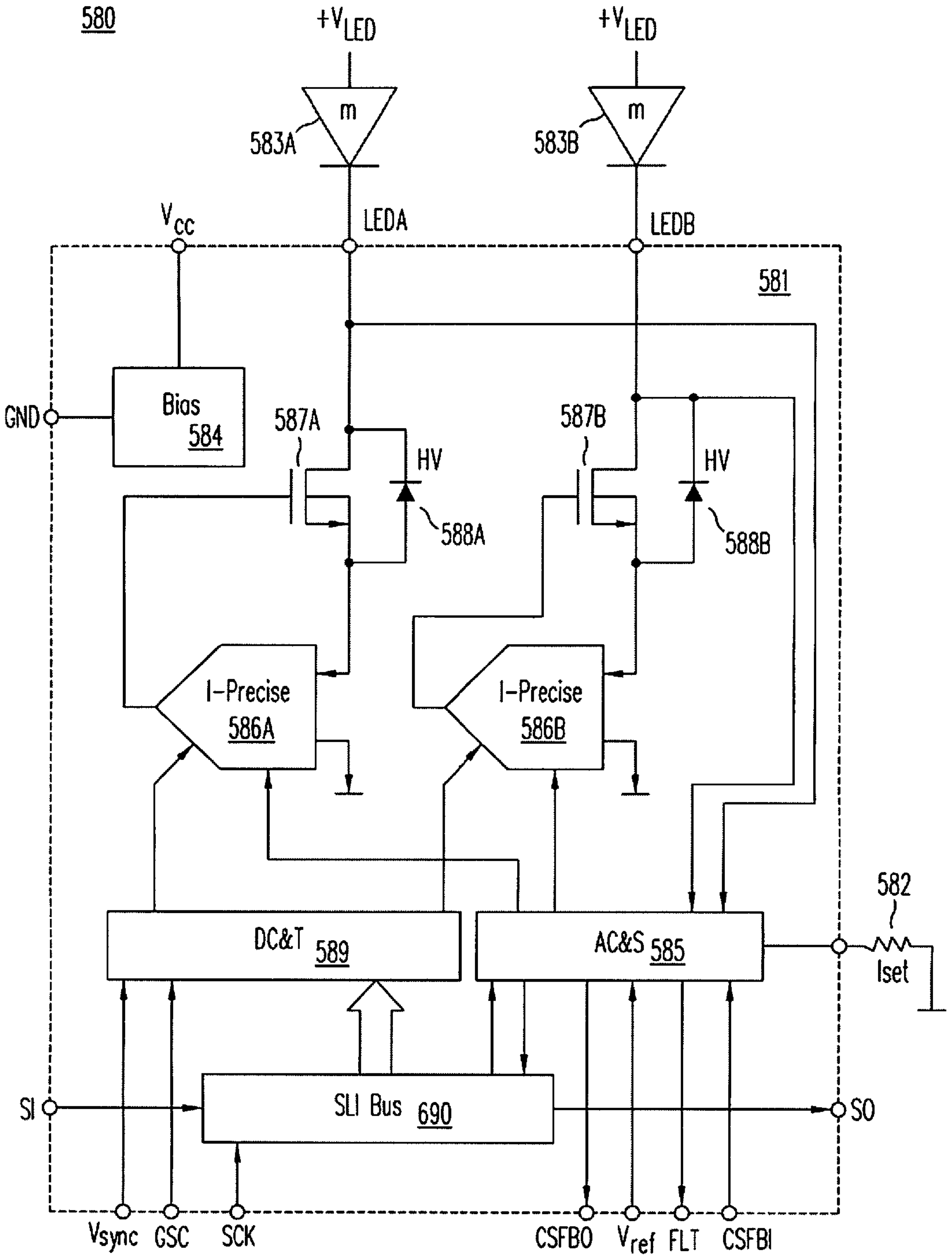
FIG. 12 is a schematic circuit diagram of a dual-channel high-voltage intelligent LED driver IC with a SLI bus shift register.

An LED driver 580 shown in FIG. 12 is similar to LED driver 450 shown in FIG. 9, except the cascode clamp DMOSFETs 457A and 457B have been removed. As a result, the current sink DMOSFETs 587A and 587B must survive the full operating voltage specification of the product. Without the cascode clamp DMOSFETs, the gate oxide rating of the current sink DMOSFETs 587A and 5878 can typically be lowered to 7V, and the need for the +24V rails to power VIN is largely ameliorated. Instead, a bias circuit 584 requires only Vcc as its input, where Vcc is preferably 5V, a supply voltage convenient for powering precision analog circuitry while still supporting modest levels of digital circuitry using small-size logic gates.

LED driver 580 is formed in an IC 581 and has two channels controlling the currents through LED strings 583A and 583B, respectively. The LED driver 580 includes I-Precise gate driver circuits 586A and 586B, a digital timing and control circuit 589, an analog control and sensing circuit 585 and an SLI bus shift register 690, arranged in the same manner as the corresponding components of LED driver 450 in FIG. 9.

FIG. 13 illustrates an LED driver system 600 that is somewhat similar to the system 500 shown in FIG. 10. Corresponding components are numbered "6XX" instead of "5XX" in FIG. 13. The voltage $+V_{LED}$ for LED strings 606A-606Q is supplied by a switch-mode power supply (SMPS) 608, which is controlled by an interface IC 601 in response to signals from LED driver ICs 603A-603H. In contrast to system 500, however, each of LED driver ICs 603A-603H is similar to LED driver IC 581, shown in FIG. 12., i.e., driver ICs 603A-603H do not contain cascode clamp DMOSFETs. Therefore, because the LED driver ICs 603A-603H need only a 5V Vcc input, interface IC 601 can perform the 24V to 5V voltage conversion and distribute its 5V supply rail, i.e. Vcc, to LED driver ICs 603A-603H. By eliminating the need for step-down linear regulation in the LED driver ICs 603A-603H, bias units 617A-617H can be made smaller and the external filter capacitor (i.e., capacitors 504A-504H in FIG. 10) can be eliminated, saving one package pin.

SLI Bus Operation

To eliminate the necessity of high pin count packages, we disclose herein a new series communication bus and protocol specifically designed for driving LEDs in backlight and display applications. The "serial lighting interface" bus, or SLI bus, uses a serial communications method comprising a clocked shift register with a serial input and output, and a clock to control the timing and rate of data transfer.

Figure 14:
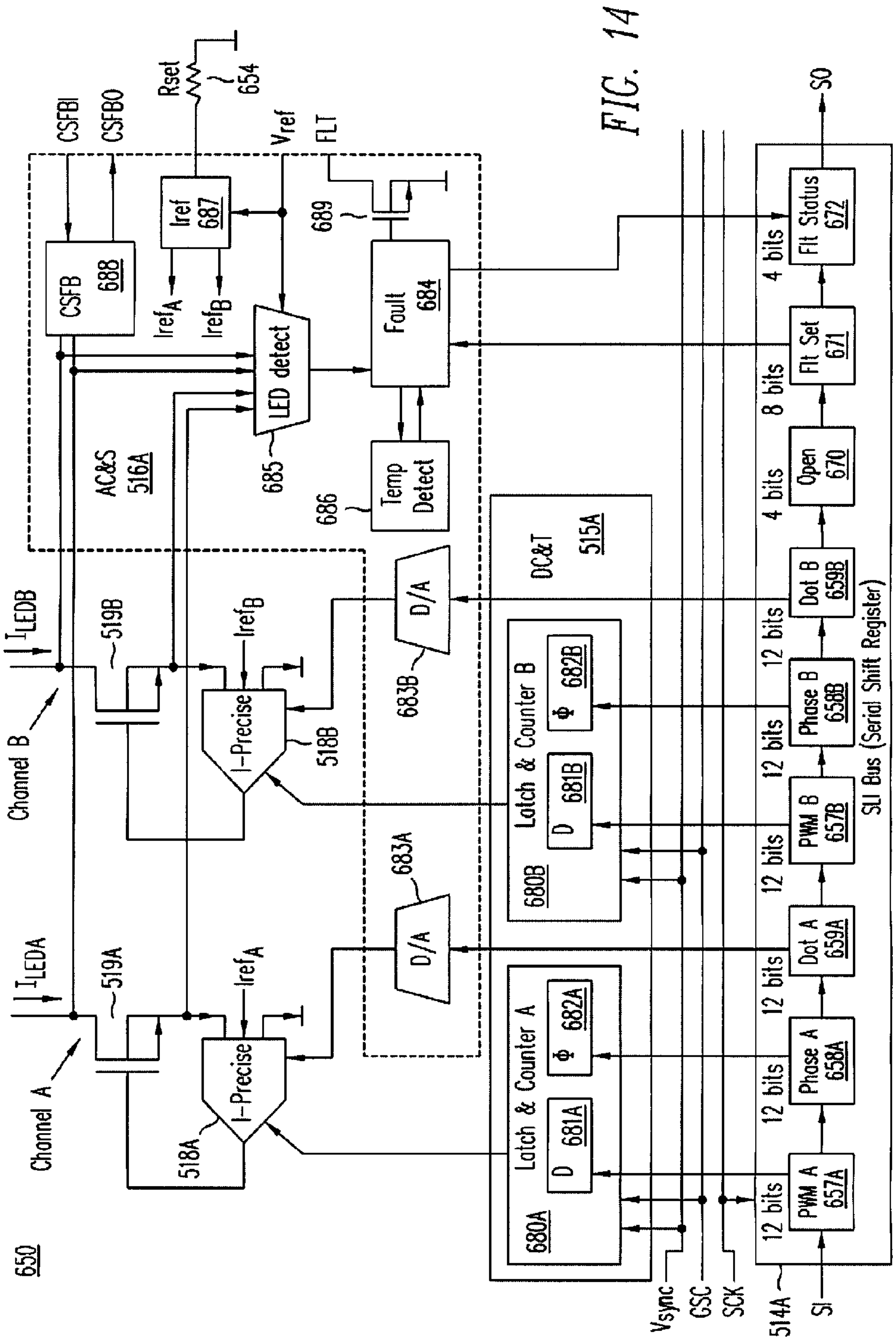
FIG. 14 is a schematic block diagram illustrating an intelligent LED driver with an SLI bus, a digital control and timing (DC&T) circuit and an analog control and sensing (AC&S) circuit.

The operation of the SLI bus is illustrated in FIG. 14, which also provides greater detail of the construction and operation of exemplary embodiments of SLI bus shift register 514A, digital control and timing (DC&T) circuit 515A and analog control and sensing (AC&S) circuit 516A shown in FIG. 10. It will be understood that similar circuitry is used for SLI bus shift registers 514B-514H, digital control and timing circuits 515B-515H and analog control and sensing circuits 516B-516H shown in FIG. 10 and could also be used for SLI bus shift registers 614A-614H, digital control and timing circuits 615A-615A and analog control and sensing circuits 616A-616H shown in FIG. 13. (SLI bus shift registers 514A-514H are sometimes referred to collectively as SLI bus 514.) FIG. 14 shows a dual channel LED driver IC, comprising current sink DMOSFETs 519A and 519B and I-Precise gate driver circuits 518A and 5188, but LED driver ICs controlling a different number of channels may be implemented in a similar fashion.

The circuitry shown in FIG. 14 is mixed signal, combining both digital and analog signals. SLI bus shift register 514A is connected to DC&T circuit 514A by several parallel data busses, typically 12 bits wide, and also connected to AC&S circuit 516A by a variety a parallel data busses ranging from 4 bits to 12 bits wide.

The outputs of DC&T circuit 515A digitally toggle I-Precise gate driver circuits 518A and 518B and current sink DMOSFETs 519A and 519B on and off with precise timing synchronized by the Vsync and grey scale clock (GSK) signals. The current sink DMOSFETs 519A and 519B control the current in two strings of LEDs (not shown) in response to analog signals from AC&S circuit 516A, which control the I-Precise circuits 518A and 518B and hence the gate drive signals for current sink DMOSFETs 519A and 519B. The gate drive signals are analog, and an amplifier with feedback is used to insure that the current in each of current sink DMOSFETs 519A and 519B is a fixed multiple of reference currents $Iref_A$ and $Iref_B$, respectively, which are also supplied by AC&T circuit 516A. Further description of current sink control is detailed later in this disclosure.

While FIG. 14 illustrates only current sink MOSFETs 519A and 519B, the circuitry shown is compatible with either the cascode clamped LED driver 450 shown in FIG. 9 or the high voltage LED driver 581 shown in FIG. 12. To implement the cascode clamped version, two high-voltage N-channel DMOSFETs would be connected in series with current sink DMOSFETs 519A and 519B, with the source terminals of the high-voltage N-channel DMOSFETs tied to the drain terminals of the current sink DMOSFETs 519A and 519B, and with the drain terminals of the high-voltage N-channel DMOSFETs tied to the anodes of the respective LED strings being driven.

In operation, data is clocked into SLI bus shift register 514A through the serial input pin SI at a the rate of the SCK clock signal. This includes 12 bit PWM on time data into registers 657A and 657B for channel A and channel B, 12 bit phase delay data into registers 658A and 658B for channel A and channel B, 12 bit "dot" current data into registers 659A and 659B for channel A and channel B, along with 12 bits of fault information, comprising 8 bits into fault settings register 671 and 4 bits into fault status register 672. Data within these registers are clocked out of the SO pin as new data is clocked in. Suspending the SCK signal holds data statically within the shift registers. The terms "channel A" and "channel B" are arbitrary and are only used to identify the outputs and their corresponding data in the SLI data stream Upon receiving a Vsync pulse, data from PWM A register 657A is loaded into D latch 681A and data from Phase A register 658A is loaded into Φ latch 682A of Latch & Counter A block 680A. At the same time, data from PWM B register 657B is loaded into D latch 681B and data from Phase B register 658B is loaded into ϕ latch 682B of Latch & Counter B block 680B. Upon receiving subsequent clock signals on GSC grey scale clock, counter blocks 680A and 680B count the number of pulses in their ϕ latches 682A and 682B and thereafter enable current flow in I-Precise circuits 518A and 518B, respectively, illuminating the associated LED string in Channel A or B. The channel remains enabled and conducting for the duration of the number of pulses stored in D latch 681A and 681B. Thereafter, the outputs are toggled off and wait for the next Vsync pulse to repeat the process. DC&T circuit 652 therefore synthesizes two PWM pulses to the gates of DMOSFETs 519A and 519B in accordance with the data in SLI bus shift register 514A.

Also synchronized to the Vsync pulse, the data stored in Dot A and Dot B registers 659A and 659B is copied into D/A converters 683A and 683B, setting the current in DMOSFETs 519A and 519B. The D/A converters 683A and 683B are discrete circuits that provide a precise fraction of Iref to set the currents in the associated LED strings. Alternatively, in a preferred embodiment DMOSFETs 519A and 519B have gate widths divided into various sections using binary weighting, and the proper combination of these gate sections is charged to set the fraction of the maximum current desired. The reference current Vref, that represents the maximum channel current, is set by Rset resistor 654 and the Vref input to a reference current source 687.

The fault detection circuitry includes LED fault detection circuit 685, which compares the source voltages of current sink MOSFETs 519A and 519B against the value stored in fault latch circuit 684. The data in fault latch circuit 684 is copied from the fault settings register 671 at each Vsync pulse. Temperature detection circuit 686 monitors the temperature of the LED driver IC 503A, in which the circuitry showing FIG. 14 is included. Detection of a fault immediately triggers open drain fault flag MOSFET 689 to turn on and pull the FLT line low, generating an interrupt. The data in fault latch circuit 684 is written into the fault status register 672 on the following Vsync pulse.

In the manner described, a serial data bus is used to control the current, the timing of LED turn-on, and the duration of LED illumination of a number of LED strings, as well as to detect and report the occurrence of fault conditions in the LED strings. The SLI bus protocol is flexible, requiring only that the data sent through the SLI bus shift register 514A matches the hardware being controlled, specifically that the number of bits sent per driver IC matches the bits required by each driver IC, and that the total number of bits sent for one Vsync period matches the number of bits sent per driver IC times the number of driver IC.

For example, in the circuitry of FIG. 14, the protocol including dot correction, fault setting and fault reporting comprises 88 bits per dual channel driver IC, i.e. 44 bits per channel or LED string. If eight dual-channel driver ICs, controlling sixteen strings of LEDs, are connected into a single SLI bus loop, the total number of bits shifted out of the interface IC and through the SLI bus during each Vsync period is 8 times 88 or 704 bits, less than a kilo-bit. If the SLI bus is clocked at 10 MHz, the entire data stream can be clocked through every driver IC and to every channel in 70.4 microseconds or 4.4 microseconds per channel.

While the serial data bus communicates at "electronic" data rates, i.e. using MHz clocks and Mbits-per-second data rates, the Vsync, or "frame" rate used to control changing the image on the LCD display panel occurs at a much slower pace, because the human eye cannot perceive changing images quickly. The frame rate is both the rate that the image is "written" into the liquid crystal display and the rate that the LED backlight is updated. While most people are unaware of flicker at 60 Hz frame rates, i.e. sixty image frames per second, in A versus B comparisons, to many people 120 Hz TV images appear more "clear" than 60 Hz TV images, but only using direct comparisons. At even higher Vsync rates, e.g. 240 Hz and up, only "garners" and video display "experts" claim to see any improvement, mostly manifest as reduced motion blur. It is the large ratio between electronic data rates and the relatively slow video frame rate that makes serial bus communication to the backlight LED drivers possible.

For example, at 60 Hz, the each Vsync period consumes 16.7 milliseconds, orders-of-magnitude longer than the time needed to send all the data to all the driver-ICs. Even in the most advanced TVs running with an 8× scan rate and in 3D mode, at 960 Hz each Vsync period consumes 1.04 milliseconds, meaning up to 236 channels can be controlled in real time. This number of channel s greatly exceeds the driver requirements for even the largest HDTVs.

The 88-bit per dual-channel "fat" protocol used in the SLI bus shift register 514A of FIG. 14 enables the interface IC to write or read all the data in every register of every channel once during every Vsync period. If a reduced data protocol is used, i.e. a protocol requiring fewer bits per channel, sending data to every channel takes even less time. Since the fat protocol has no timing limitations because of the relatively slow Vsync refresh rate, there is no data rate benefit. Using fewer bits in the serial communication protocol does however reduce the size of the digital shift registers and data latches in the driver ICs, reducing chip area and lowering overall system cost.

Figures 15, 15A:
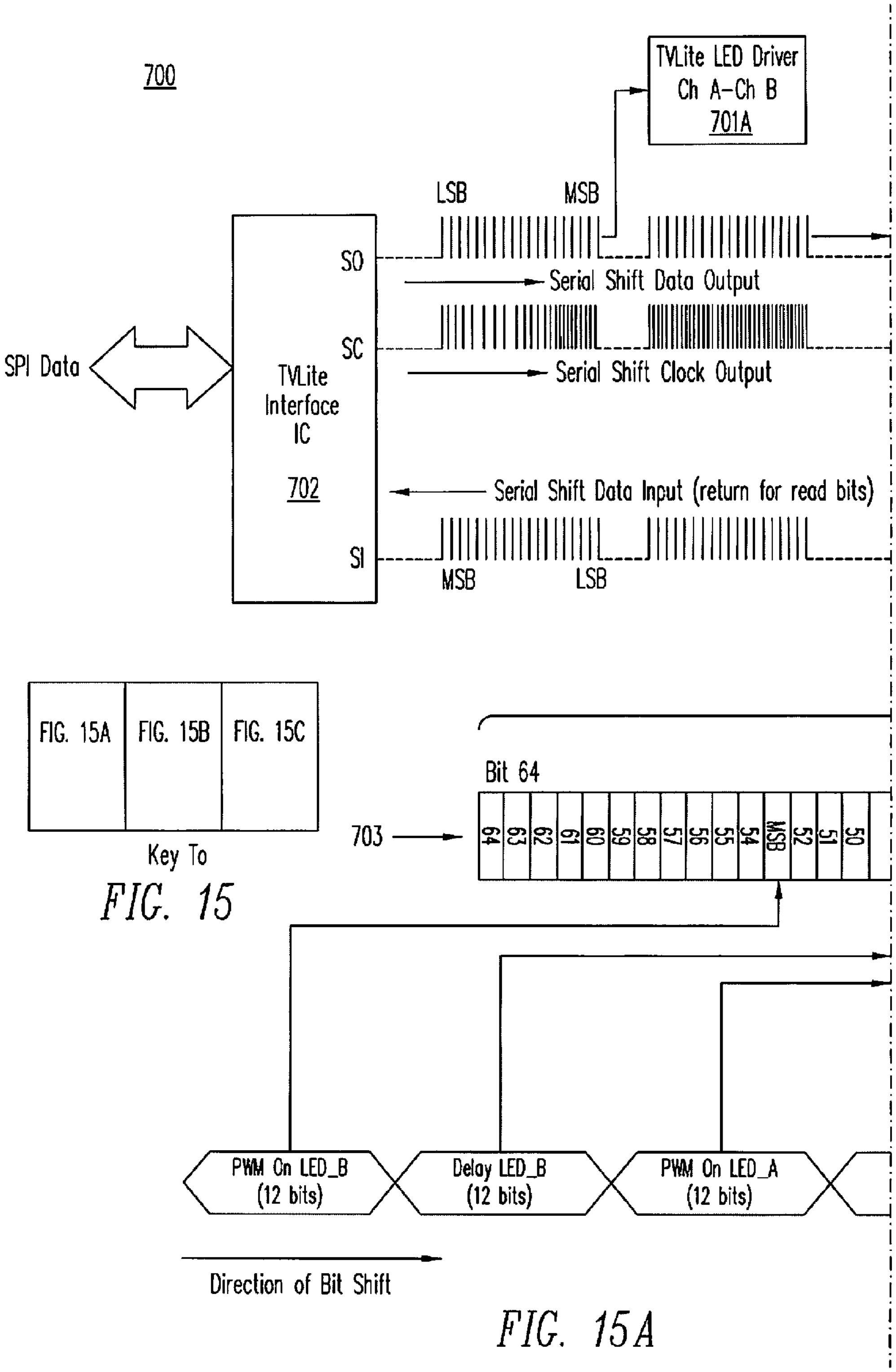
FIG. 15 is a timing diagram for an SLI bus controlling multiple LED driver IC.s
Figure 15B:
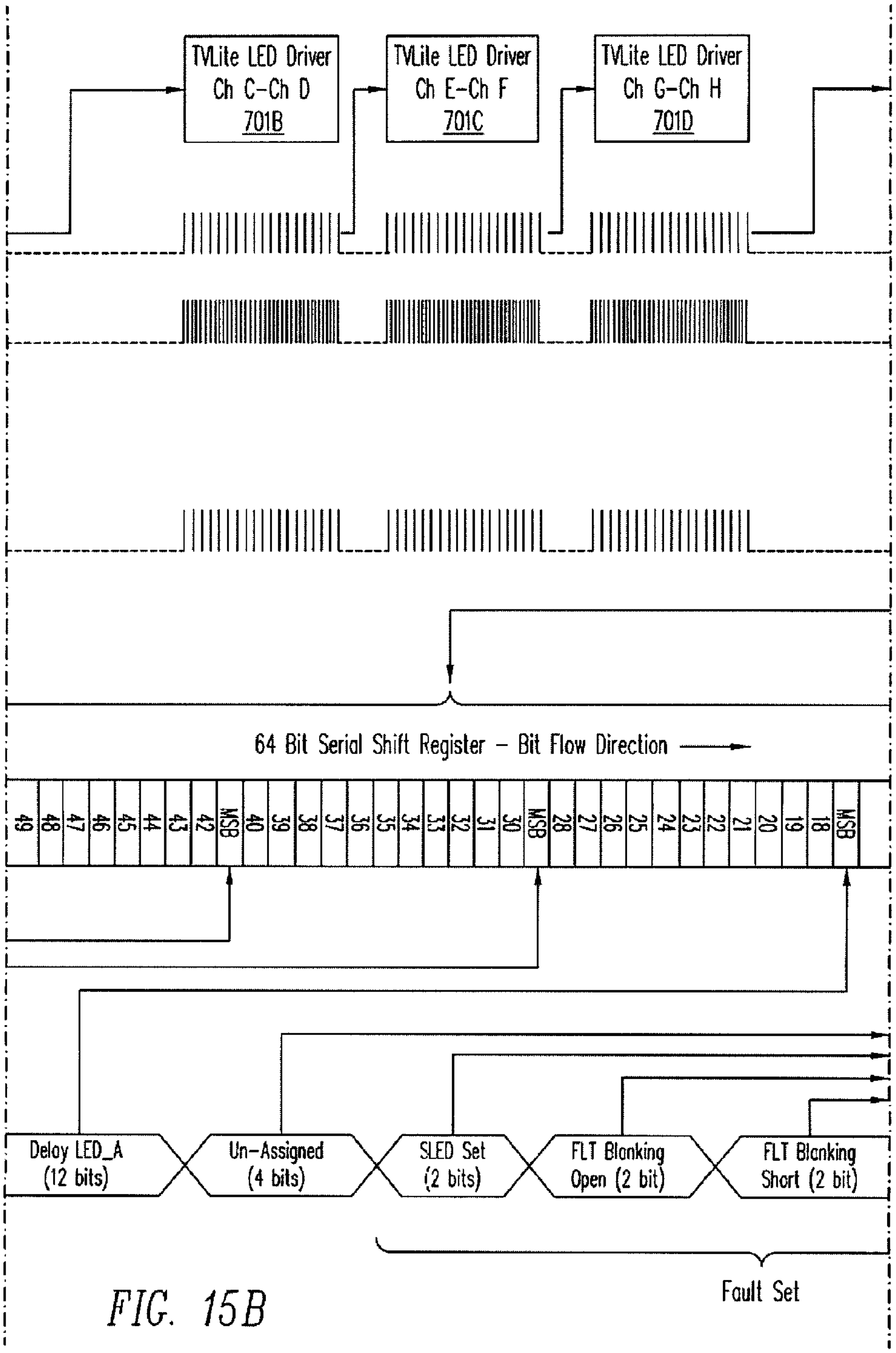
Figure 15C:
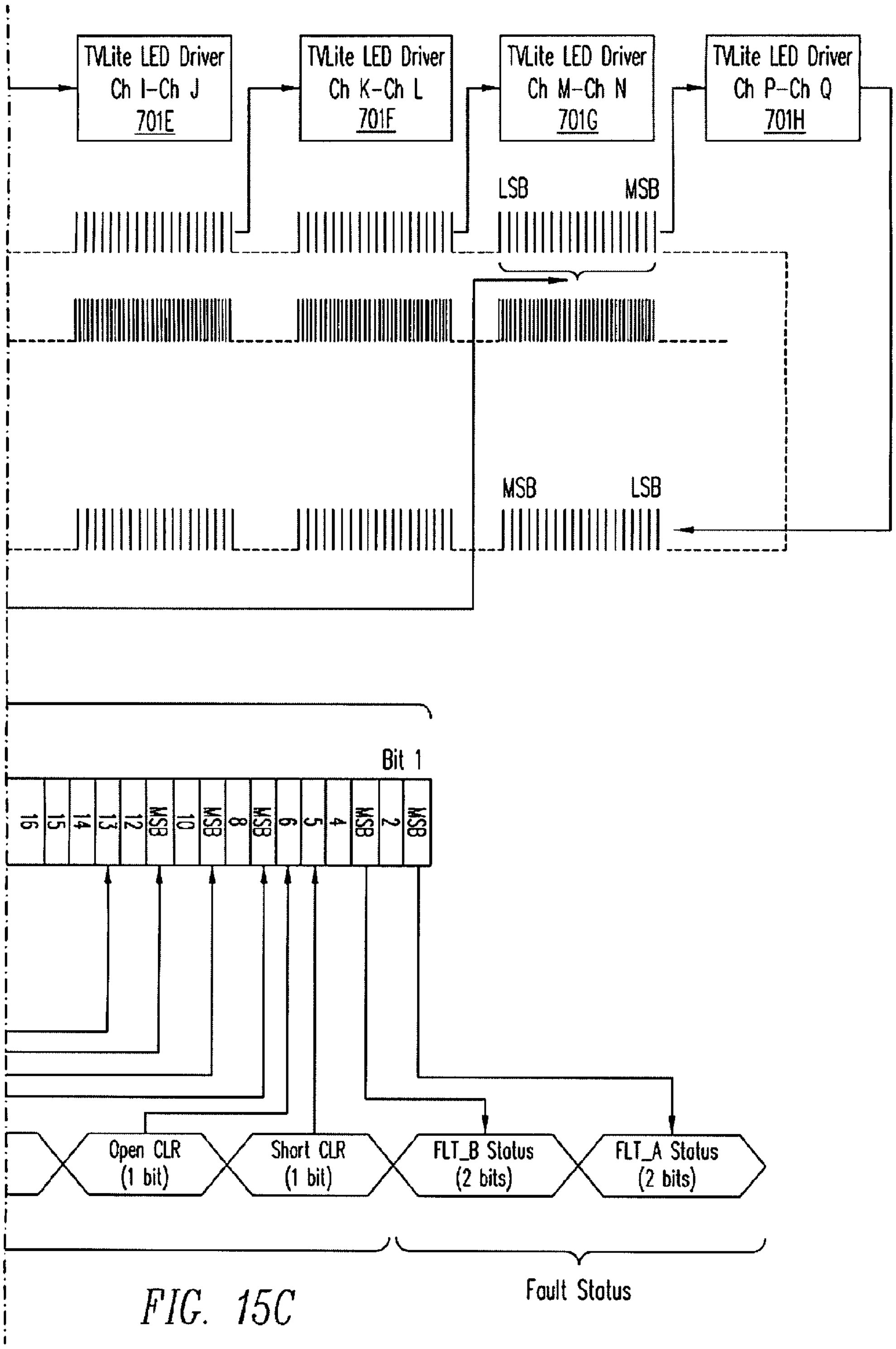

For example, an alternative data protocol for an SLI bus using 64 bits rather than 88-bits is shown in system 700 of FIG. 15. The protocol still uses 12 bits for PWM brightness duty factor, 12 bits for phase delay, 8 bits for fault setting, and 4 bits for fault status, but it omits the 12-bit Dot correction data. As a result, individual channel current setting and brightness calibration of each LED string is not available in this implementation.

In LCD panel manufacturing, many manufacturers believe electronically calibrating a display for uniform brightness is too expensive and is therefore not commercially practical. Global display brightness can still be calibrated by adjusting the value of a panel's current set resistors, such as set resistor 654 shown in FIG. 14, but uniformity in backlight brightness cannot be controlled through the microcontroller or interface IC. Instead, panel manufacturers manually "sort" their LED supply into bins of LEDs having similar brightness and color temperature.

It should be noted that removing Dot data from the SLI bus protocol does not prevent overall display brightness control or calibration. Adjusting the system's global reference voltage Vref can still perform global dimming and global current control. For example, in the system shown in FIG. 14, adjusting the value of Vref affects the value of the reference current Iref produced by reference current source 687. If the reference voltage Vref is shared by all of the driver ICs, adjusting Vref will uniformly affect every driver IC and consequently the panel's overall brightness, independent of the PWM dimming control.

Returning to FIG. 15, system 700 illustrates SLI bus data communication from a common system interface IC 702 to a serially-connected string of eight driver ICs 701A through 701H. As shown, the SLI-bus serial output SO of interface IC 702 generates a sequence of pulses and feeds those pulses to the input pin of driver IC 701A synchronized to the clock pulses on serial clock pin SC. The SLI bus serial output of driver IC 701A in turn sends its internal shift register data out of its SO pin and into the SI input pin of driver IC 701B. Similarly the SO output of driver IC 701B connects to the input pin of driver IC 701C and so on, collectively forming a "digital" daisy chain. The last driver in the chain 701H, sends its SLI bus data from its SO pin back to the SI pin of interface IC 702 to complete the loop.

In the operation of system 700, interface IC 702 sends data out of its SO pin in response to instructions it receives on its SPI bus interface to the system's scalar or video IC. The data for every driver IC and LED string is clocked from the SO output of interface IC 702 to every driver IC 701A through 701H in sequence. All data must be sent to all driver ICs within one single Vsync period. Because the SLI bus is a serial protocol, the first data sent out from interface IC 702 represents the bits used to control driver IC 701H. After 64 clock pulses, the data destined for driver IC 701H is present in the SLI bus shift register of driver IC 701A. Interface IC 702 then outputs the data for driver IC 701G on its SO pin synchronized to another 64 pulses on the SC clock pin. During these 64 clock pulses, the data intended for driver IC 701H moves from the SLI bus shift register within driver IC 701A temporarily into the SLI bus shift register within driver IC 701B. This process is repeated until at last, the data for driver IC 701A is output on the SO pin of interface IC 702 synchronized to the last 64 pulses on the SC clock.

In the last 64 bit "write cycle" of a given Vsync period, the data for driver IC 701A is output from the SO pin and loaded into the SLI bus shift register within driver IC 701A, the data for driver IC 701B moves from the SLI bus shift register within driver IC 701A and into the SLI bus shift register within driver IC 701B, and so on. Similarly, during this last 64 bits of the write cycle, the data for driver 701H moves from the SLI bus shift register within driver IC 701G into the SLI bus shift register within driver IC 701H. Therefore, after 8×64 clock pulses, or 512 pulses on the SC pin, all of the data has been loaded into the SLI bus shift registers of the corresponding driver ICs. Nonetheless, this data is not yet controlling the operation of the LED strings.

Only after the next Vsync pulse is supplied to the driver ICs, is this newly loaded data copied from the SLI bus shift registers and into the active latches of their corresponding driver ICs for controlling LED brightness, timing and fault management. Specifically, the data in the SLI bus shift register within driver IC 701A is copied into the active latches affecting the operation of LED strings controlled by channels A and B, the data in the SLI bus shift register within driver IC 701B is copied into the active latches affecting the operation of LED strings controlled by channels C and D, and so on. Thereafter, the SLI bus shift registers are ready to be rewritten with new data for the next Vsync period. For the rest of the present Vsync period, the LED strings will be controlled according to the data received prior to the last Vsync pulse. All the data sent from the interface IC to the LED driver ICs can be sent within a single Vsync clock cycle and takes effect on the next Vsync clock pulse. At the same time that data is being shifted from the interface IC into the LED driver ICs, fault-reporting data within the driver ICs is shifted back into the interface IC.

In this manner, the SLI bus data communication timing and clocking is asynchronous with the system's Vsync period and the Vsync pulse that begins each Vsync period. That is to say, data from interface IC 702 may be sent faster or slower through the SLI bus to the driver ICs 701A-701H without the viewer of the display being aware of the ongoing multichip interaction or the changing LED settings until the next Vsync pulse comes along. The only timing requirement is that interface IC 702 is able to receive its instructions from the video controller or scalar IC via its SPI bus input, interpret those instructions and output the channel specific information on the SO pin of its SLI bus for every driver IC within a single Vsync period. As described earlier, since the time needed to receive such instructions is much shorter than the Vsync period, this timing requirement imposes no limitations in the operation of the display.

FIG. 15 also illustrates that the Fault Set data register may comprise various kinds of data, including data for adjusting the voltage used to detect a shorted LED (the SLED set code), setting a period of time used to ignore the fault output from a shorted LED detect (shorted LED fault blanking), setting a period of time used to ignore the fault output from open LED detect (open LED fault blanking), and clearing previously reported open and shorted LED fault registers (open CLR and short CLR). The SLI bus protocol is not limited to implementing specific fault related functions or features.

System 700 also illustrates the fault read back capability of implementing the SLI bus as a loop by connecting the SO output of the last driver IC in the daisy chain (driver IC 701H) to the SI input of interface IC 702. While writing data from interface IC 702 into driver ICs 701A-701H, the data residing within the SLI bus shift registers advances through the daisy chain with each SC clock pulse. If the data within the SLI bus shift registers includes fault detection data written by one of driver ICs 701A-701H, then clocking that data through the loop and back into interface IC 702 facilitates a means by which a specific fault condition in one of the driver ICs 701A-701H can be reported back to the interface IC 702 and through the SPI bus to other components of the system. What interface IC 702 does with the fault information depends on its design and is not limited by the SLI bus protocol or hardware.

Driver IC Subcircuit Implementation

FIGS. 15-20 show detailed circuit diagrams of some of the functional units that are included in digital control and timing (DC&T) circuit 615A and analog control and sensing (AC&S) circuit 616A, shown in FIG. 14. While the detailed circuit diagrams illustrate enabling embodiments of the invention, they do not represent exclusive implementations of these circuits.

Latch & Counter A blocks 680A and 680B comprise a assembly of flip-flops, logic gates and latches well known to those skilled in the art and therefore will not be described in detail.

The I-Precise gate driver circuits use feedback to match LED currents $I_{LEDA}$ and $I_{LEDB}$ in the LED strings to a fixed multiple of a common reference current Iref supplied by reference current source 687. In this way, current matching and the absolute value of LED current can be held to an accuracy of ±2% without the need for excessive trimming or numerous and costly discrete precision components.

Figure 16:
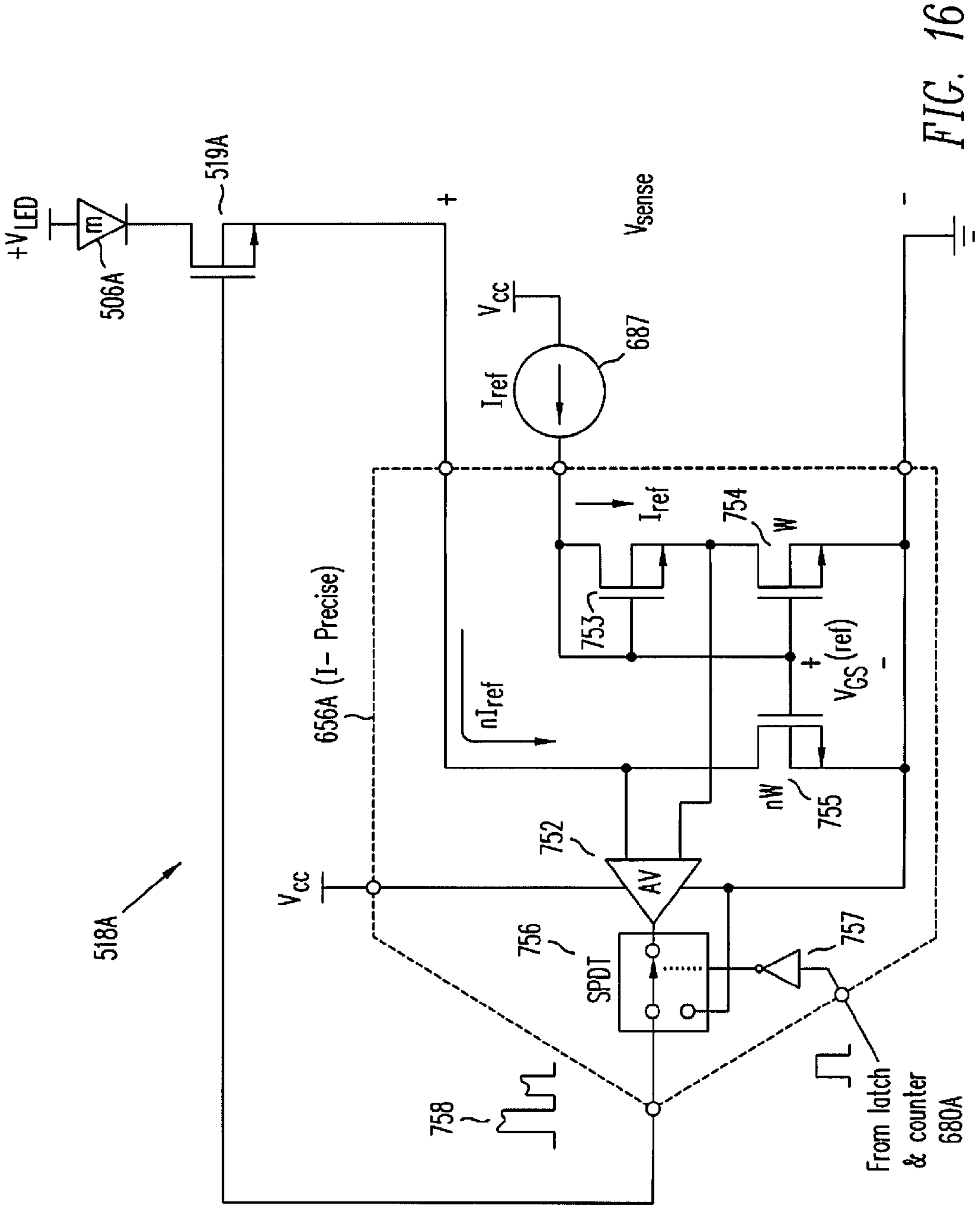
FIG. 16 illustrates a schematic circuit diagram of an embodiment of an 1-Precise current sense and gate driver.

FIG. 16 illustrates an I-Precise gate driver circuit 656A. The gate drive of current sink DMOSFET 519A is controlled by an operational amplifier 752 supplying the precise gate voltage needed to reach a specific LED current in LED string 506A. A current mirror, comprising a pair of N-channel MOSFETs 755 and 754, identical in cellular design to minimize device mismatch, controls the current in the LED string 506A. MOSFET 754, used as the reference for the mirror and designed to carry an input current Iref supplied by reference current source 687 in the range of microamperes to milliamperes, has a gate width W. The mirror MOSFET 755 has a gate-width "n" times larger than W, i.e. n·W, and is designed to nominally carry the required LED current n·Iref: which may in practice range from 20 mA to 300 mA. The value of "n" depends on the targeted current ratio. MOSFET 754 is connected in a totem pole arrangement with an N-channel MOSFET 753, and the gate terminals of MOSFETS 753, 754 and 755 are connected together and to the drain of MOSFET 753. The common gate voltage of MOSFETS 753, 754 and 755 is designated $V_{GS}$(ref).

By forcing the current Iref into the series-connected bias network comprising MOSFETs 753 and 754, a gate-to-source voltage Vgs(ref) is developed across current mirror MOSFETs 754 and 755, i.e. both mirror MOSFETs 754 and 755 have the same gate bias. To insure a current mirror maintains good matching and accuracy, the gate drive and drain-to-source voltages of MOSFETs 754 and 755 should be nearly identical. To that purpose, operational amplifier 752 has its inputs connected to the respective drain terminals of the current mirror MOSFETs 754 and 755 and has its output terminal connected to the gate terminal of current sink DMOSFET 519A. In operation, amplifier 752 forces the LED current in MOSFET 755 to increase to the bias point where the drain voltages of MOSFETs 754 and 755 are equal. With the same gate drive and the same drain voltage as the reference MOSFET 754, the current flowing in mirror MOSFET 755 is therefore equal to n times the reference current Iref, i.e. n·Iref.

Thus MOSFET 755 acts like a current sense resistor, adjusting the gate drive through operational amplifier 752 until the target current is met. MOSFETs 755 and 754 form a current mirror, and the accuracy of the current mirror is better than that obtained, for example, by using a discrete precision sense resistor to perform the sensing function, since the current mirror eliminates the impact of discrete component variability and improves the circuit's signal-to-noise ratio, reducing its noise sensitivity even in low current operation. This benefits accrues because the combination of a current mirror and a differential input operational amplifier naturally rejects common-mode noise even when monitoring small currents. Therefore, the current flowing in the current sink MOSFET 655A is not only insensitive to noise, but does not rely on matching the electrical characteristics of high-voltage MOSFET 655A and to the other current sink MOSFETs in the same driver IC or other driver ICs.

Power dissipation across the sensing device, i.e. MOSFET 755, is miniscule because its drain-to-source voltage is small, in the range of a few hundred millivolts, set by the series voltage-divider network of MOSFETs 753 and 754. In fact because in the reference current bias network, MOSFET 753 is in series with MOSFET 754, the current mirror MOSFETs 754 and 755 are actually conducting current in their sub-threshold operating region. Despite their low gate bias and subthreshold operation, the cellular design and geometric layout of mirror MOSFETs 755 and 754 insures that good matching and accurate current ratios are maintained over a wide range of operating currents.

To facilitate PWM dimming control, the analog voltage output of operational amplifier 752, which delivers the gate bias to current sink DMOSFET 519A is gated by single-pole double-throw, i.e. SPDT, analog switch 756 responding to the output pulses produced by Latch & Counter block 680A (see FIG. 14). The digital signal from Latch & Counter block 680A, buffered by inverter or Schmitt trigger 757, toggles the SPDT analog switch 756 into one of two states, either to pass the analog signal from operational amplifier 752 to the gate of current sink DMOSFET 519A to bias it "on," so that current sink DMOSFET 519A conducts a prescribed amount of current, or to drive the I-Precise output of operational amplifier 752 to ground, shutting current sink DMOSFET 519 519A into an "off" on non-conducting state. The gate of DMOSFET 655A therefore alternates between being grounded and "off" or being biased at a fixed and dynamically controlled current. I-Precise circuit 656A shown in FIG. 16 can also be used in configurations wherein current sink DMOSFET 655A is connected in series with a cascode clamp high voltage DMOSFET in series between current sink DMOSFET 655A and LED string 751A, as in the arrangement shown in FIG. 10, wherein cascode clamp MOSFETs 520A-520Q are connected in series with the current sink MOSFETs 519A-519Q, respectively.

Waveform 758 in FIG. 16 represents graphically the voltage output of I-Precise gate driver circuit 518A, having a grounded state alternating with a time-varying voltage in its "on" state. For clarity, current sink DMOSFET 519A is considered to be in an "on" condition whenever sufficient current is flowing in current sink DMOSFET 519 519A to illuminate LED string 503A, even if the gate of DMOSFET 519A is biased to a potential below its threshold voltage, i.e. sub-threshold conduction is not necessarily "off". It should also be noted that while the digital gating function in I-Precise gate driver circuit 518A is represented by SPDT switch 756 connected in series with the output of operational amplifier 752, it is equally possible to facilitate the digital "on and off" gating on the input side of operational amplifier 752, or even within operational amplifier 752 itself. Methods to facilitate a digital "enable" function in an operational amplifier or in operational-amplifier applications are well known to those skilled in the art and will not be described here.

Referring again to FIG. 14, I-Precise gate driver circuits 518A and 518 bias current sink DMOSFETs 519A and 519B to accurately control the magnitude and matching of LED currents $I_{LEDA}$ and $I_{LEDB}$ as a precise ratio to the reference current Iref supplied by reference current source 687. The ratio of the LED currents $I_{LEDA}$ and $I_{LEDB}$ to the reference current Iref may be a fixed ratio "n" or may be varied in response to Dot correction data in registers 659A and 659B and in D/A converters 683A and 683B. In some cases, the Dot correction data may be excluded from the SLI bus data and protocol, or the data may be included in the protocol but the driver ICs may ignore the data. The I-Precise gate driver circuit 656A shown in FIG. 16 would be applicable to such an arrangement, since there is no input for a signal from the D/A converters 683A and 683B shown in FIG. 14.

While FIG. 14 shows digital-to-analog converters 683A and 683B as being discrete and separate from I-Precise circuits 518A and 518B, in a preferred embodiment these functions are merged together. Specifically, a discrete D/A voltage converter 683A trimmed for supplying precise voltage steps cannot account for non-linear behavior in current sink MOSFET 519A and in I-Precise gate driver circuit 518A. Unlike trimming a circuit for precise operation at a single operating current, maintaining converter monotonicity (let alone linearity) over a range of currents and brightness settings is extremely difficult and expensive to implement using voltage trimming. Specifically, voltage trimming to precisely set and control multi-channel driver currents while accounting for operating and manufacturing variations is time-consuming and complex, and requires substantial silicon real estate to implement. Moreover, matching of high voltage DMOSFETs 519A and 519 to each other and to similar MOSFETs in other driver ICs is problematic, and cannot rely on the reproducibility of the high voltage devices, especially from one fabricated wafer to another.

Figure 17A:
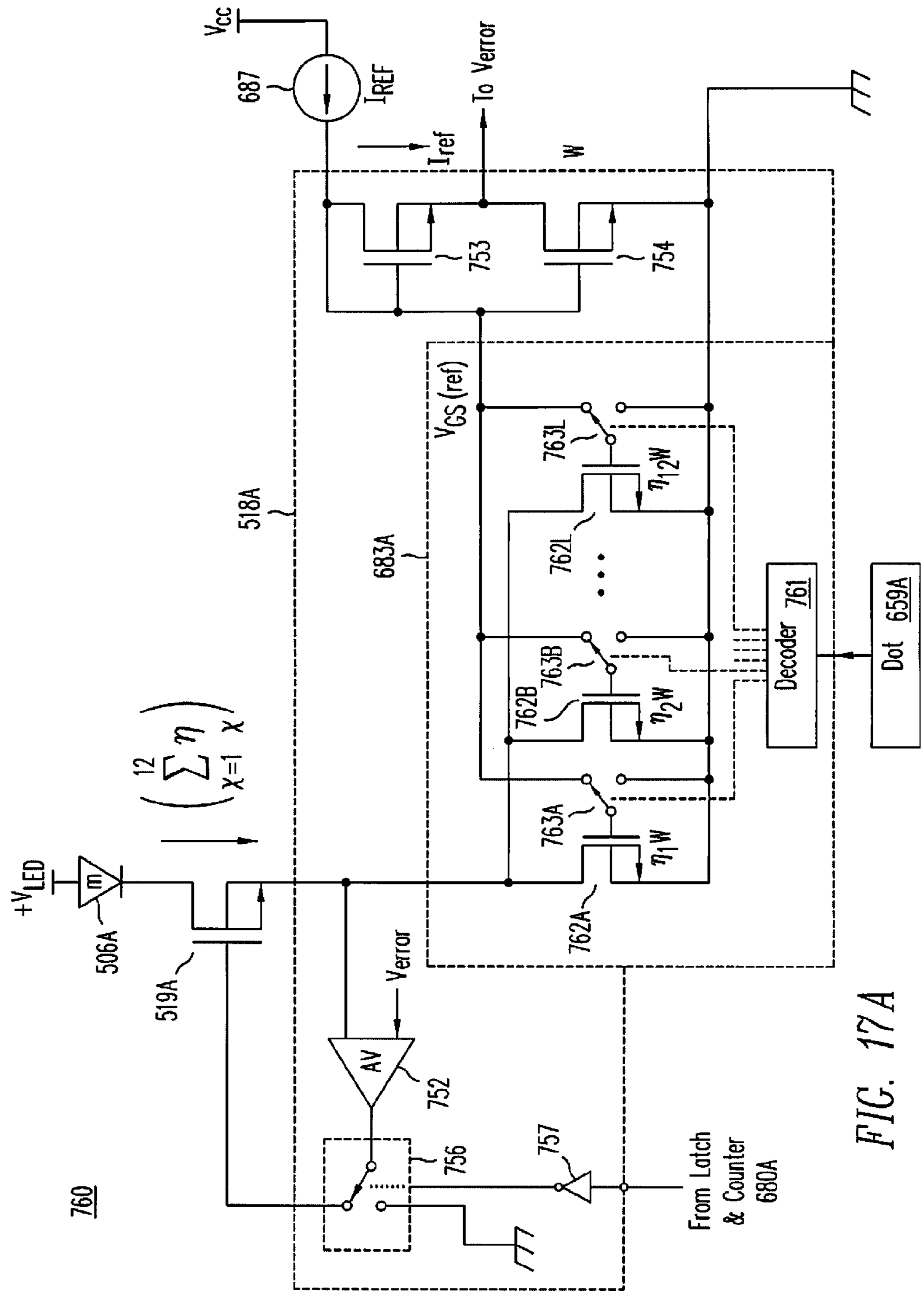
FIG. 17A is a schematic circuit diagram an I-precise gate driver circuit allowing Dot Correction and comprising an integral N-channel current mirror D/A converter.

Instead of voltage trimming, current mirror methods provide a preferred alternative to implement the D/A converter function and facilitate Dot correction in LED driver ICs. Such methods are best implemented by folding the D/A converter 683A into I-Precise gate driver circuit 518A in Channel A and by doing the same in all other channels. One such "folded" design is illustrated in FIG. 17A, wherein the functionality of D/A converter 683A is embedded in an embodiment of the I-Precise circuit 518A, shown in FIG. 14. Like the circuitry shown in FIG. 16, the circuitry shown in FIG. 17A comprises reference current source 687, which drives a totem pole connected pair of MOSFETs 753 and 754. Rather than mirroring the common gate voltage $V_{GS}$(ref) of MOSFETs 754 and 753 to a single device, $V_{GS}$(ref) is instead mirrored to a number of paralleled MOSFETs 762A through 762L, having a layout and cellular construction similar to MOSFET 754.

While MOSFETs 762A through 762L (referred to collectively as MOSFETs 762) share common drain and source terminals, their individual gate biases are individually determined by corresponding SPDT switches 763A through 763L controlled by latching decoder 761 in response to data from the Dot register 659A in SLI bus shift register 514A. The drains of MOSFETs 762 are connected to the source of current sink DMOSFET 519A used to control the current in LED string 506A. The drain voltages of reference MOSFET 754 and mirror MOSFETs 762 are also input into operational amplifier 752, driving the gate of current sink DMOSFET 519A through digitally pulsed SPDT analog switch 756.

Each gate of MOSFETs 762 can be biased to either the gate reference voltage $V_{GS}$(ref), or to a grounded off state. In respect to reference MOSFET 754, mirror MOSFETs 762A-762L have corresponding gate widths $n_1W$, $n_2W$ through $n_{12}W$. The values of $n_1$ through $n_{12}$ can be identical or can be weighted, for example using a binary coded weighting, i.e. multiples of 2. In such a manner, the effective current mirror ratio of the mirror can be digitally adjusted from 0 to 100% of the full current based on the Dot data from register 659A in SLI bus shift register 514A. The maximum LED current is set by the condition when all mirror MOSFETs 762A through 762L have their gates biased "on" to the reference bias $V_{GS}$ (ref). In this condition the mirror ratio compared to the reference current becomes $$\frac{I_{LED}(\max)}{Iref} = \frac{n_1W + n_2W + \ldots + n_{12}W}{W} = n_1 + n_2 + \ldots + n_{12} = \sum_{x=1}^{12} n_x$$

In general, this maximum current and maximum gate width D/A converter MOSFET corresponds to the same total gate width nW as MOSFET 755 in I-Precise circuit 656A in FIG. 16. Compared to the maximum current, any other Dot code reduces the current from this maximum amount in proportion to the corresponding ratio of gate widths. In this manner, decoder 761 can change the LED current in precise current steps without affecting the analog accuracy of the maximum current or its ratio to the reference current Iref. I-Precise circuit 518A thereby accurately facilitates Dot correction in the LED drivers, even in multi-driver-IC systems. Importantly, in a preferred embodiment decoder 761 contains a digital latch front-end for holding the data last read from Dot register 659A till the next Vsync pulse writes new data into the decoder. Without this feature, the brightness of the LED string would vary in real time with data being clocked through the SLI bus shift register, potentially causing unpleasant "flicker" in the display.

FIG. 17A therefore illustrates that the LED current can be adjusted in digital steps in accordance with the Dot data by varying the effective gate width of the current mirror MOSFET to a predetermined sequence of values.

Figure 17B:
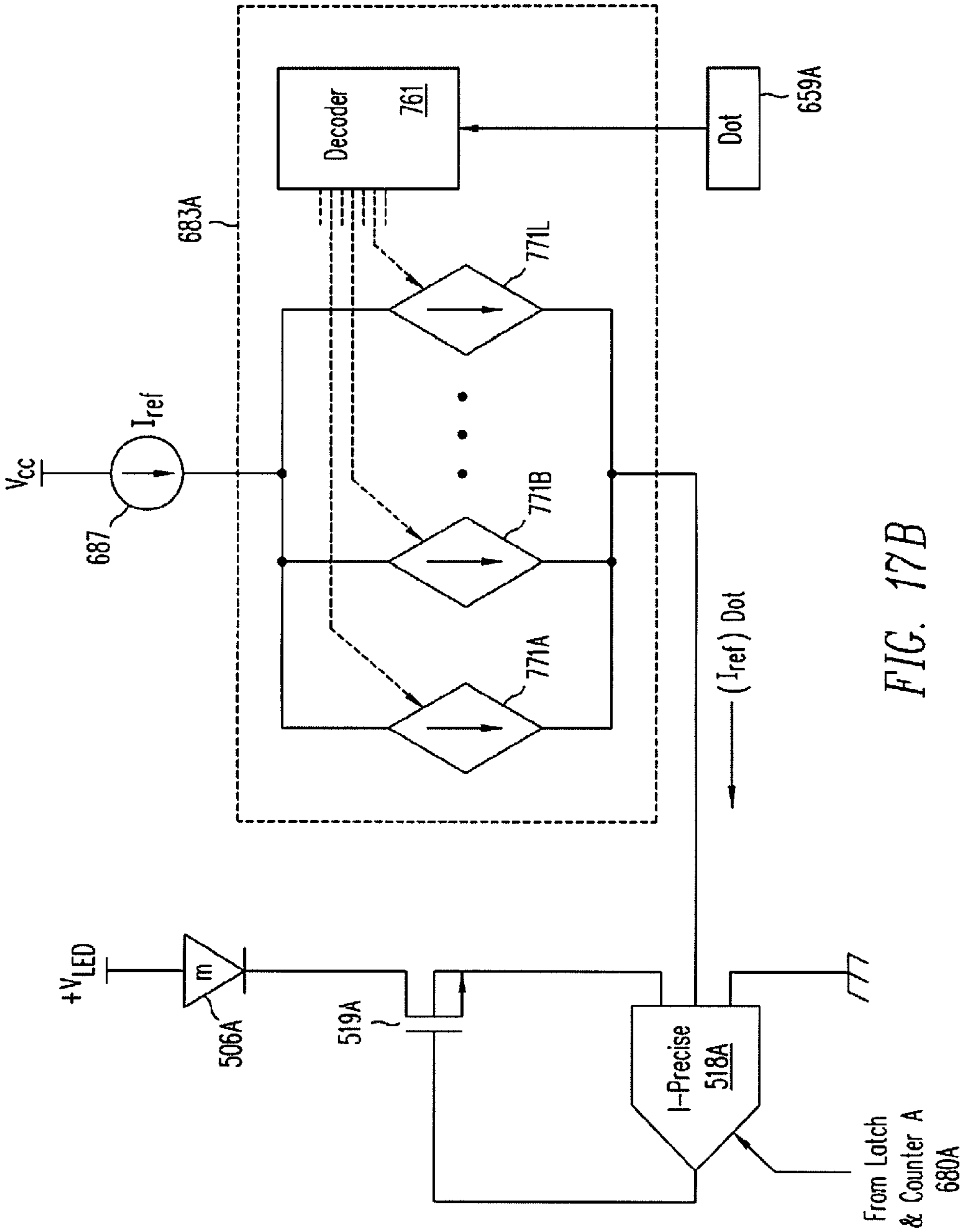
FIG. 17B is a schematic circuit diagram of an I-precise gate drive circuit allowing Dot correction and comprising a current source D/A converter.

Another way to achieve the same functionality is to modulate the value of the reference current Iref that is fed into the I-Precise gate driver circuit. In FIG. 17B, illustrates that a fixed reference current Iref supplied by reference current source 687 can be modulated by dividing the current up in D/A converter 683A and supplying only a fraction of the total current Iref to the I-Precise driver 518A. The D/A converter 683A comprises a number of parallel controlled current sources 771A through 771L, each with current controlled by decoder 761 in response to Dot register 659A. In practice such a circuit comprises a number of MOSFETs of identical construction and cellular design whose current is either fed into I-Precise circuit 518A or diverted to ground.

Figure 17C:
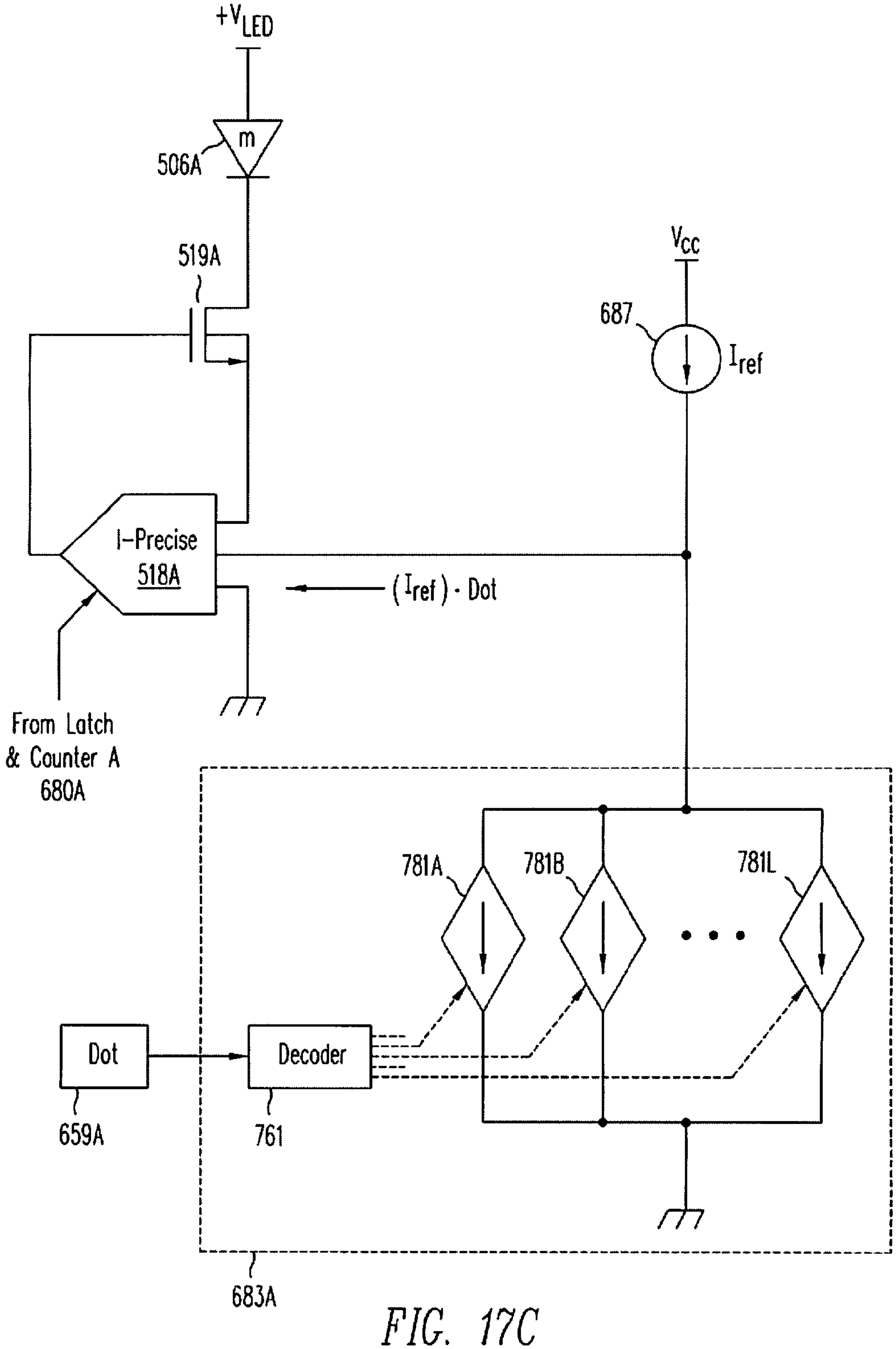
FIG. 17C is a schematic circuit diagram of an I-precise gate drive circuit allowing Dot correction and comprising a current sink D/A converter.

In an alternative embodiment, shown in FIG. 17C, the fixed reference current Iref supplied by reference current source 687 is fed directly into I-Precise gate driver 518A, but in this embodiment D/A converter 683A diverts some portion of Iref to ground and away from the input to I-Precise buffer 518A. Here D/A converter 683A comprises a number of parallel controlled current sinks 781A through 781L, with currents controlled by a decoder 761 in response to the data stored in Dot register 659A. Whether controlling the current flowing into the I-Precise buffer directly or by shunting it to ground, the Dot correction function can be realized with minimal complexity and without sacrificing accuracy.

Figure 17D:
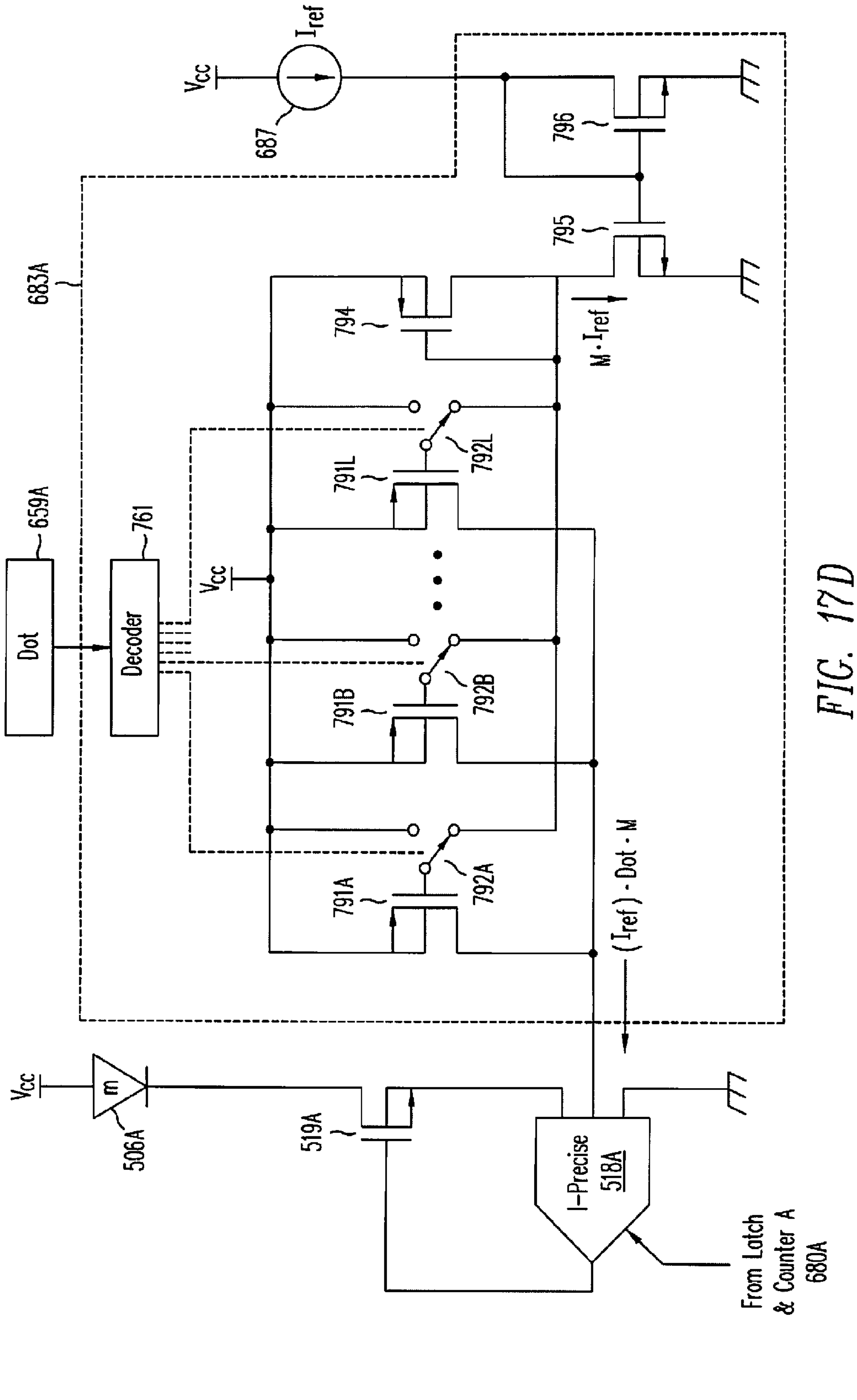
FIG. 17D is a schematic circuit diagram of an I-precise gate drive circuit allowing Dot correction and comprising a P-channel D/A converter.

Another embodiment of an I-Precise gate driver circuit that includes a "folded" D/A converter is shown in FIG. 17D. In this embodiment, the reference current Iref from reference current source 687 is mirrored into a pair of current sink MOSFETs 796 and 797 having respective gate widths W and m·W so that the current flowing in current sink MOSFET 795 is equal to m·Iref. This value can be larger than Iref, reducing the per channel current load required by the reference current. The current through MOSFET 795 is again reflected by threshold connected P-channel MOSFET 794, which is connected in series with MOSFET 795. MOSFET 794 forms a mirror with P-channel MOSFETs 791A through 791L. The gates of MOSFETs 791A through 791L are either connected to Vcc if they are biased off, or to the drain of P-channel MOSFET 794 if they are conducting, as controlled by SPDT switches 792A through 792L in response to decoder 761 and Dot data in register 659A. The output of D/A converter 683A is then fed into the input of I-Precise buffer 518A. One potential advantage of this embodiment is that in some wafer technologies, P-channel devices may exhibit better matching than N-channel MOSFETs, in part due to reduced impact ionization, isolation from ground currents, and immunity from ground bounce-induced noise injection.

In an alternative embodiment of the circuits shown in FIG. 17A through FIG. 17D, current sink DMOSFET 519A can be used in a cascode clamped configuration by inserting a high voltage DMOSFET, comparable to MOSFET 520A in FIG. 10, in series between current sink DMOSFET 519A and LED string 506A.

Figure 18:
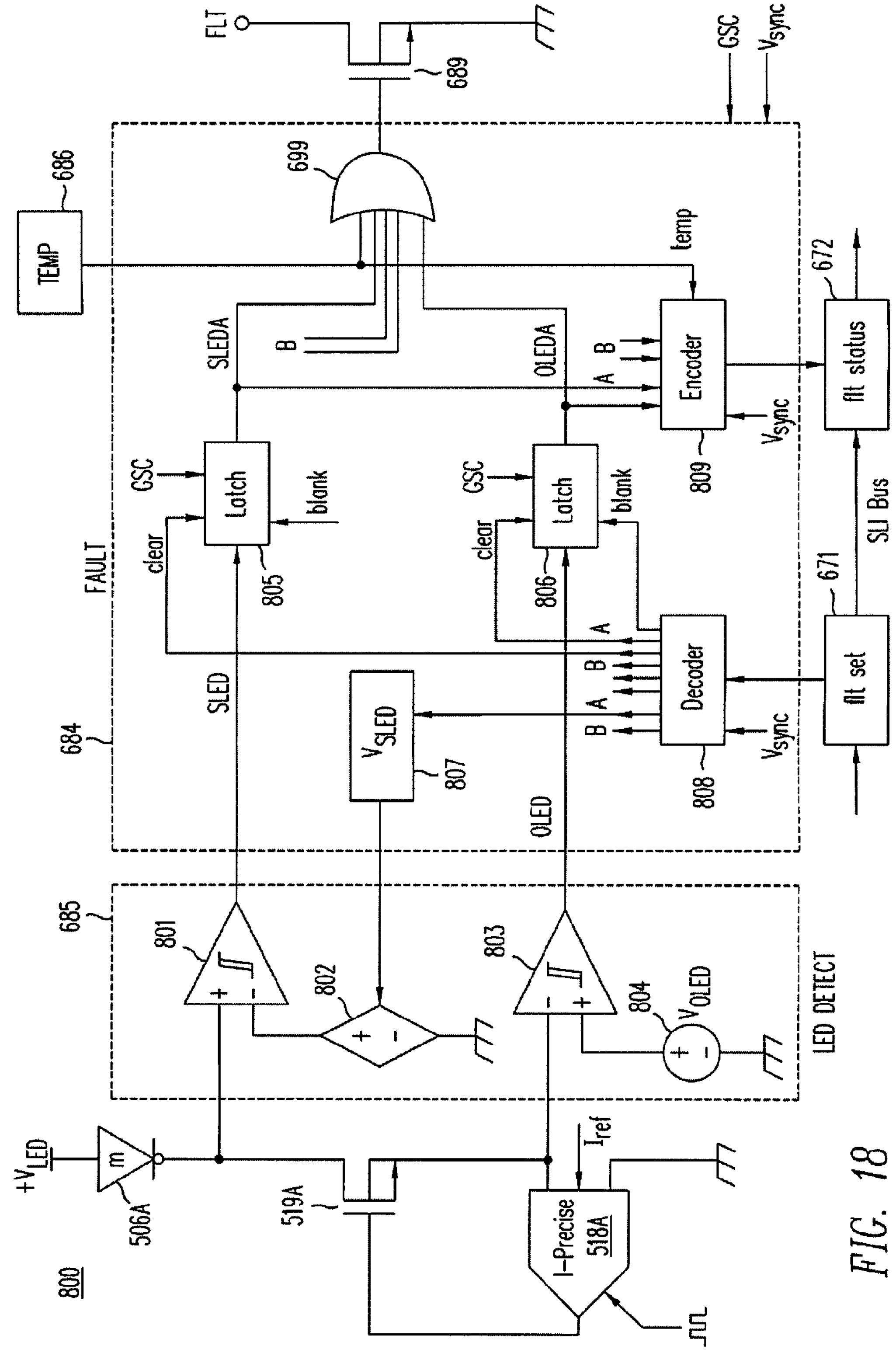
FIG. 18 is a schematic circuit diagram of an LED fault detection circuit and a fault latch circuit.

FIG. 18 illustrates possible embodiments of fault latch circuit 684, LED fault detection circuit 685 and fault flag MOSFET 689, and their interconnectivity to other driver subcircuits including temperature detection circuit 686, I-Precise driver 518A, current sink DMOSFET 519A, and LED string 506A.

As shown, LED LED fault detection circuit 685 monitors the voltages on the source and drain terminals of current sink DMOSFET 519A. Fault latch circuit 684 receives fault information from LED fault detection circuit 685 and from temperature detection circuit 686 and outputs fault status information to fault flag MOSFET 689 and to the system via the fault status register 672 in SLI bus shift register 514A.

Through the fault settings register 671 in SLI bus shift register 514A, the system also can change the conditions, or the system's electrical "definition" of a fault in fault latch circuit 684. For example, in this embodiment via a latch and decoder 808 the fault settings register 671 controls the threshold voltage $V_{SLED}$ stored in latch 807, which is used to detect the presence of a LED string with a shorted LED, through a programmable reference voltage supplied by voltage source 802. The fault settings register 671 also includes fault "blanking" data used to prevent false fault detection, e.g. to prevent detecting a shorted or open LED during startup when the power supply rails such as $+V_{LED}$ are ramping and not yet stable.

An open-LED detect voltage ($V_{OLED}$) supplied by voltage source 804 and the over temperature detection temperature limits have fixed preset values and are not programmable through the SLI bus shift register. Alternatively, by adapting the SLI protocol, in another embodiment of the invention, these or other fault conditions could be made dynamically adjustable through the SLI bus shift register.

In operation, the process of detecting a shorted LED in LED string 506A involves copying fault settings data in the SLI bus data stream for the particular LED driver from the fault settings register 671 into latch and decoder 808. This is done synchronously with a Vsync pulse. Thereafter, the data in the fault settings register 671 can be changed without affecting the data stored in latch and decoder 808 till the next Vsync pulse. Latch and decoder 808 then interprets the code and loads the $V_{SLED}$ latch 807 with a digital representation of the threshold voltage of a shorted LED condition. This digital representation is delivered to dependent voltage source 802 which converts the digital representation into a precise and stable voltage which it feeds to the negative input of a SLED comparator 801. Together, $V_{SLED}$ latch 807 and dependent voltage source 802 perform the function of a digital-to-analog converter, thereby setting the shorted LED voltage condition as an analog voltage at the negative input of SLED comparator 801. This voltage may range from 3V to 12V or from 6V to 15V, typically in four discrete steps of voltage. For example if one LED shorts out the voltage being monitors will jump by 3.2V, exceeding a 3V threshold and triggering a shorted LED detection if the threshold is set to 3V. If the threshold is set to 6V, two LEDs would need to short before a shorted LED fault would be detected.

The positive input to SLED comparator 801 connects to the anode of LED string 506, which is also the drain of current sink DMOSFET 519A. Under normal operation in backlight systems with minimal LED string mismatch, the voltage across current sink DMOSFET 519A is well under a volt, and this value is less than the voltage at the negative input of SLED comparator 801. Since the voltage at the negative input of comparator 801 is less than the voltage at its positive input, the output of SLED comparator 801 remains low (digitally as a "0" bit state). In the event that one of the LEDs in LED string 506A shorts, the voltage at the drain of current sink DMOSFET 519A and at the positive input to SLED comparator 801 will jump to a higher voltage, typically 3V to 3.5V greater than the same voltage prior to the occurrence of the short. If this voltage exceeds the $V_{SLED}$ voltage supplied by voltage source 802 to the negative input of SLED comparator 801, the output of SLED comparator 801 will change to a high state (digitally a "1" bit state), and thereby inform a signal latch 805 that a shorted LED condition has occurred. Ideally, the voltage output by SLED threshold voltage source 802 should be low enough to sense a single LED short in string 506A but not so low as to interpret a higher voltage across the current sink DMOSFET 519A arising from LED string-to-string mismatch as a short.

It is equally important for an LED backlight driver IC to have the capability to neglect fault signals that occur erroneously from noise or during startup. Any source of noise causing the driver IC to detect a false fault condition is adverse to safe or reliable display operation. To that end, noise can be suppressed by incorporating hysteretic thresholds in comparator 801, a technique well known to those skilled in the art where the input voltage difference required to force a comparator's output from low to high is higher than the input voltage difference at which the comparator's output thereafter switches back to a low condition. Using a comparator 801 with hysteresis prevents the output of the comparator from "chattering" repeatedly between its high to low output states for any input near the threshold limit.

Blanking, another method to prevent erroneous fault indications, operates by instructing SLED latch 805 to completely ignore the output of SLED comparator 801 for a specified number of GSC clock cycles. The command, received through fault settings register 671 and interpreted by decoder 808, prevents SLED latch 805 from being influenced by the output of comparator 801 during a fixed number of grey scale clock GSC pulses. The counter used to count the GSC pulses during a blanking period can be included within latch 805. Alternatively, the data from the digital counter used for PWM control, e.g., Latch & Counter A 680A in FIG. 14, can also be compared in magnitude against the blanking interval. As another alternative, the interface IC or system μC can send a one bit "toggle" signal telling SLED latch 805 to ignore a SLED fault signal from SLED comparator 801 until the instruction is reversed.

Assuming shorted LED fault detection is not "blanked", i.e. not temporarily disabled, whenever the output of SLED comparator 801 goes high, SLED fault latch 805 will "set", generating a high or "1" bit state on its output connected to the input of fault OR gate 699. With any input high, the output of OR gate 699 is driven high turning on fault flag MOSFET 689 and pulling its drain (FLT) to ground. This state transition, if connected to the interrupt pin on the backlight microcontroller, will inform the backlight system that a fault has occurred somewhere in the system. In tandem with sending a FLT flag, the fault condition is encoded by encoder 809 into a predefined code and loaded into the fault status register 672 in SLI bus shift register 514A.

The fault data written into fault status register 672 describes which driver IC has sensed a fault and what type of fault has occurred. This data will not become processed, however, until the interface IC 501 clocks new data through the SLI bus 514. Specifically, as data is pushed from the interface IC 501 into the SLI bus 514, the data in fault status register 672 is simultaneously returned back into the interface IC 501, and subsequently communicated to the system μC 551. This communication can occur any time within the Vsync period but conveniently occurs just prior to the next Vsync pulse. It is convenient to time the SLI bus update using the same counter within the μC or FPGA used to generate the Vsync pulse. Updating the backlight settings at the end of a Vsync period allows the system to use the most current information before the next frame is displayed.

Alternatively, the interface IC 501 may clock new data into the SLI bus 514 immediately following a fault as indicated by the FLT line being pulled low. Reacting to the FLT flag not only allows the system to access the nature of the fault and to respond more quickly, but also to adjust its settings to prevent overheating while the nature of the fault is further diagnosed.

The system's response to a shorted LED fault detection may vary by model and manufacturer, ranging from completely shutting down the $+V_{LED}$ supply (and the entire display) to ignoring the fault and allowing operation to continue unimpeded. Another alternative is to reduce the LED current in the malfunctioning channel and increase the duty factor to compensate for brightness, or to reduce the LED current uniformly in every channel.

After the fault has been recognized by the system and the appropriate actions taken, the fault can be cleared through the fault settings register 671. The interface IC 501 clocks the required command onto the SLI bus 514 and into the fault settings register 671. Decoder 808 interprets the command and sends a "reset" command to SLED latch 805. If the fault condition is still present, comparator 801 will immediately "set" latch 805 and generate a new fault. To avoid retriggering a fault, the fault must be either eliminated or it must be suppressed by blanking. To eliminate the fault, the value of $V_{SLED}$ can be increased. Alternatively, the fault may be "blanked" by programming the blanking interval equal to the entire Vsync period. The disadvantage of the latter approach is that subsequent LED shorts in the same LED string will be ignored. This may lead to a potentially dangerous operating condition.

Open LED detection is performed in this embodiment by comparing the source voltage of current sink DMOSFET 519A, i.e. the voltage across the I-Precise gate driver circuit 518A, against some pre-fixed open-LED detect voltage ($V_{OLED}$) supplied by voltage source 804. To reiterate, the function of I-Precise gate driver circuit 518A is to sense the current flowing through current sink DMOSFET 519A and adjust the gate bias of DMOSFET 519A in a manner to achieve a current equal to a fixed multiple of reference current Iref. Under normal circumstances, the voltage across the input terminals of the I-Precise gate driver circuit 518A should exceed a couple hundred millivolts. If the voltage at the inputs to I-Precise gate driver circuit 518A is too low, i.e. below the open-LED detect voltage $V_{OLED}$ supplied by voltage source 804, this means that the I-Precise gate driver circuit 518A is unable to drive the DMOSFET 519A sufficiently to achieve the targeted current. In the extreme case of an open circuit or a high impedance load resulting from an open LED, a failed connector conducts no current and the input voltage to the I-precise gate driver circuit 518A will drop to ground, well below $V_{OLED}$.

When the voltage at the negative input to OLED comparator 803, which is the same as the voltage across I-Precise gate driver circuit 518A, drops below the voltage at the positive input to comparator 803 (i.e., the open-LED detect voltage $V_{OLED}$ from voltage source 804), an open LED string has been detected and the output of OLED fault comparator 803 switches from its "0" bit state to a high or "1" bit condition. To avoid noise sensitivity around the transition point, as described above with respect to comparator 801, comparator 803 incorporates hysteresis. Comparator 803 is also disabled whenever I-Precise gate driver circuit 518A is digitally toggled off, e.g. during each non-conducting portion of a PWM cycle.

More specifically, during the interval "D" of each Vsync period where I-Precise gate driver circuit 518A is driving current sink DMOSFET 519A into a conducting state, then OLED fault comparator 803 is active and operating, passing its digital output to OLED latch 806. Conversely, during the remaining interval "1-D" of each Vsync period, when I-Precise gate driver circuit 518A forces current sink DMOSFET 519A into a non-conducting state, then OLED comparator 803 is disabled, its output is pulled to ground, and its digital output cannot generate an OLED fault signal at the input of OLED latch 806.

Alternatively, this embodiment can also use blanking to prevent erroneous faults by instructing OLED latch 806 to ignore the output of OLED fault comparator 803 for some period of GSC clock cycles. The blanking command, received through fault set register 671 and interpreted by decoder 808, prevents OLED latch 806 from being influenced by the output of comparator 803 during a fixed number of grey scale clock GSC signals. To perform this counting function a counter can be included within OLED latch 806, or the data from the digital counter used for the PWM latch 680A (see FIG. 14) can also be compared in magnitude against the blanking interval. Alternatively the interface IC 501 or system μC 551 can send a one bit "toggle" signal telling OLED latch 806 to ignore OLED fault signals from OLED comparator 803 until the instruction is reversed.

Provided that OLED latch 806 is not inhibited by a blanking signal, a low to high transition on its input "sets" the latch and outputs a logic high signal to an input of OR gate 699. The high output state from latch 806 in turn drives the gate of fault flag MOSFET 689 high and pulls the drain voltage to ground, generating a fault interrupt. Moreover, encoder 809 encodes the fault information into the SLI bus protocol then loads it into fault status register 672.

Temperature sensing circuit 686 has its over-temperature (OT) digital output connected to an input of OR gate 699 and to encoder 809. In the event an over-temperature condition occurs, the OT signal transitions from a digital "0" to a digital high or "1" bit state, driving the output of OR gate 699 high, turning on fault flag MOSFET 689 and pulling the FLT line low. If the drain of fault flag MOSFET 689 is connected to an interrupt input of the system μC 551, then a system interrupt will be generated, informing the interface IC 501 that a fault condition has occurred. Meanwhile, encoder 809 converts the over-temperature fault into the SLI bus protocol then loads it into SLI bus fault status register 672. The μC 551 in turn can query the fault settings register 671 as to the nature of the fault the next time data is clocked through the SLI bus 514, either at the time of or prior to the next Vsync pulse.

As shown, temperature sensing circuit 686 outputs a single OT signal representing a two-state status for the LED driver IC, indicating either that a fault has occurred or has not occurred. Alternatively, a two-level warning can be implemented wherein a warning is issued when the IC becomes warm, e.g. above 100° C. but below 120° C., and then issues a fault interrupt when the IC exceeds a higher temperature, e.g. when the sensor determines T>120° C. Temperature sensing circuit 686 may communicate this multiple fault state information to encoder 809 in any number of ways, but preferably through two OT fault lines, one or both of which may be connected to OR gate 699.

In this way an FLT interrupt signal may be generated at the onset of an over-temperature warning, or only after a true over-temperature fault has occurred.

As described above, the circuitry shown in FIG. 18 is capable of sensing and distinguishing the presence of shorted or open LEDs in LED string 506A in a single channel, as well as detecting over-temperature conditions in the driver IC, and is capable of informing the system μC 551 through an interrupt signal or through channel-specific data encoded and communicated through the SLI bus 514. Using a similar arrangement, open and short-LED fault circuitry, not shown, provides fault information for a second channel to an input of OR gate 699 and through encoder 809 to fault status register 672. The same concept and circuitry may be extended to any number of channels integrated in the LED driver IC.

In an alternative embodiment of the circuit shown in FIG. 18, current sink DMOSFET 519A can be used in a cascode clamped configuration by inserting a high-voltage cascode clamp DMOSFET in series between current sink DMOSFET 519A and LED string 506A, in the manner of DMOSFET

520A shown in FIG. 10. In such a cascode-clamped implementation, the maximum voltage on the positive input to comparator 801 is limited to approximately a threshold voltage below the gate voltage of the cascode clamp DMOSFET. With a fixed 12V gate bias on the cascode clamp DMOSFET, the maximum sense voltage on the drain of current sink DMOSFET 519A will be limited to approximately ten volts. There is no benefit to programming the $V_{SLED}$ latch 807 and the programmable SLED reference source 802 higher than this clamp voltage, since that voltage condition cannot occur with the cascode clamp DMOSFET present.

Referring again to FIG. 14, reference current source 687 converts an input reference voltage Vref into reference currents $Iref_A$ and $Iref_B$. $Iref_A$ and $Iref_B$ are delivered to bias I-Precise gate driver circuits 518A and 518B and are used in setting the $I_{LEDA}$ and $I_{LED}$ current in their respective LED strings. One embodiment of the reference current source 687 is shown in FIG. 19A, which uses a discrete precision resistor 654 having a value Rset to convert an input voltage reference Vref into precision current references $Iref_A$ and $Iref_B$ as precise current inputs to I-Precise gate driver circuits 518A and 518B, respectively.

Reference current source 687 includes three current mirrors comprising a pair of P-channel MOSFETs 851 and 852, a pair of N-channel MOSFETs 853 and 854, and a pair of P-channel MOSFETs 856 and 857. The respective gate widths of the MOSFETs in each mirror pair are sized in proportion to the targeted current ratio of the mirror pair. For example the ratio of the gate width of MOSFET 852 to that of MOSFET 851 ideally equals the ratio of the saturated drain current $Iref_2$ flowing in MOSFET 852 to the drain current $Iref_1$ flowing in MOSFET 851. The devices are designed with the same gate length, design rules, and orientation to minimize current mismatch. N-channel MOSFET 854 is segmented, or subdivided, into MOSFETs 854A through 854F, in order to facilitate trimming for improved accuracy. Similarly MOSFET 857 is split into two identical MOSFETs 857A and 857B to generate two output currents $Iref_A$ and $Iref_B$ of identical magnitude.

MOSFETs 851, 853 and 856 are "threshold connected" or "diode connected", i.e. with their gate and drain connected so that $V_{GS}=V_{DS}$. This connection guarantees that each of these devices will operate in a saturated condition, near its theoretical threshold voltage. By forcing a set current through its intrinsic body diode, each of these threshold connected MOSFETs generates a specific gate voltage that in turn is supplied to the identically constructed mirror MOSFET with which it is paired. So long that the mirror MOSFET has a sufficient drain-to-source voltage to remain in its saturation region of operation, the ratio of the currents flowing through the two MOSFETs will be equal to the ratio of the gate widths of the two MOSFETs.

Figure 19A:
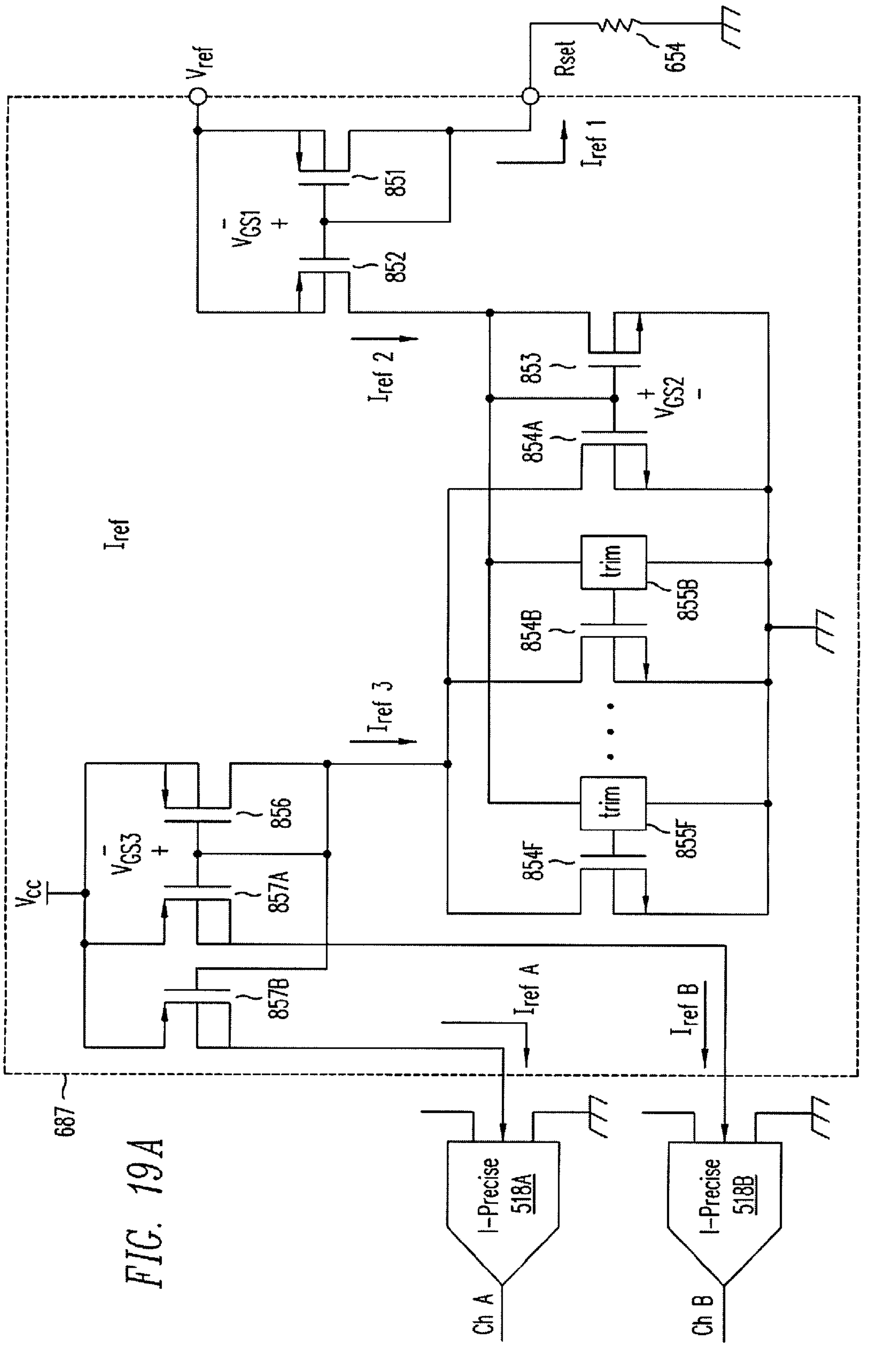
FIG. 19A is a schematic circuit diagram of a reference current source.

Applying this principle to the reference current source 687 shown in FIG. 19A, the current flowing in threshold connected MOSFET 851 is set by the value of Vref and resistance Rset of precision resistor 654. While the resistor 654 may be integrated, it is convenient to exclude the resistor from the IC in which reference current source 687 is fabricated to avoid the need for trimming to improve the consistency of the value of resistor 654 among different production lots. Assuming that MOSFET 851 exhibits a gate-to-source and drain-to-source voltage drop of $V_{GS1}$ while conducting, then the current $Iref_1$ is approximately given by $(Vref-V_{GS1})/Rset$. MOSFET 852 then carries a drain current equal to $(W_{852}/W_{851})\cdot Iref_1$, where $Iref_2$ may be larger or smaller then the $Iref_1$ reference current.

The current $Iref_2$ is in turn mirrored by threshold-connected N-channel MOSFET 853, developing a gate bias $V_{GS2}$ applied to the mirror and trim MOSFETs 854A through 854F. With the identical gate bias $V_{GS2}$, the current $Iref_3$ in the segmented MOSFET 854 is equal to the current $Iref_2$ flowing in MOSFET 853 times the relative ratio of the combined gate widths of segmented MOSFET 854 to the gate width of MOSFET 853, i.e. $Iref_3=(W_{854}/W_{853})\cdot Iref_2$. The combined gate widths of segmented MOSFET 854 is equal to $W_{854A}+(trim_{855B}\cdot W_{854B}+\ldots+trim_{855F}\cdot W_{854F})$ where the trim term is a digital "1" or "0" bit depending on trim circuits 855B through 855F respectively.

Specifically, if the trim bit is trimmed to a "1" state, the gate of the associated MOSFET is tied to the gate of MOSFET 853 and the associated MOSFET conducts current, increasing the magnitude of $Iref_3$ current. Conversely, if a trim bit is trimmed to a "0" state, the gate of the MOSFET is tied to ground and the device is off and does not increase the magnitude of $Iref_3$ current. In this manner, the mirror MOSFETs 854B-854F can be actively trimmed during test to precisely produce a desired LED current with channel-to-channel matching and an accuracy of better than ±2%.

Figure 19B:
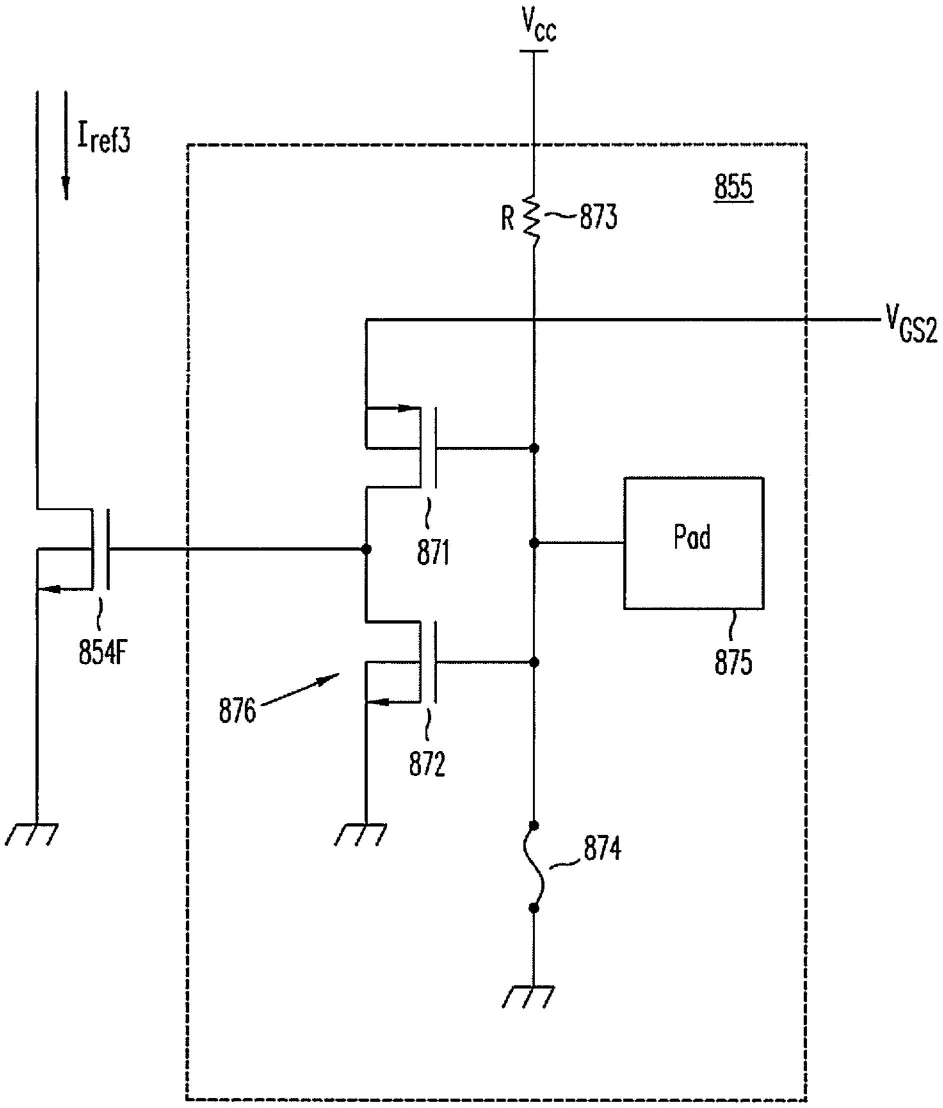
FIG. 19B is a schematic circuit diagram of a trimming circuit for the current reference circuit shown in FIG. 19A.

An example of one embodiment of trimming circuits 855B-855F is shown in FIG. 19B, wherein trimming circuit 855 (representing one of trimming circuits 855B-855F) comprises a small probe pad 875, a P-channel MOSFET 871, an N-channel MOSFET 872, a pull-up resistor 873 and a fuse 874. During trimming, a voltage impressed by the tester on pad 875 can be used to irreparably blow fuse link 874. Fuse 874 and resistor 873, together, form a voltage divider, or more accurately a voltage selector, connected to the input of a CMOS inverter 876 comprising P-channel MOSFET 871 and N-channel MOSFET 871. The value of the resistance 873 is set to be much higher than that of un-blown fuse 874. Resistor 873 may be replaced by a MOSFET current source conducting a small current.

After functional programming, if fuse 874 remains unblown, the input to the CMOS inverter 876 is "low", its output remains high (because P-channel MOSFET 871 is on), and N-channel current mirror MOSFET 854F is on and conducting. If, conversely, fuse 874 is blown, the input to the inverter 876 is "high" pulled up to Vcc by resistor 873, its output goes "low" (because N-channel 872 is on), and mirror MOSFET 854F is permanently disabled from conducting current (because fuse 874 has been permanently blown): In this manner, trimming circuits 855B through 855F can be programmed to adjust the effective gate width of mirror MOSFET 854 over a wide range, from a minimum of $W_{854A}$ up to a maximum of $W_{854A}+\ldots W_{854F}$. Active trimming thereby enables the capability of precisely adjusting the channel current accuracy in every LED driver IC.

Referring again to FIG. 19A, the trimmed current $Iref_3$ flows through threshold connected P-channel MOSFET 856 with gate bias $V_{GS3}$, from which $Iref_3$ is mirrored to MOSFETs 857A and 857B to generate two identical magnitude output currents $Iref_A$ and $Iref_B$, which are supplied to I-Precise gate driver circuits 518A and 518B respectively. Unlike currents $Iref_1$ and $Iref_2$, the output currents $Iref_A$ and $Iref_B$ supplied to I-Precise gate driver circuits 518A and 518B are powered from the regulated Vcc supply and do not load or draw power from the Vref input. In this manner, the reference currents connected to the I-Precise gate driver circuits 518A and 518E can be made sufficiently large to offer good noise immunity without reference current source 687 drawing significant current from its Vref input. It is important not to draw too much power from the Vref input because it degrades the accuracy of the reference voltage and may results in noise on the Vref line or flicker in the backlight as the current demand on Vref changes. The circuitry shown in FIG. 19A avoids this potential problem and prevents unwanted interactions among the separate LED driver ICs.

In summary, reference current source 687 converts a fixed input reference voltage Vref into multiple well-matched reference currents used in LED driver circuitry to maintain backlight brightness uniformity while facilitating buffering against noise and unwanted driver interactions while offering accurate output currents trimmed to better than ±2% absolute accuracy.

Referring again to FIGS. 10 and 14, current-sense feedback (CSFB) circuit 688 monitors the drain voltages on current sink DMOSFETs 519A and 519B and, through feedback to the interface IC 501 ensures that SMPS 508 generates an LED power supply voltage $+V_{LED}$, to provide the highest forward-voltage LED string with sufficient voltage for proper illumination.

To summarize the operation of CSFB circuit 688, CSFB circuit 688 receives an input signal at its CSFBI terminal from the CSFBO terminal of an adjacent channel in the CSFB daisy chain, and using analog circuitry CSFB circuit 688 outputs a signal at its CSFBO terminal that is equal to the lowest of the drain voltage on current sink DMOSFET 519A, the drain voltage on current sink DMOSFET 519B or the signal that it received in its CSFBI terminal. The signal output by CSFB circuit 688 is sent from its CSFBO terminal on through the daisy chain to the next driver IC in a manner shown by CSFB line 512 in FIG. 11. As described previously, VSENSE is the voltage on the drain of any channel's current sink DMOSFET and $V_f$ is the forward-voltage across an LED string. Since VSENSE=($+V_{LED}$−Vf), VSENSE is related to and hence is a measure of the LED string's forward voltage $V_f$. The higher the LED string's forward-voltage $V_f$, the lower VSENSE will be. By passing only the lowest value of VSENSE as the CSFB signal from one LED driver IC to the next, the last LED driver IC in the daisy chain will output the lowest value of VSENSE in the entire system. Accordingly, the signal transmitted from the CSFBO terminal of the last LED driver IC (e.g., LED driver IC 503A in FIG. 10) reflects the channel and LED string having the highest forward voltage drop.

Figure 20A:
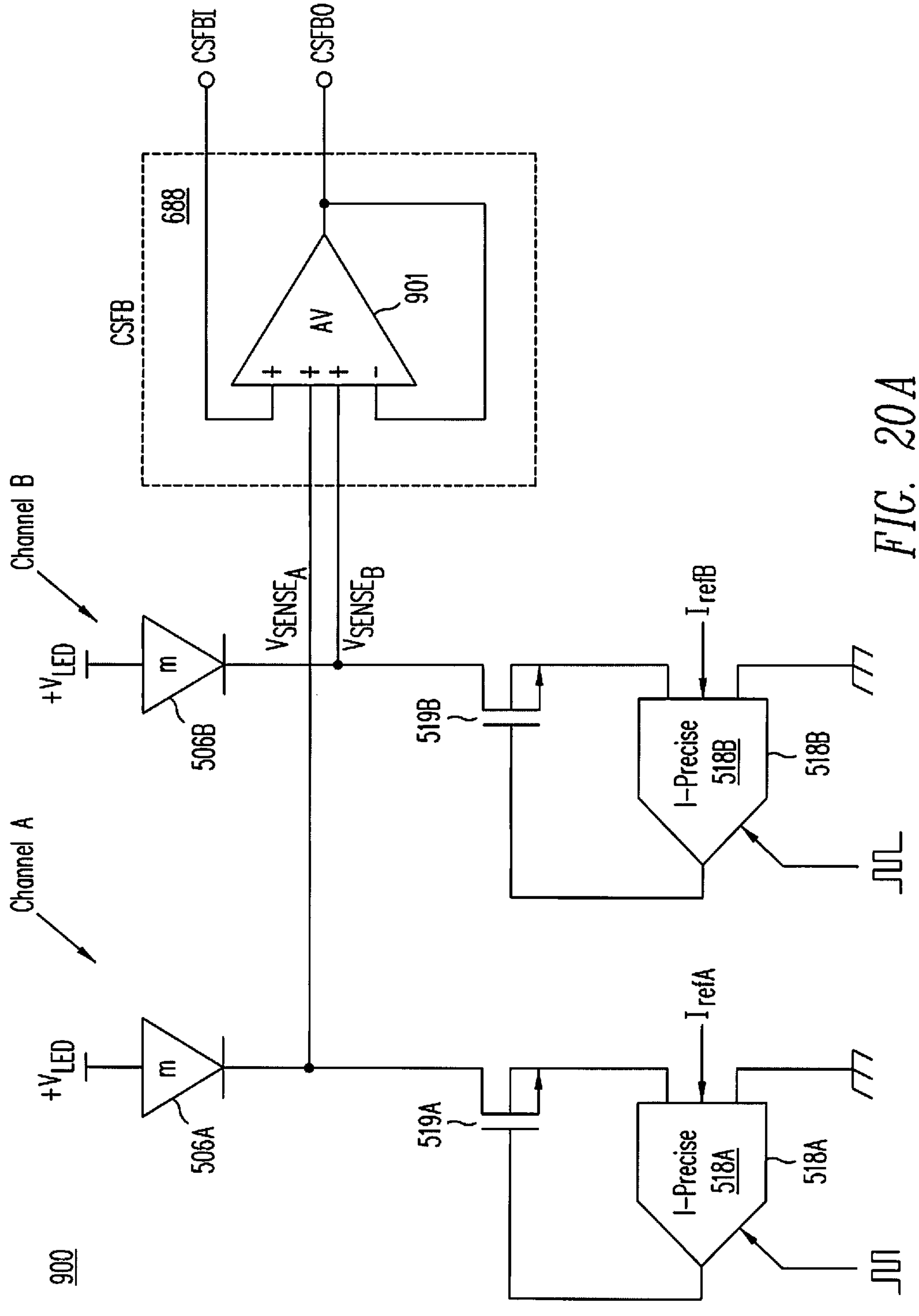
FIG. 20A is a schematic circuit diagram of an analog current sense feedback (CSFB) circuit.

FIG. 20A illustrates a schematic circuit diagram of one embodiment of current sense feedback (CSFB) circuit 688, along with the associated circuitry in channels A and B, shown in FIG. 14. CSFB circuit 688 includes an operational amplifier 901 containing a quad differential input, specifically with three positive inputs and one negative input. LED string 506A, powered by high voltage supply $+V_{LED}$ and with current controlled by current sink DMOSFET 519A and I-Precise gate driver 518A, has its $VSENSE_A$ drain voltage tied to one of the positive inputs of operational amplifier 901. In a similar manner, LED string 503B, powered by the same high voltage supply $+V_{LED}$ and with current controlled by current sink DMOSFET 5198 and I-Precise gate driver 518B, has its $VSENSE_B$ drain voltage tied to another of the positive inputs of operational amplifier 901.

A third positive input of operational amplifier 901 is connected to the CSFBI input terminal of CSFB circuit 688. The negative input of operational amplifier 901 is tied to the CSFBO output terminal of CSFB circuit 688 to insure stable unity gain operation. As shown in FIG. 10, CSFBO output terminal is connected to line 512A; the CSFBI input terminal is connected to line 512B. As explained above, lines 512A and 512B are part of current sense feedback (CSFB) line 512. With unity gain, the output of operational amplifier 901 is therefore identical to the lowest of its three inputs, acting as a voltage follower that selects the lowest of multiple inputs.

Because operational amplifier 901 connects to the drains of high voltage current sink DMOSFETS 519A and 519B, the inputs of operational amplifier 901 must be voltage-clamped to avoid damage to the amplifier. The voltage clamping to protect the operational amplifier inputs against damage can be achieved by inserting a high-value current limiting resistor in series with each input and shunt clamping each input with a Zener diode. Alternatively, a cascode-clamp MOSFET may be used to limit the maximum input voltage on each input. Since the clamp MOSFETs carry only low current signals, small high-voltage devices may be used. The fixed gate voltage for the clamp DMOSFET may be derived from the 24V supply using a resistor divider, or from Vcc. In a preferred embodiment, the gate of the cascode clamp MOSFET is connected to Vcc. This method limits the maximum gate bias on the inputs to operational amplifier 901 to less than Vcc, meaning that only a 5V gate oxide is required to fabricate the operational amplifier input MOSFETs 911, 912 913 and 914, despite requiring a high drain-to-source blocking voltage.

In an alternative embodiment of the circuit shown in FIG. 20A, current sink DMOSFETs 519A and 519B can be used in a cascode clamped configuration by inserting a high voltage DMOSFET, similar to the DMOSFETs 520A and 520B shown in FIG. 10, in series between current sink DMOSFET 519A and LED string 506A and in series between current sink DMOSFET 519B and LED string 506B. In such a cascode-clamped implementation, the maximum voltage on any positive input to operational amplifier 901 is limited to approximately a threshold voltage below the gate voltage of the cascode-clamp DMOSFET. With a 12V fixed gate bias, the maximum sense voltage on the drain of current sink DMOSFET 519A will be limited to approximately 10 volts. The 12V gate bias on the cascode clamp MOSFET can be derived from a resistor divider connected to the 24V input. Using this method, the gate oxide of the MOSFETs used to fabricate operational amplifier 901 must be rated for reliable 12V operation, unnecessarily complicating the wafer manufacturing process.

Despite its need to survive high input voltages without damage, the actual "operating" input range for operational amplifier 901 required for linear amplification, is quite narrow, typically well under one volt. As described above, current sense feedback (CSFB) circuit 688, measures the drain voltage of the current sink MOSFET in every LED driver channel to determine which LED string has the highest forward-voltage drop $V_f$ (and hence the lowest sense voltage VSENSE). The channel with the lowest sense voltage VSENSE ultimately sets the level of $+V_{LED}$ supplied by SMPS 508 to insure that the LED string with the highest forward-voltage receives its prescribed level of current.

The lowest sense voltage VSENSE across any current sink DMOSFET typically has a value of around 100 mV. This is the only area where voltage accuracy, specifically the linearity of operational amplifier 901, matters. For any higher sense voltages, the amplifier's output voltage or linearity doesn't matter, because a subsequent operational amplifier in the daisy chain will ignore the voltage in favor of the lowest current sense feedback voltage in the daisy chain.

If any positive input to operational amplifier 901 exceeds Vcc, that channel will be ignored and the amplifier output is set by the lower voltage input. If all the inputs to an operational amplifier are above Vcc, then the output of the particular operational amplifier will approach Vcc and be subsequently be ignored in the next operational amplifier in the CSFB daisy chain.

Figure 20B:
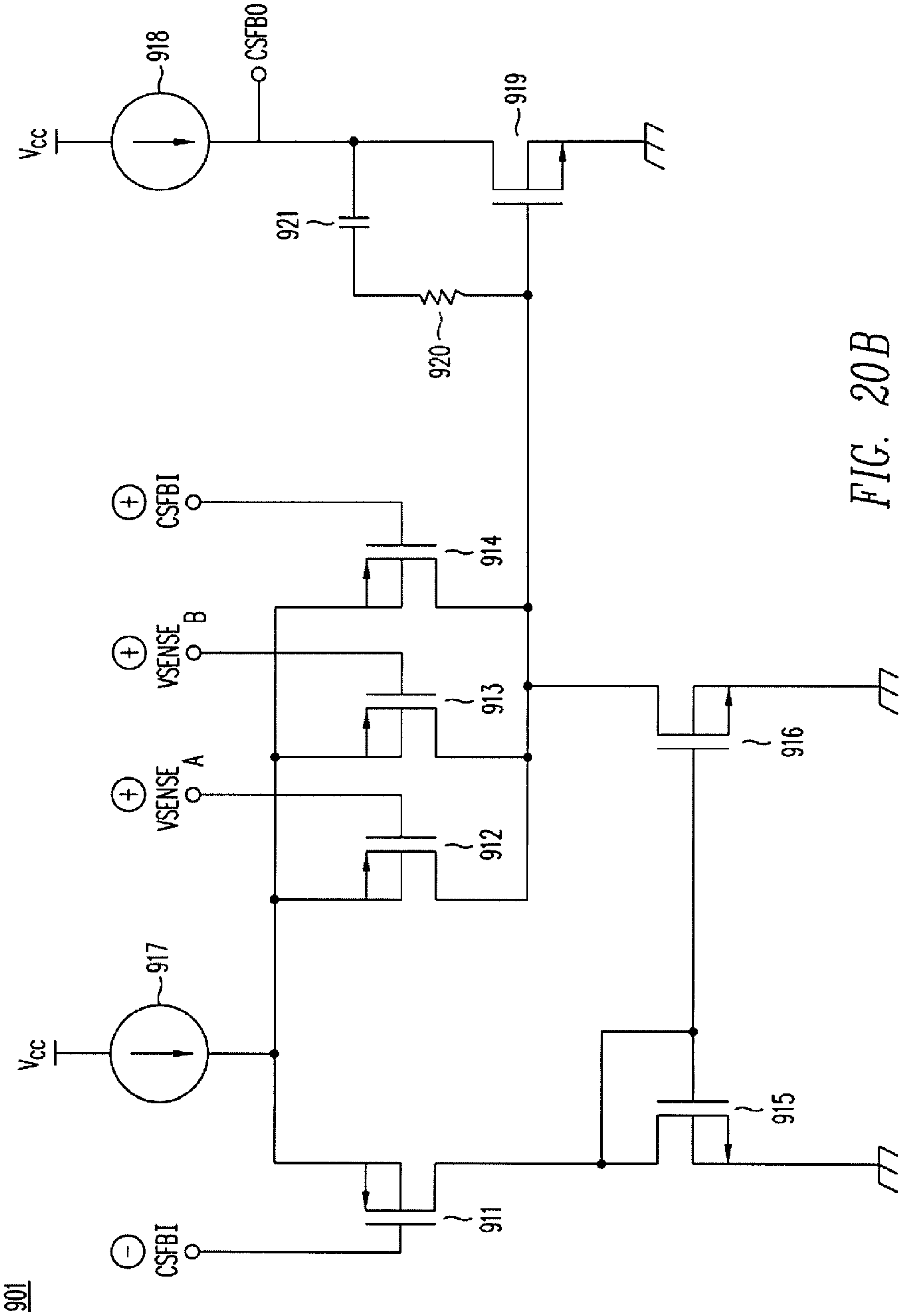
FIG. 20B is a schematic circuit diagram of a multi-input operational amplifier for the CSFB circuit shown in FIG. 20A.

One implementation of operational amplifier 901 is illustrated FIG. 20B. The operational amplifier circuit 901 comprises a differential input two-stage amplifier with an inverted value of the signal at the input terminal CSFBI connected to the gate of a P-channel MOSFET 911, and with the gates of P-channel MOSFETs 912, 913 and 914 connected to $VSENSE_A$ and $VSENSE_B$ and to the input terminal CSFBI, respectively. The differential input is powered by a current source 917. Its output is reflected by the pair of N-channel mirror MOSFETs 915 and 916. The drains of P-channel MOSFETs 912, 913 and 914 and N-channel MOSFET 916 are tied together and to the gate of an N-channel buffer MOSFET 919, which is supplied by a current source 918. A resistor 920 and a capacitor 921 are connected between the gate and drain of MOSFET 919 to stabilize the amplifier against unwanted oscillations.

As shown, operational amplifier 901 does not include input voltage clamping. Some clamping method as previously described is required to avoid exceeding the maximum gate voltage of the input MOSFETs 911, 912, 913 and 914. Since high voltages are present only when a channel is off, i.e. when a current sink MOSFET is not conducting, or in cases of significant channel-to-channel voltage mismatch, operational amplifier 901 need not operate linearly at high voltages. So long as a high voltage does not damage its input devices, the amplifier can cease linear operation whenever its input exceeds some specified value higher than the targeted minimum current source voltage in the system.

Multi-Channel Driver Capability

While the examples shown describe dual channel driver ICs, the disclosed driver concept and architecture can be extended to greater number of integrated channels without limitation, except for power dissipation and temperature restrictions of the driver ICs, packages, and printed circuit board design.

Figure 21:
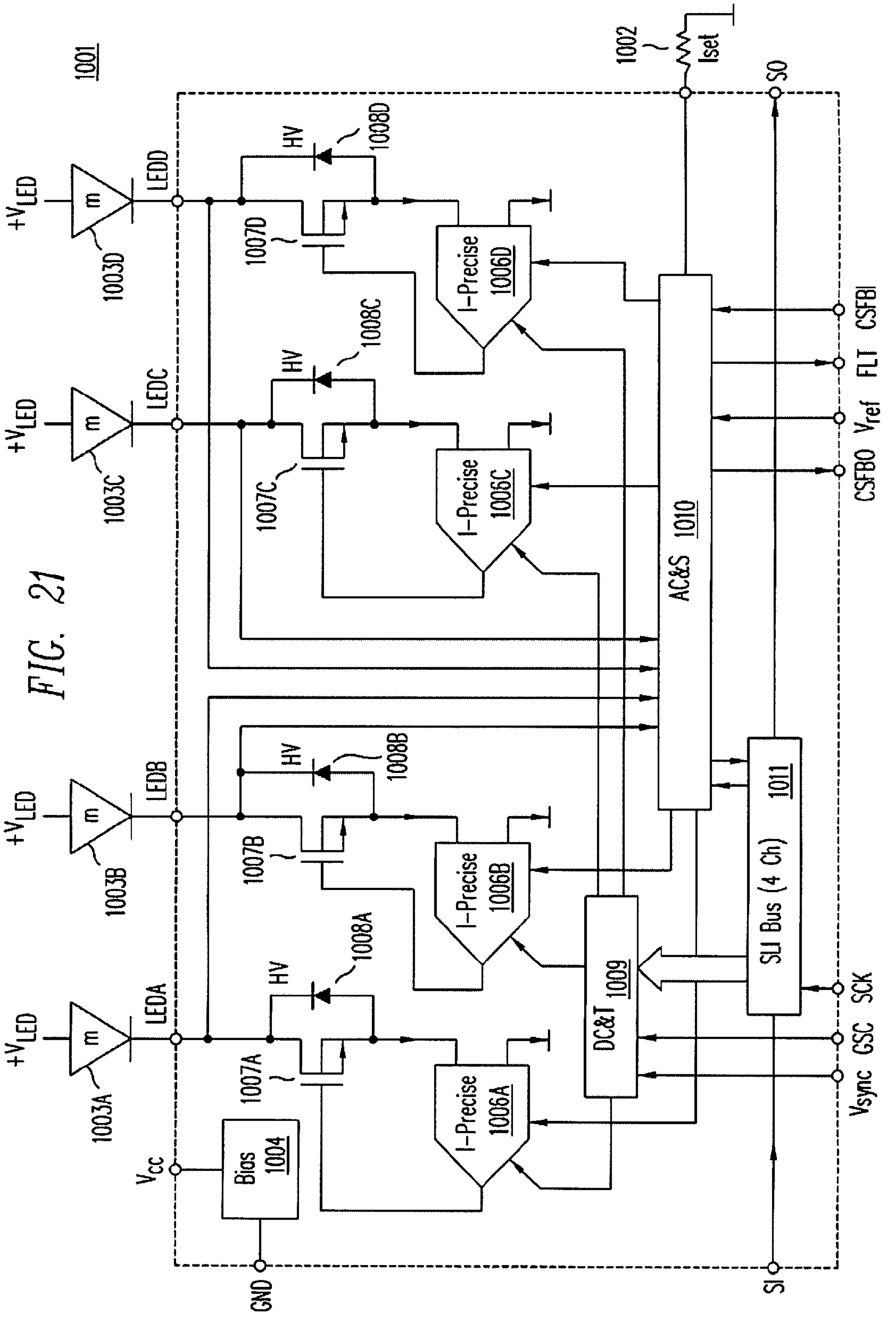
FIG. 21 is a schematic circuit diagram of a four-channel LED driver IC.

One example of a multi-channel LED driver consistent with the disclosed architecture is illustrated in FIG. 21. Similar to the dual channel driver of FIG. 12, the quad LED driver IC 1001 integrates four-channels of high voltage current sink DMOSFETs 1007A-1007D with high voltage diodes 1008A-1008D, respectively. The current sink DMOSFETs 1007A-1007D are controlled by I-Precise gate driver circuits 1006A-1006D to control the current in LED strings 1003A-1003D, calibrated to a current set resistor 1002. Driver IC, like other driver ICs in the system, includes a bias supply 1004, an analog control and sensing AC&S circuit 1010, and a digital control and timing DC&T circuit 1010.

Aside from doubling the number of I-Precise drivers and current sink DMOSFETs in the dual channel version, quad LED driver 1001 requires additional latches and circuitry in AC&S circuit 1010 and DC&T 1009 to support the additional channels. Temperature protection circuitry does not require doubling as one per driver IC is sufficient.

Figure 22:
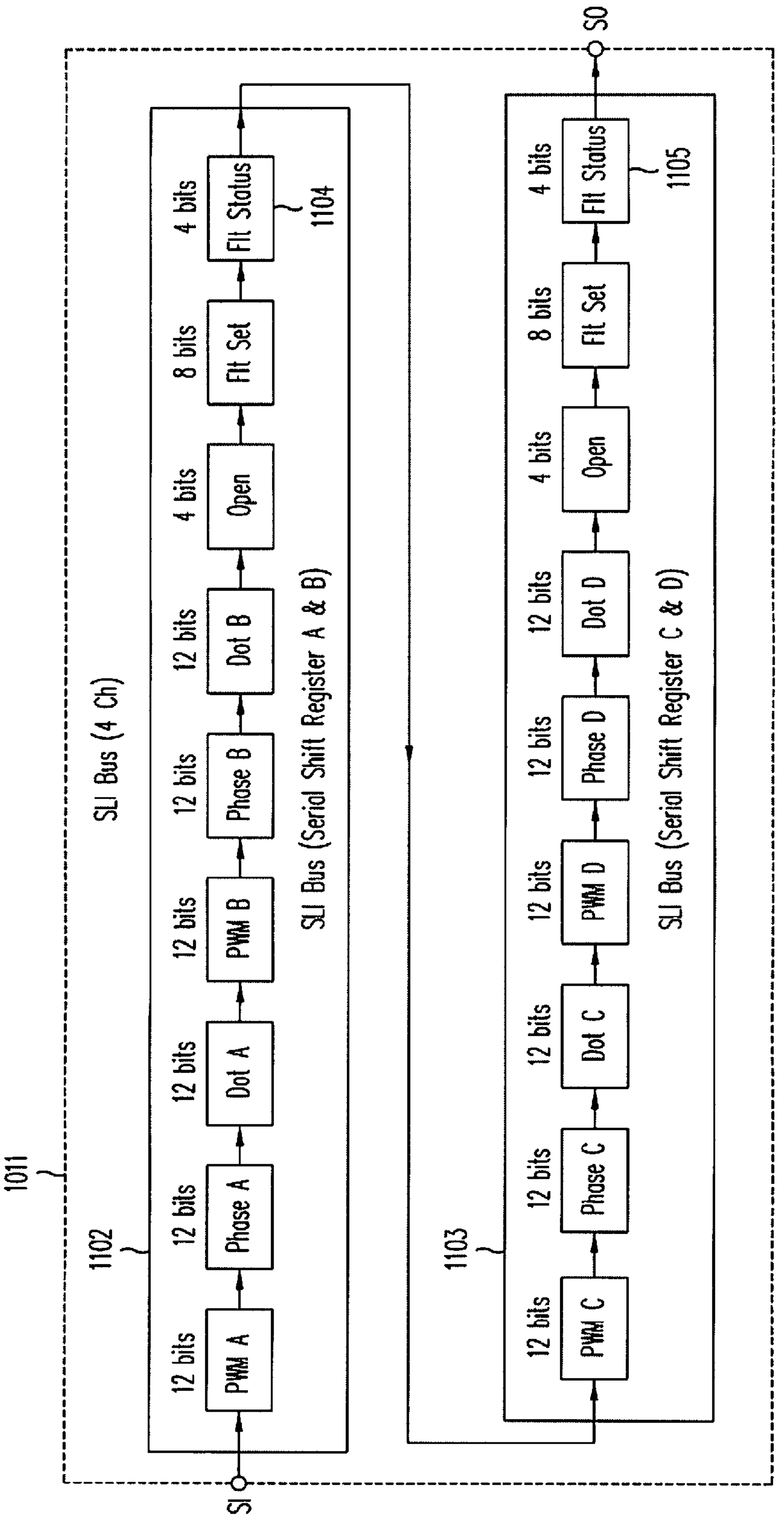
FIG. 22 is a diagram of the serial lighting interface (SLI) bus shift register in the LED driver IC shown in FIG. 21.

The SLI bus shift register 1011 also must be doubled to support four channels. An embodiment of four-channel SLI bus shift register 1011 is shown in FIG. 22. Four-channel SLI bus shift register 1011 includes 176 bits, double the data storage capacity of the SLI bus shift register 514A in the dual channel system of FIG. 14. As a result, the entire data stream is double in length, including PWM, Phase, Dot and Fault data, but there is no need to change the SLI bus protocol. Some of the fault data is duplicated, such as the temperature fault data stored in four-bit fault status registers 1104 and 1105, but the die area savings made possible by eliminating the redundant bits is typically not worth the complications imposed by changing the protocol.

We claim:

1. A method of controlling a plurality of light emitting diode (LED) strings by a plurality of LED driver integrated circuits, the method comprising:

shifting digital data representative of a desired magnitude of current for each LED string of the plurality of LED strings into a shift register of each LED driver integrated circuit of the plurality of LED driver integrated circuits at a clock rate, each of the plurality of LED driver integrated circuits being serially connected together in a daisy chain;

copying the digital data from the shift register of each LED driver integrated circuit at a frame rate, the clock rate being greater than the frame rate by a factor equal to at least a total number of bits of each shift register in each of the plurality of LED driver integrated circuits; and controlling a magnitude of current in each LED string based on the digital data.

2. The method of claim 1 further comprising detecting a highest forward-voltage drop of the plurality of LED strings.

3. The method of claim 1 wherein controlling the magnitude of current in each LED string includes controlling a plurality of switches in each LED driver integrated circuit.

4. The method of claim 3 wherein controlling the magnitude of current in each LED string further includes setting the magnitude of current in each LED string to a desired multiple of a reference current.

5. The method of claim 4 wherein shifting digital data representative of the desired magnitude of current for each LED string includes shifting digital data representative of the desired multiple of the reference current.

6. The method of claim 1 further comprising detecting a short-circuit condition of at least one LED string of the plurality of LED strings and loading digital data representative of the short-circuit condition into the shift register of at least one LED driver integrated circuit of the plurality of LED driver integrated circuits associated with the at least one LED string.

7. The method of claim 6 further comprising generating a fault interrupt signal in response to detecting the short-circuit condition of the at least one LED string.

8. The method of claim 7 further comprising sending the fault interrupt signal to a control unit associated with the plurality of LED driver integrated circuits.

9. The method of claim 1 further comprising detecting an open-circuit condition of at least one LED string of the plurality of LED strings and loading digital data representative of the open-circuit condition into the shift register of at least one LED driver integrated circuit of the plurality of LED driver integrated circuits associated with the LED strings.

10. The method of claim 9 further comprising generating a fault interrupt signal in response to detecting the open-circuit condition.

11. The method of claim 10 further comprising sending the fault interrupt signal to a control unit associated with the plurality of LED driver integrated circuits.

12. The method of claim 1 further comprising detecting an over-temperature condition of at least one LED string of the plurality of LED strings and loading digital data representative of the over-temperature condition into the shift register of at least one LED driver integrated circuit of the plurality of LED driver integrated circuits.

13. The method of claim 1 further comprising detecting an over-temperature condition of at least one LED string of the plurality of LED strings and generating a fault interrupt signal in response to the over-temperature condition.

14. The method of claim 13 further comprising sending the fault interrupt signal to a control unit associated with the plurality of LED driver integrated circuits.

15. A system for controlling a plurality of light emitting diode (LED) strings comprising:

a plurality of LED driver integrated circuits, each of the plurality of the LED driver integrated circuits including a serial shift register to receive data representative of a desired magnitude of current in at least one LED string of the plurality of LED strings, each of the LED diver integrated circuits being constructed to copy the data representative of the desired magnitude of current from the shift register at a frame rate and control a magnitude of current in the at least one LED string based on the data representative of the desired magnitude of current; and a serial lighting interface bus, the serial lighting interface bus including the serial shift register in each of the plurality of LED driver integrated circuits connected in a daisy-chain, the serial shift register constructed to receive the data representative of the desired magnitude of current at a clock rate, the clock rate being greater than the frame rate by a factor equal to at least a total number of bits in the serial lighting interface bus.

16. The system of claim 15 wherein each LED driver integrated circuit further includes a fault settings register constructed to store data representative of a short-circuit condition of the at least one LED string.

17. The system of claim 16 wherein each LED driver integrated circuit further includes a LED fault detection circuit constructed to compare the data representative of the short-circuit condition with a condition of the respective LED driver integrated circuit and generate a signal indicative of whether the at least one LED string is short-circuited.

18. The system of claim 15 wherein each LED driver integrated circuit further includes a fault settings register constructed to store data representative of an open-circuit condition of the at least one LED string.

19. The system of claim 18 wherein each LED driver integrated circuit further includes a LED fault detection circuit constructed to compare the data representative of the open-circuit condition with a condition of the respective LED driver integrated circuit and generate a signal indicative of whether the at least one LED string is open-circuited.

20. The system of claim 15 wherein each LED driver integrated circuit is further constructed to set the magnitude of current in the at least one LED string to a multiple of a magnitude of the reference current based on the data representative of the desired magnitude of current.

* * * * *

UNITED STATES PATENT AND TRADEMARK OFFICE

CERTIFICATE OF CORRECTION

PATENT NO. : 8,947,407 B2
APPLICATION NO. : 13/347631
DATED : February 3, 2015
INVENTOR(S) : Richard K. Williams et al.

It is certified that error appears in the above-identified patent and that said Letters Patent is hereby corrected as shown below:

Title Page:

In the Abstract (57):

Line 4, delete "a an" and insert -- an --.

In the Specification:

Column 4, Line 16, delete "4" and insert -- Φ --.

Column 8, Line 54, delete "$I_{LED}$," and insert -- $I_{LED2}$ --.

Column 8, Line 54, delete "$V_{sink}$," and insert -- $V_{sink2}$ --.

Column 10, Line 62, delete "often" and insert -- of ten --.

Column 18, Line 64, delete "3798" and insert -- 379B --.

Column 20, Line 52, delete "SP1" and insert -- SPI --.

Column 21, Line 33, delete "This" and insert -- The --.

Column 22, Line 42, delete "4578" and insert -- 457B --.

Column 24, Line 6, delete "o" and insert -- on --.

Column 25, Line 58, delete "5198" and insert -- 519B --.

Column 27, Line 14, delete "5878" and insert -- 587B --.

Signed and Sealed this
Twenty-seventh Day of October, 2015

Michelle K. Lee
*Director of the United States Patent and Trademark Office*

In the Specification:

Column 28, Line 3, delete "5188" and insert -- 518B --.

Column 29, Line 8, delete "1ref" and insert -- Iref --.

Column 29, Line 14, delete "Vref" and insert -- Iref --.

Column 29, Line 25, delete "showing FIG. 14" and insert -- shown in FIG. 14 --.

Column 29, Line 65, delete "garners" and insert -- gamers --.

Column 42, Line 63, delete "518E" and insert -- 518B --.

Column 43, Line 54, delete "5198" and insert -- 519B --.